United States Patent
Tohkairin (12)

(10) Patent No.: US 6,529,529 B1
(45) Date of Patent: Mar. 4, 2003

(54) MULTIPLEXING DEVICE HAVING A DIGITAL 1-LINK RELAY CAPABILITY

(75) Inventor: Norikatsu Tohkairin, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/178,717

(22) Filed: Oct. 26, 1998

(30) Foreign Application Priority Data

Oct. 28, 1997 (JP) .............................................. 9-296019

(51) Int. Cl.⁷ ................................................ H04J 3/02
(52) U.S. Cl. ...................................... 370/537; 370/535
(58) Field of Search ................................ 370/537, 298, 370/299, 352, 353, 354, 356–360, 389, 392, 437, 532, 533, 535, 536, 538, 540, 542, 543, 544; 379/16, 17, 93.08, 100.09, 100.12, 165, 220.01, 221.01, 221.09, 221.1, 221.12, 225, 226, 227, 229

(56) References Cited

U.S. PATENT DOCUMENTS 5,867,493 A * 2/1999 Zisapel ....................... 370/351

* cited by examiner

*Primary Examiner*—Douglas Olms
*Assistant Examiner*—Phirin Sam
(74) *Attorney, Agent, or Firm*—Katten Muchin Zavis Rosenman

(57) ABSTRACT

A multiplexing device with small circuitry, which reduces a time period during which a signal format mismatch state is continued within a communications system due to a difference of the time point at which switching to a relay exchange mode is performed, and which can oppose a multiplexing device of a conventional type via an exchange, by comprising a unit for inserting a first periodic signal including one or more predetermined bit patterns in a voice signal and outputting the signal to the exchange, when a path from the multiplexing device on the opposing side is not connected; a unit for inserting a second periodic signal including a larger number of predetermined bit patterns from the time point at which the first periodic signal is detected within the signal input after the above described path is connected; and a unit for switching the multiplexing device itself to the relay exchange mode when the second periodic signal is detected within the signal input from the exchange.

22 Claims, 61 Drawing Sheets

F = FRAME PATTERN bit FOR DIGITAL 1-LINK RELAY EXCHANGE (F bit)

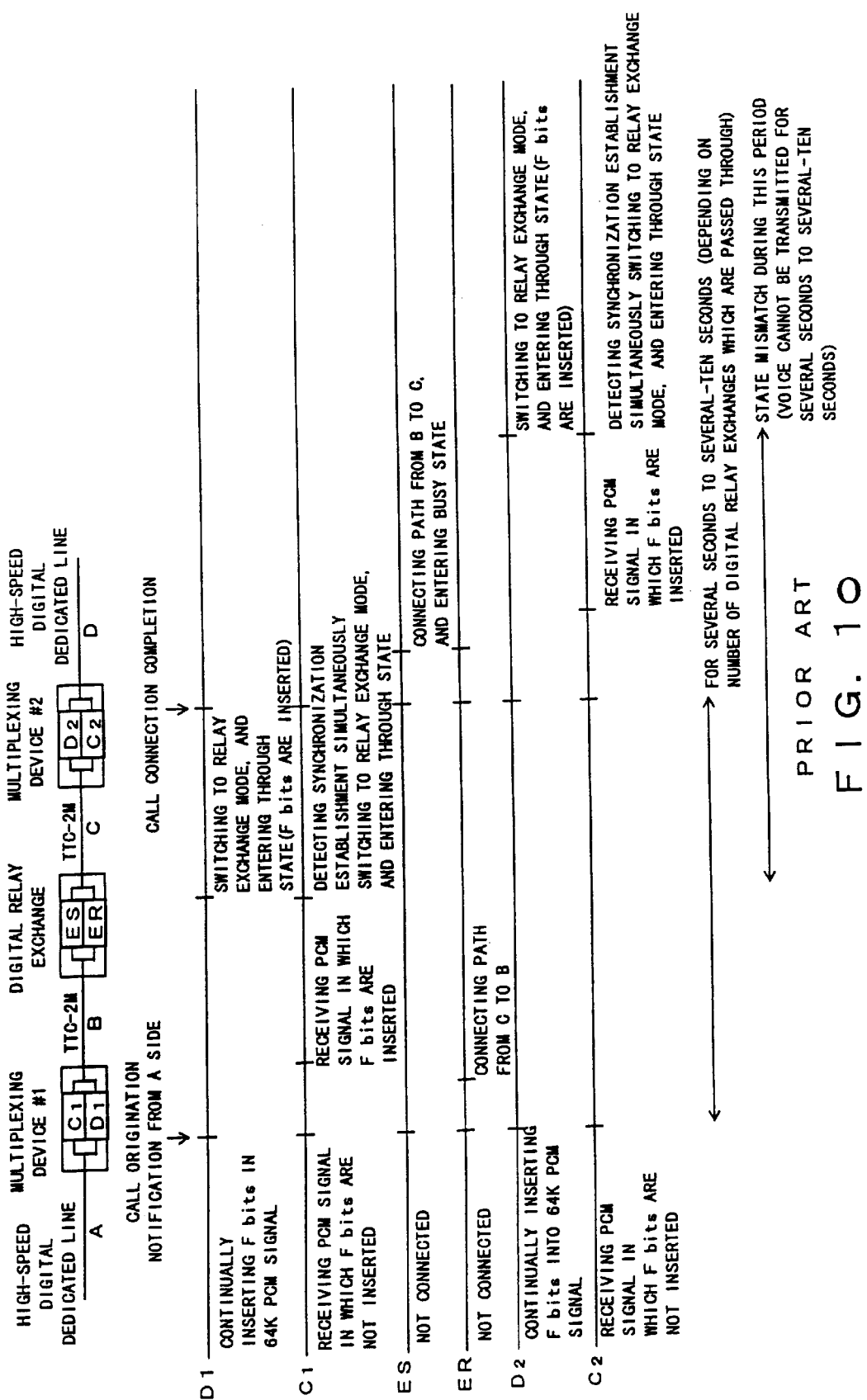

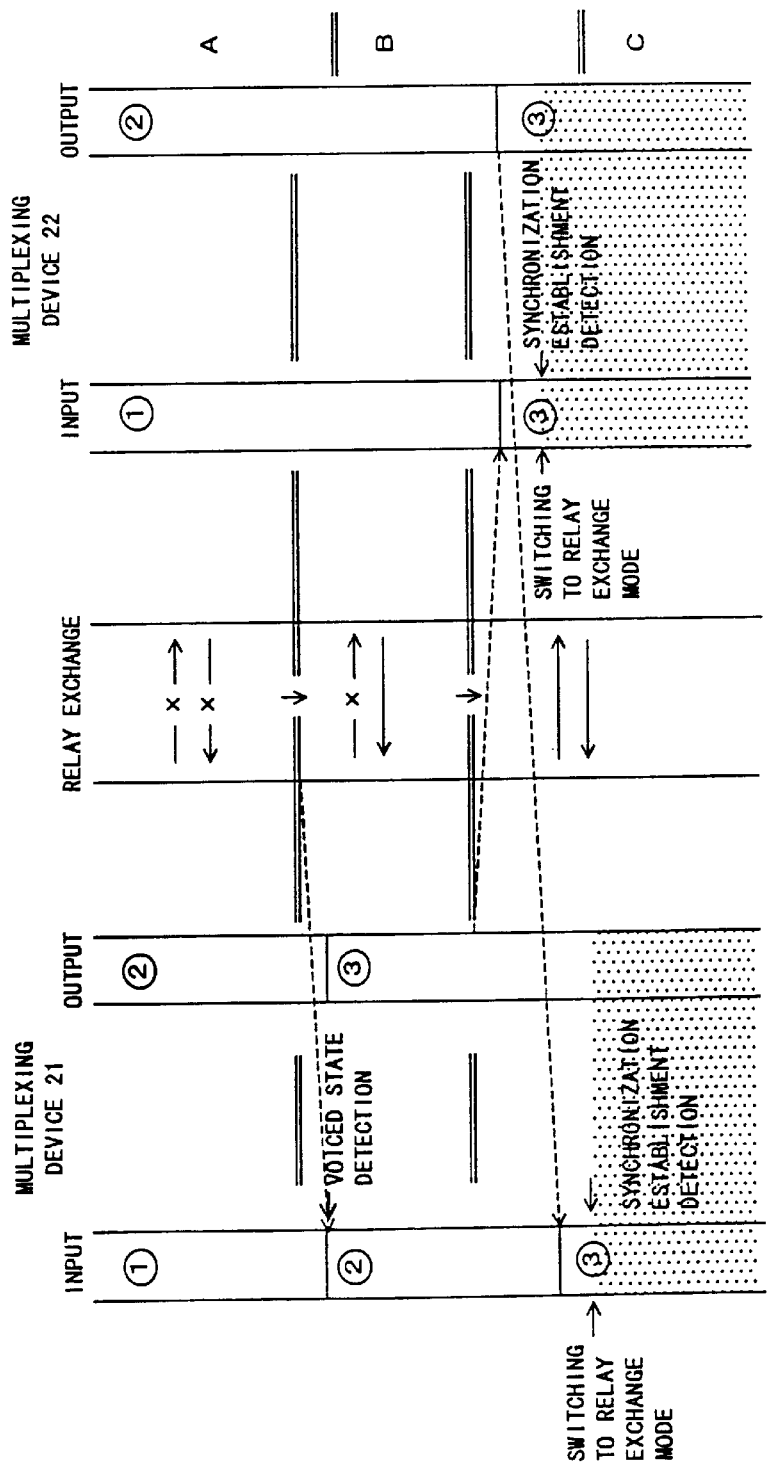
F I G. 14

① IS SYNCHRONIZATION ESTABLISHMENT DETECTED BY DETECTING F bits WITHIN 64K SIGNAL FROM PBX SIDE ?

② ARE S bits NORMAL ?

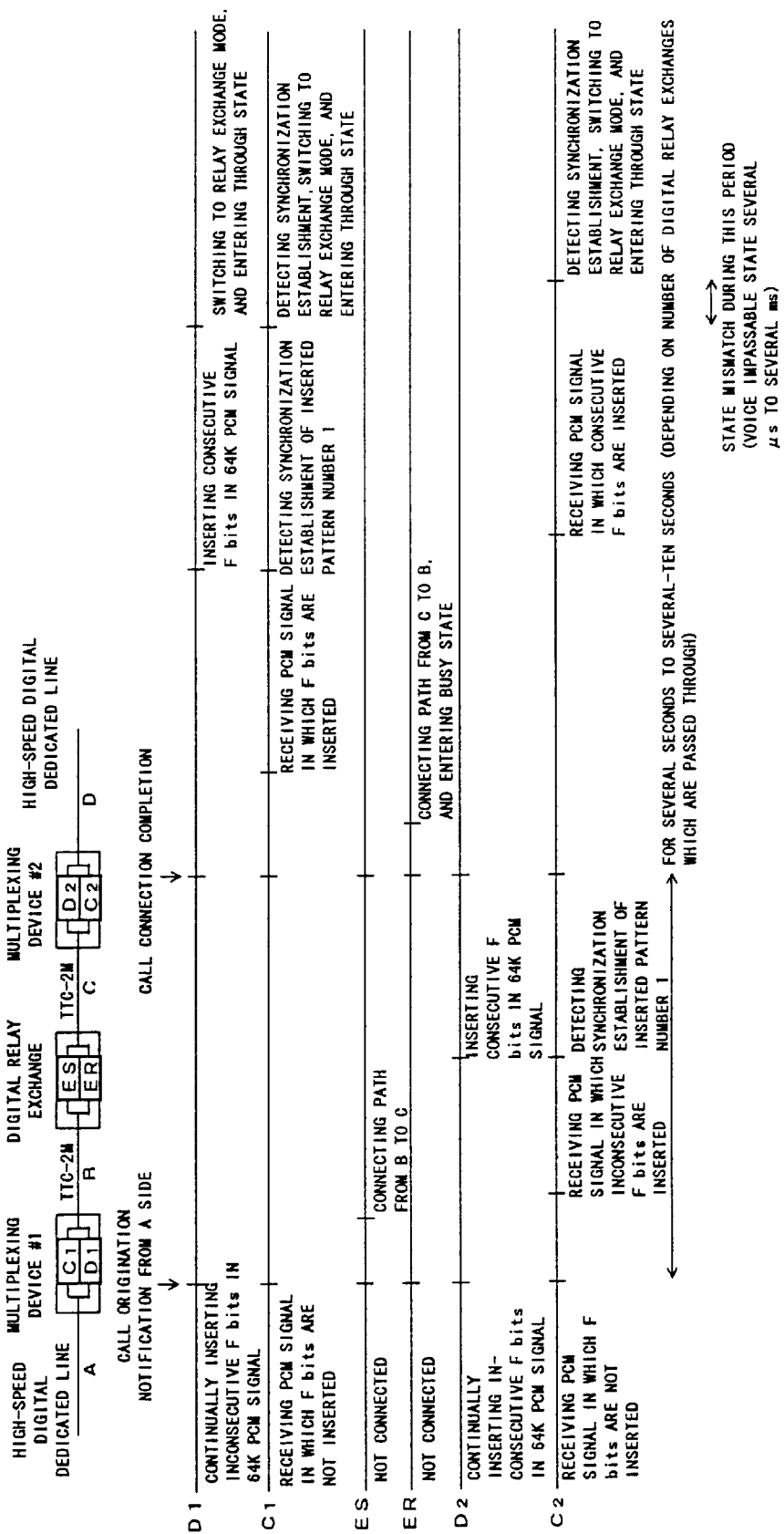
F I G. 41A

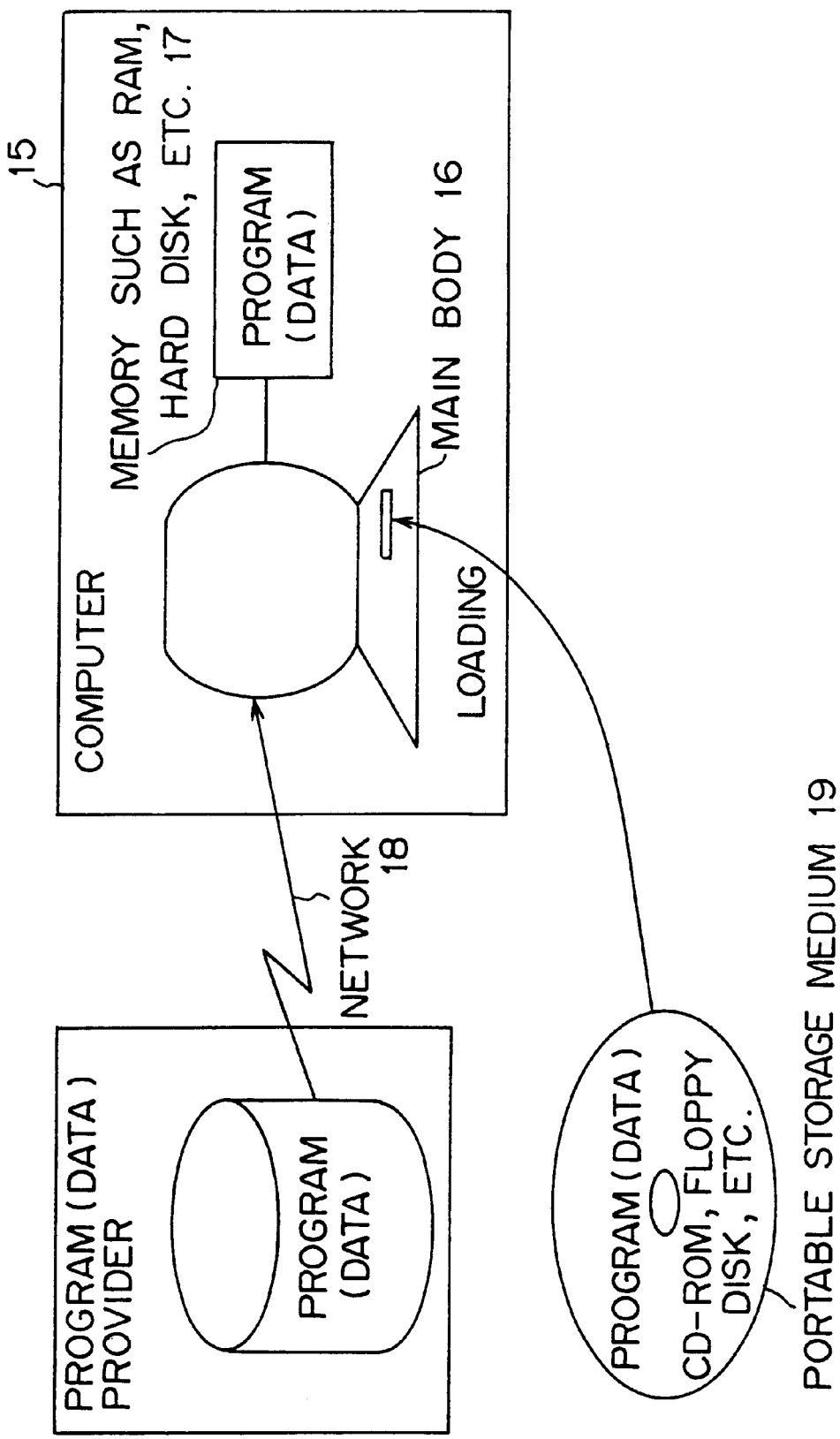
F I G. 43

US 6,529,529 B1

MULTIPLEXING DEVICE HAVING A DIGITAL 1-LINK RELAY CAPABILITY

BACKGROUND OF THE INVENTION

1. Field of the Invention

The present invention relates to a multiplexing digital communications system, and more particularly to a multiplexing device having a digital 1-link relay capability for preventing the deterioration of voice quality or a delay of data, when multiplexing devices are connected via a digital relay exchange with multiple links.

2. Description of the Related Art

Currently, a multiplexing device for lowering the bit rate of a coded voice signal or a fax signal by performing data conversion is frequently used, for example, in an in-house dedicated line network so as to reduce a line cost, etc.

When a voice system network is configured by using a dedicated line, etc., the line is effectively used by coding and multiplexing a voice signal (a coded voice signal is hereinafter referred to as a coded signal) on some occasions. If the scale of such a network becomes large, an exchange may sometimes serve as a relay exchange, which relays a voice signal to a different point. When a connection is made via such a relay exchange, a non-reversible data conversion system may be sometimes used as a system for coding/decoding a voice signal. Therefore, the coding/decoding of a voice signal is repeated by the number of times that the voice signal is relayed by a relay exchange. As a result, the voice quality deteriorates. Additionally, a delay caused by repeating the encoding/decoding may become large. If only the multiplexing devices which are respectively closest to a call originating unit and a call terminating unit can be opposed to each other in order to overcome the above described problems, the coding and decoding operations are respectively performed only once. As a result, the deterioration of data and a delay can be reduced to a minimum. For example, a hearing difficulty in a voice transmission can be eliminated. As described above, the system for keeping the multiplexing device existing between the multiplexing devices, which are respectively closest to the call originating and terminating units, from performing the coding/decoding operations, and for directly relaying a coded signal to the multiplexing device closest to the call terminating unit via a digital relay exchange is referred to as a digital 1-link relay connecting system.

FIG. 1A is a block diagram showing the network configuration for explaining a digital 1-link relay capability. In FIG. 1A, for example, a voice signal, which is transmitted from an exchange A to an exchange C via a digital relay exchange B 100, is coded by a multiplexing device 101, propagated over a transmission line, decoded by a multiplexing device 102 arranged in the stage preceding the digital relay exchange B 100, and switched by the digital relay exchange B 100. Then, the signal is again coded by a multiplexing device 103, propagated over a transmission line, and decoded by a multiplexing device 104 arranged in the stage preceding the exchange C.

In such a network, a synchronous bit for relay exchange switching, which is referred to as an F bit to be described later, is inserted in, for example, the signal transmitted from the multiplexing device 102 to the relay exchange B 100. The multiplexing device 103 which has received the F bit via the digital relay exchange B 100 recognizes that it must only relay the voice signal by detecting the synchronization establishment with the F bit. The multiplexing device 103 therefore performs relay exchange mode operations for fundamentally outputting the signal transmitted from the digital relay exchange B 100 to the multiplexing device 104 side unchanged and not via its coder 103*b*, and for outputting the signal input from the multiplexing device 104 to the digital relay exchange B 100 side unchanged.

When the multiplexing device 102 detects the F bit which is inserted in the voice signal by the multiplexing device 103, it performs the relay exchange mode operations in a similar manner. That is, the multiplexing device 102 outputs the signal input from the digital relay exchange B 100 to the multiplexing device 101 unchanged, and also outputs the signal input from the multiplexing device 101 to the digital relay exchange B 100 unchanged. As a result, the voice signal input from the exchange A is coded only by the multiplexing device 101 and decoded only by the multiplexing device 104, thereby implementing the digital 1-link relay capability.

Provided below are the explanations about the configuration of a conventional multiplexing device, and the insertion of an F bit as the synchronous bit for relay exchange switching. FIG. 1B is a schematic diagram explaining the operations of a multiplexing device. This multiplexing device is hereinafter referred to as a conventional type (a). For example, a multiplexing device 102 is composed of a decoder 102*a*, a coder 102*b*, a bypass data transmitting unit 102*c* for fundamentally outputting a signal input from a transmission line to a digital relay exchange 100 side unchanged, and a bypass data receiving unit 102*d* for outputting the signal input from the digital relay exchange 100 side unchanged. F bit detection 102*e* operations are performed for the data input from the exchange side, while F bit insertion 102*f* operations are performed for the data output to the exchange side. The bypass data receiving unit 102*d* performs an in-phase operation due to the difference between the bit rates of a PCM (Pulse Code Modulation) signal and coded data, and performs control in order not to generate a lot of noise.

FIG. 1C is a schematic diagram showing the details of the configuration of the constituent elements of the multiplexing device 102 shown in FIG. 1B. Its configuration is almost the same as that of the multiplexing device 102 shown in FIG. 1B except for an adder 102*f* for inserting the F bit in a voice signal, which is arranged on the output side of the decoder 102*a*.

FIG. 1D is a diagram explaining the method for inserting the F bit as the synchronous bit for relay exchange switching in a PCM voice signal. In FIG. 1D, an F bit is periodically inserted in a selected position among the LSBs (D0s) of the 8 bits (D7 through D0) of the voice signal on every 8 KHz clock cycle (cycle T=125 $\mu$s).

FIG. 1E exemplifies a PCM signal after the switching to relay exchange mode is performed. Generally, "1" is assigned to an unused bit in order not to generate a lot of noise after the signal is converted into an analog signal while running in the relay exchange mode. Here, also all the values of the LSBs at the positions in which F bits are not inserted are "1".

FIG. 1F is a diagram explaining the method for establishing synchronization with an F bit in the multiplexing device of the conventional type (a). In FIG. 1F, for example, one of 4 consecutive LSBs (Least Significant Bits) is used for an F bit after F bits are started to be inserted. Accordingly, 500 $\mu$s is recognized to be one cycle of an F bit for a 64-Kbps voice signal (8 KHz clock). When a voice path is connected within a digital relay exchange and the voice data in which the F bit from the multiplexing device on an opposing side is inserted is input, the detection of a synchronous pattern, "10" in this case, is started. To improve the accuracy of the detection, the switching to the relay exchange mode is performed when 4 synchronous patterns are consecutively detected.

FIGS. 1G and 1H are diagrams for explaining the details of the method for inserting an F bit. In FIG. 1G, F bits are inserted in the positions "b", "f", "j", "n", . . . among the LSBs of voice data, and one of 4 LSBs is used for an F bit. Therefore, its cycle will become 500 μs. "0", "1", "0", "1", "0", . . . are inserted in the positions "b","f","j","n","r", . . . as F bits of actual LSBs.

FIG. 1H is a diagram explaining data arrangement of an actual PCM signal. FIG. 1H shows the case where a data clock is 64 KHz. The LSB of the initial 8 bits of the voice data corresponds to "a" shown in FIG. 1G, and the LSB of the next 8 bits corresponds to "b". "0" is inserted in the position "b" as an F bit. The reason that an F bit is assigned to an LSB is that an amplitude change is minimized when a signal is converted into an analog signal. When the F bit is inserted, only the data of the LSB is switched after serial/parallel conversion is performed.

A variety of methods can be considered as a method for detecting an F bit. By way of example, the method using a random access memory may be cited. That is, the method for preparing the memory having an F bit cycle width, sequentially storing data, and searching for F bits when the data is stored up to a certain number for protection. If this method is used, the memory for-performing a search, etc. is required. With this method, however, it is easy to find where F bits exist. There is a possibility that the actual data having the same cycle and pattern as those of an F bit is stored. Accordingly, the detection of only one synchronous pattern is not determined to be synchronization establishment. The detection of the synchronization establishment is determined when the number of identical synchronous patterns, the number of which is equal to a synchronization establishment detection number, are detected.

The reason that the synchronization establishment detection number is used is: synchronization can be possibly caused in a pseudo manner, because a voice signal, etc. may have random values even if a synchronous pattern having a certain string is defined to be one set and only one set is detected. Therefore, the detection of the synchronization establishment is not determined when only one pattern is detected. Namely, the determination of the synchronization establishment is protected and made by detecting several synchronous patterns. This prevents a detection error, which leads to an improvement of the detection accuracy. The number of identical synchronous patterns, which is required for the synchronization establishment, is referred to as a synchronization establishment determination number or a synchronization protection number. The reason why the protection is provided by detecting not a single but several synchronous patterns is that the detection of the synchronization establishment determination is made easier than with a longer synchronous pattern, and moreover, the same accuracy as that implemented with the synchronous pattern whose length is equivalent to the synchronization establishment detection number can be realized.

FIG. 1J exemplifies a signal pattern which causes synchronization in a pseudo manner. Here, the LSB data is extracted every 125 μs cycle in a similar manner as in FIG. iF, and the extracted data is stored in a memory. Since the cycle of an F bit is 500 μs, 4 sequences 1 through 4 are prepared as memory sequences. Data is stored in the respective memory sequences every 500 μs. The portion where 4 or more identical F bit patterns, "10" in this case, are detected is recognized to be the position of an F bit. In FIG. 1J, however, synchronization is determined to be made in the memory sequence 3 in a pseudo manner in addition to the proper position of the F bit, that is, the position in the sequence 2. Since the two F bits are determined to exist, the detection is again made normally.

Provided next is the explanation about the operations using F bits, which are performed by the multiplexing device of the conventional type (a), by referring to FIGS. 1K, 1L, and 1M. FIG. 1K shows the state where a bidirectional path serving as 100a and 100b within a digital relay exchange 100 is not connected, and the coder and the decoder of each of the multiplexing devices 102 and 103 are connected by being inserted between a transmission line and the relay exchange 100.

FIG. 1L shows the state where one of the voice paths 100b of the digital relay exchange 100 is connected. In this state, an F bit is inserted in a coded signal by the multiplexing device 103, and is input to the multiplexing device 102 via the digital relay exchange 100. The multiplexing device 102 detects the input of the F bit as the synchronous bit for relay exchange switching, and switches the multiplexing device 102 itself to the relay exchange mode, that is, the state where its coder and decoder are disconnected. Because the voice path from the multiplexing device 102 to the multiplexing device 103, that is, the voice path 100a of the relay exchange 100 is yet to be connected on the side of the multiplexing device 103, the multiplexing device 103 detects no F bits. Accordingly, the multiplexing device 103 does not switch its operating mode to the relay exchange mode.

FIG. 1M shows the state where also the other of the voice paths 100a of the digital relay exchange 100 is connected. In this state, an F bit is inserted in the signal output from the multiplexing device 102, and the F bit is detected by the multiplexing device 103. As a result, also the multiplexing device 103 switches its operating mode to the relay exchange mode. Here, the operations for switching to the relay exchange mode are completed.

As described above, multiplexing devices on both sides of a relay exchange perform synchronization establishment, and their modes are immediately switched to the relay exchange mode. However, the upstream and downstream of a voice path are not always connected at the same time, depending on the specification of a relay exchange. The upstream may be connected after all of downstream paths are connected, or the downstream may be connected after all of upstream paths are connected.

Referring to FIGS. 1A and 1L. With the method for initially connecting an upstream, for example, the voice path 100b within the relay exchange 100 is initially connected, for example, as shown in FIG. 1L. With this method, the upstream is initially connected in order to allow a local exchange side to hear a second dial tone or a busy tone when control information reaches a connection destination or a relay exchange, and the downstream is not connected until all of relay exchanges receive the control information. Therefore, after the multiplexing device 102 is switched to the relay exchange mode, a considerable amount of time is required until the multiplexing device 103 is switched to the relay exchange mode.

In the meantime, with the method for initially connecting a downstream, the downstream path is firstly connected in order to transmit the control information such as a PB (Push Button) signal, etc. from a local exchange side, and an upstream is not connected until the connection of the downstream path is completed. This is because a called party does not exist until the completion of the connection, and noise, etc. is not caused to the local exchange. The multiplexing device 103 is firstly switched to the relay exchange mode, while the multiplexing device 102 requires a considerable amount of time to be switched to the relay exchange mode.

As a system for overcoming the above described problem that a considerable amount of time is required to switch one of the multiplexing devices to the relay exchange mode although the other of the multiplexing devices of a relay exchange has been switched to the relay exchange mode, the system using a multiplexing device of a conventional type (b) exists. With this system, two types of F bits, that is, first and second F bits are prepared. In the state where the bidirectional path is not connected in a relay exchange, each of multiplexing devices inserts the first F bit in the signal to be output, and outputs this signal to the relay exchange side. When one of the paths is connected within a relay exchange, one of the multiplexing devices receives the coded signal in which the F bit is inserted via the connected path. This multiplexing device does not yet switch its operating mode to the relay exchange mode at this time, replaces the first F bit inserted in the coded signal with the second F bit, inserts the second F bit in the coded signal, and outputs the signal to the relay exchange side. Since the other of the voice paths is yet to be connected at this time, the other of the multiplexing devices does not switch its operating mode.

When the path in the other direction is connected within the relay exchange, the multiplexing device at the connection destination detects the second F bit from the coded signal, establishes synchronization, and switches its operating mode to the relay exchange mode. At the same time, the multiplexing device replaces the first bit inserted in the coded signal with the second F bit, and outputs the signal to the relay exchange side. Since the voice path at the output destination is currently connected, the multiplexing device which receives this signal detects the second F bit from the input signal, establishes synchronization, and switches its operating mode to the relay exchange mode. In this way, both of the multiplexing devices switch their modes to the relay exchange mode almost at the same time, after the connections of the voice paths within the relay exchange are completed.

FIG. 1N is a time chart showing the operations for firstly connecting an upstream, which are performed by the multiplexing device of the conventional type (a), when an A side originates a call to a D side. When the paths within a digital relay exchange are not connected, the digital relay exchange outputs a no-tone code as will be described later. The coder included in the multiplexing device receives the PCM code to which the F bit as the no-tone code is not added.

When the call origination is notified from the A side, the digital relay exchange connects an upstream path ES from a line B of a TTC (The Telecommunication Technology Committee)-2- Mbps line to a line C. Then, a multiplexing device #2 receives the PCM signal to which the F bit is added by a decoder D1 of a multiplexing device #1, detects synchronization establishment, switches the multiplexing device #1 itself to the state where a coder C2 and a decoder D2 are not connected, that is, to the relay exchange mode, and enters a through state. Here, the call connection is completed.

Next, the digital relay exchange connects a downstream path ER from the line C to the line B. The multiplexing device #1 then receives the PCM signal to which the F bit is added by the decoder D2 of the multiplexing device #2, detects synchronization establishment, switches the multiplexing device #1 itself to the state where a coder C1 and the decoder D1 are not connected, that is, to the relay exchange mode, and enters a through state. Here, the connection between the A and D sides is completed.

In such a connection flow, voice signals cannot be transmitted for several seconds to several-tens of seconds from when the coder C2 and the decoder D2 enter the through state till when the coder C1 and the decoder D1 enter the through state, because of the mismatch between signal formats as will be described later.

FIG. 1O is a time chart showing the operations for firstly connecting a downstream, which are performed by the multiplexing device of the conventional type (a), when an A side originates a call to a D side.

When the call origination is notified from the A side, a digital relay exchange connects a downstream path ER from a line C to a line B. Then, a multiplexing device #1 receives the PCM signal to which an F bit is added by a decoder D2 of a multiplexing device #2, detects synchronization establishment, switches the multiplexing device #1 itself to the state where a coder D1 and a decoder D1 are not connected, that is, to the relay exchange mode, and enters a through state.

Next, the digital relay exchange connects an upstream path ES from the line B to the line C upon completion of the connection of the call. Then, the multiplexing device #2 receives the PCM signal to which the F bit is added by the decoder D1 of the multiplexing device #1, detects synchronization establishment, switches the multiplexing device #2 itself to the state where a coder C2 and the decoder D2 are not connected, that is, to the relay exchange mode, and enters the through state. Here, the connection between the A and D sides is completed.

In such a connection flow, voice signals cannot be transmitted for several seconds to several-tens of seconds from when the coder C1 and the decoder D1 enter the through state till when the coder C2 and the decoder D2 enter the through state, because of the mismatch between signal formats as will be described later.

As described above, the conventional multiplexing device includes the types (a) and (b). Since the conventional type (a) detects synchronization establishment with the F bit and simultaneously switches its operating mode to the relay exchange mode, a considerable amount of time is required to switch the multiplexing device on one side to the relay exchange mode although the multiplexing device on the other side has been switched to the relay exchange mode, depending on the kind of a relay exchange.

As described above, intermediate multiplexing devices only relay a voice signal without coding/decoding the signal in the relay exchange mode, so that a 1-link path is established between the multiplexing devices which are respectively closest to the telephones on call originating and terminating sides. If path connections within a relay exchange are not simultaneously made, some of the intermediate multiplexing devices are switched to the relay mode, while some of them continue to operate in the normal mode.

Assume that the multiplexing device 102 switches its operating mode to the relay exchange mode, while the multiplexing device 103 continues to operate in the normal mode as shown in FIG. 1L. In this case, the signal from the exchange C is coded by the multiplexing device 104, decoded by the multiplexing device 103, switched by the relay exchange 100, and is input to the multiplexing device 102. However, since the multiplexing device 102 is in the relay exchange mode, it does not code the signal and inputs the multiplexing device 10 unchanged. The multiplexing device 101 is continually in the normal mode. Therefore, the multiplexing device 101 decodes this signal and outputs it to the exchange A. As described above, the signal output from the relay exchange 100 is not coded but only decoded, which leads to a mismatch between the signal formats. This causes a serious problem in that a voice signal cannot be transmitted, and a call cannot be connected with a PB signal due to the disability of the transmission 1 of information although the information of a telephone number, etc. is attempted to be transmitted with the PB signal during the establishment of the call.

As one of the methods for overcoming this problem, the conventional type (b) is used. This type, however, uses the two F bit types, that is, the first and second F bits as F bit sequences. Therefore, an F bit inserting unit must insert these two types, while an F bit detecting unit must detect the respective types. As a result, the size of circuitry may become large.

Additionally, if the multiplexing device of the conventional (b) type is opposed to that of the conventional type (a), the conventional type (a) does not include the F bit inserting and detecting units which can process one of the two F bit types although the other of the F bit types can be inserted and detected within the conventional type (a). Accordingly, switching to the relay exchange mode cannot be made, so that the conventional types (a) and (b) cannot be opposed and used together.

SUMMARY OF THE INVENTION

An object of the present invention is to provide a multiplexing device which prevents signal formats from mismatching by switching to the relay exchange mode after verifying the connections of voice paths of a relay exchange, and can oppose the multiplexing device of a conventional type (a), with circuitry reduced in size by limiting the bit pattern of a signal used as an F bit to one type.

The multiplexing device according to the present invention comprises a transmitting unit, a receiving unit, a controlling unit, a first periodic signal inserting unit, a second periodic signal inserting unit, an operating mode switching unit, and a periodic signal inserting unit.

In a first aspect of the present invention, the transmitting unit bypasses the process for switching data received from a network side, and transmits the data to an exchange side. The receiving unit bypasses the process for the data, which is received from the exchange and is bypassed by the transmitting unit. The controlling unit controls the bypass operations of the data after verifying the connections on both sides of a bidirectional communication path by using a single pattern as a synchronous bit pattern.

In a second aspect of the preset invention, the first periodic signal inserting unit inserts a first periodic signal which periodically or intermittently includes one or more predetermined bit patterns, in a signal to be output to the multiplexing device on an opposing side, and outputs the signal to an exchange side, when the path from the multiplexing device on the opposing side is not connected. The second periodic signal inserting unit inserts a second periodic signal, which periodically or intermittently includes one or more bit patterns identical to the predetermined bit patterns or one or more different bit patterns in addition to the one or more predetermined bit patterns, in the signal to be output to the multiplexing device on the opposing side, and outputs the signal to the exchange side, from a time point at which the first periodic signal inserted by the first periodic signal inserting unit on the opposing side is detected within a signal input from the exchange after the path from the multiplexing device on the opposing side is connected. The operating mode switching unit switches its local multiplexing device to the relay exchange mode for relaying an input signal without coding or decoding it upon detection of the second periodic signal that the second periodic signal inserting means on the opposing side inserts in the signal input from an exchange, and relays the input signal.

In a third aspect of the present invention, the periodic signal inserting unit inserts a periodic signal which periodically or intermittently includes one or more predetermined bit patterns, in a signal to be output to the multiplexing device on an opposing side, and outputs the signal to an exchange side, from when the change from a disconnected state to a connected state of the path from the multiplexing device on an opposing side is detected based on the change from the voiceless to the voiced state of the signal input from the exchange. The operating mode switching unit switches its local multiplexing device to the relay exchange mode for relaying an input signal without coding or decoding it upon detection of the periodic signal that the above described periodic signal inserting unit on the opposing side inserts in the signal input from the exchange after the path from the multiplexing device on the opposing side is connected, and relays the input signal.

In a fourth aspect of the present invention, the first periodic signal inserting unit inserts a first periodic signal which periodically or intermittently includes one or more predetermined bit patterns and a bit having a predetermined value, in the signal to be output to the multiplexing device on an opposing side, and outputs the signal to an exchange side, when the path from the multiplexing device on the opposing side is not connected. The second periodic signal inserting unit inserts a second periodic signal which periodically or intermittently includes one or more predetermined bit patterns and the bit having the value obtained by inverting the predetermined value of the bit, which are included in the above described first periodic signal, in the signal to be output to the multiplexing device on the opposing side, and outputs the signal to the exchange side, from when one or more predetermined bit patterns included in the first periodic signal that the first periodic signal inserting unit inserts in the signal input from the exchange are detected after the path from the multiplexing device on the opposing side is connected. The operating mode switching unit switches its local multiplexing device to the relay exchange mode for relaying an input signal without coding or decoding it upon detection of the inversion of the predetermined value of the bit included in the second periodic signal that the second periodic signal outputting unit on the opposing side inserts, within the signal input from the exchange.

BRIEF DESCRIPTION OF THE DRAWINGS

The present invention will be more apparent from the following detailed description, when taken in conjunction with the accompanying drawings, in which:

FIG. 1O is a time chart showing the connection operations performed by the multiplexing device of the conventional type (a), when the A side calls the D side, and a downstream is initially connected;

FIG. 14 is a diagram for explaining the progress of switching to relay exchange mode according to the second preferred embodiment;

FIG. 41A is a time chart showing the connection operations performed when an A side originates a call to a D side, and an upstream is initially connected, according to the present invention;

FIG. 43 is a schematic diagram for explaining the process for loading a program into a computer included in the multiplexing device according to the present invention.

DESCRIPTION OF THE PREFERRED EMBODIMENTS

Figure 2A:
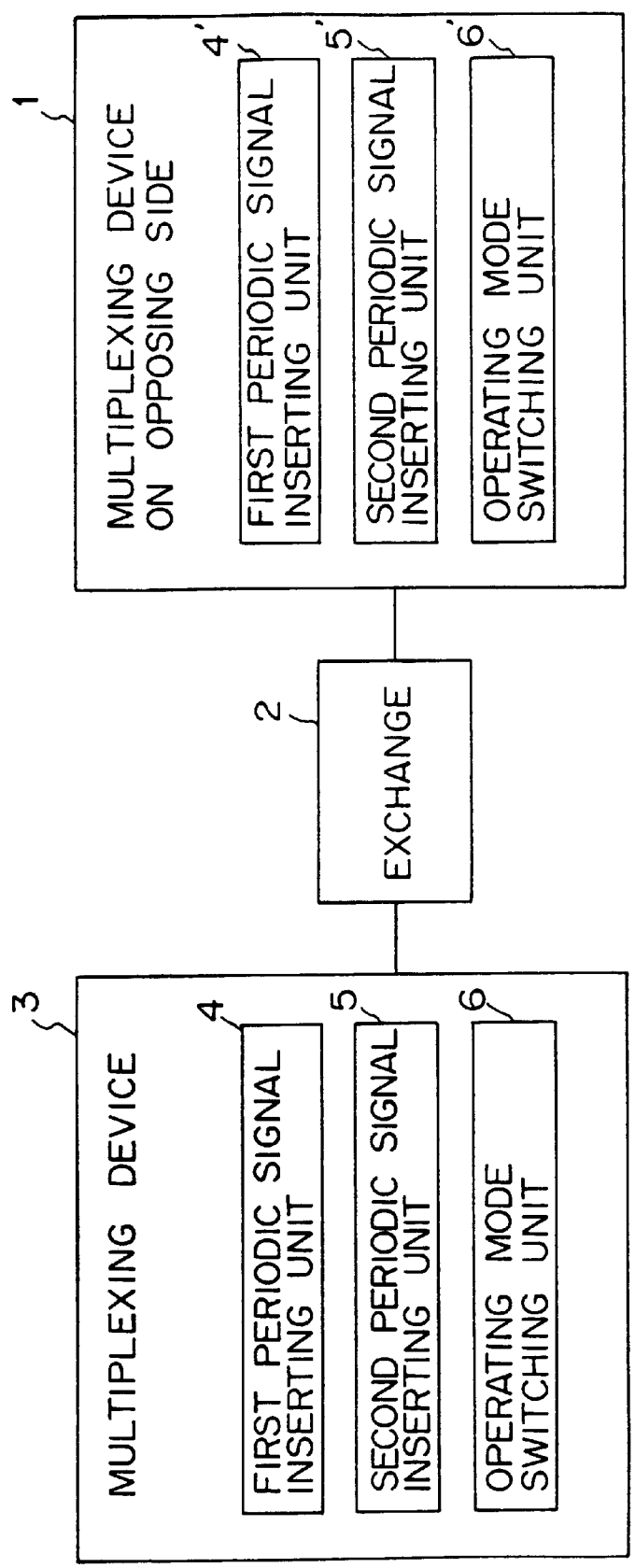
FIG. 2A is a block diagram showing the principle of the present invention.

FIG. 2A is a block diagram showing a first principle of the present invention. FIG. 2A shows the configuration of a multiplexing device 3 which opposes a multiplexing device 1 on an opposing side via an exchange 2, and can implement a digital 1-link relay capability. Also the multiplexing device 1 on the opposing side has the same configuration as that of the multiplexing device 3.

In FIG. 2A, a first periodic signal inserting unit 4 inserts a first periodic signal which periodically includes one or more predetermined bit patterns such as "10" in the signal to be output to the multiplexing device 1 on the opposing side, and outputs the signal to an exchange 2 side, when the path from the multiplexing device 1 on the opposing side is not connected, in a signal to be output to the multiplexing device on the opposing side.

A second periodic signal inserting unit 5 inserts a second periodic signal which periodically includes, for example, the above described predetermined bit patterns, the number of which is larger than that in the first periodic signal, in the signal to be output to the multiplexing device 1 on the opposing side, and outputs the signal to the exchange 2 side, from when the first periodic signal that a first periodic signal inserting unit 4' on the opposing side inserts in the signal input from the exchange 2 side after the path from the multiplexing device 1 on the opposing side is connected.

An operating mode switching unit 6 switches the multiplexing device 3 to the relay exchange mode for relaying an input signal without coding/decoding the input signal upon detection of the second periodic signal that a second periodic signal inserting unit 5' on the opposing side inserts from the signal input from the exchange 2, and relays the input signal.

According to the first principle of the present invention, when the bidirectional path within the exchange 2 is not connected, the multiplexing devices 1 and 3 on both of the sides of the exchange 2 respectively output the signal in which the first periodic signal is inserted to the exchange 2 side.

When the path in one direction within the exchange 2 is connected, for example, the multiplexing device 3 which has received the signal in which the first periodic signal is inserted, over this path, outputs the signal in which the second periodic signal is inserted to the exchange 2. The multiplexing device 1 on the opposing side receives this signal, detects the second periodic signal within the input signal, and switches the multiplexing device 1 itself to the relay exchange mode. Since the multiplexing device 1 detects also the first periodic signal at this time, it inserts the second periodic signal in the signal to be output to the multiplexing device 3 side, and outputs the signal to the exchange 2. This signal is received by the multiplexing device 3, which also switches its operating mode to the relay exchange mode. Here, the operations for switching to the relay exchange mode are completed.

As described above, according to the first principle of the present invention, the multiplexing devices on both sides of the exchange switch their operating modes to the relay exchange mode almost at the same time, after the bidirectional path within an exchange is connected.

Additionally, according to a second principle of the present invention, only one periodic signal inserting unit is used instead of both of the first and second periodic signal inserting units 4 and 5 according to the first principle of the present invention. This periodic signal inserting unit detects the change from the disconnected to connected state of the path from the multiplexing device 1 on the opposing side, based on the change from the voiceless to the voiced state of the signal input from the exchange 2, inserts the periodic signal which periodically includes, for example, one or more predetermined consecutive bit patterns in the signal to be output to the multiplexing device 1 on the opposing side, and outputs the signal to the exchange 2, after the change of the path state is detected.

An operating mode switching unit is included in a similar manner as in the multiplexing devices 1 and 3 shown in FIG. 2A. The operating mode switching unit switches a local multiplexing device itself to the relay exchange mode upon detection of the periodic signal inserted by the periodic signal inserting unit on the opposing side, in the signal input from the exchange after the path from the multiplexing device 1 on the opposing side is connected, and relays the input signal.

According to the second principle of the present invention, a periodic signal is inserted, for example, on the multiplexing device 3 side to which a voice signal is input, when the path in one direction within the exchange 2 is connected, and the inserted signal is output to the multiplexing device 1 on the opposing side. However, switching to the relay exchange mode is not made at this time point on the multiplexing device 3 side.

When the path in the other direction is connected, the multiplexing device 1 on the opposing side, to which the signal from that path is input, detects the periodic signal, switches its operating mode to the relay exchange mode, and outputs the signal in which the periodic signal is inserted to the multiplexing device 3 side over the path which was previously connected. The multiplexing device 3 side switches its operating mode to the relay exchange mode upon receipt of this signal.

According to a third principle of the present invention, two periodic signal inserting units 4 and 5 are used in a similar manner as in FIG. 2A. A first periodic signal inserting unit 4 outputs the signal in which a first periodic signal which periodically includes one or more predetermined bit patterns, for example, F bits, and a bit having a predetermined value, for example, an S bit to the multiplexing device 1 on the opposing side, when the path from the multiplexing device 1 on the opposing side is not connected.

A second periodic signal inserting unit 5 inverts the predetermined value of the bit included in the first periodic signal, uses this signal as a second periodic signal, and outputs the second periodic signal to the multiplexing device 1 on the opposing side, after the path from the multiplexing device 1 on the opposing side is connected and one or more bit patterns included in the first period signal, for example, F bits, are detected within the signal input from the exchange 2.

An operating mode switching unit 6 makes switching to the relay exchange mode upon detection of the inverted value of the above described bit within the signal input from the exchange, and relays the input signal.

According to the third principle of the present invention, the signal which periodically includes one or more bit patterns in each of which the value of the bit at a predetermined position is inverted may be used as the first periodic signal instead of using one or more consecutive bit patterns and a bit having a predetermined value, as described above. In this case, the second periodic signal inserting unit 5 further inverts the value of the bit at the predetermined position, and uses this signal as the second periodic signal. In the meantime, the operating mode switching unit 6 switches the multiplexing device 3 to the relay exchange mode upon detection of the further inverted value of the bit at the predetermined position.

As described above, according to the present invention, multiplexing devices on both sides of an exchange switch themselves to the relay exchange mode almost at the same time, after the paths in both of the directions within an exchange are connected. Consequently, the signal states in a communications system can be prevented from mismatching.

Provided first is the explanation about a first preferred embodiment according to the present invention. As a pattern used for F bits implemented in the first preferred embodiment, for example, "10" is used. For example, F bits including "10" patterns the number of which is 3 are referred to as consecutive F bits, while F bits including "10" patterns the number of which is 5 are referred to as consecutive F bits.

Figure 2B:
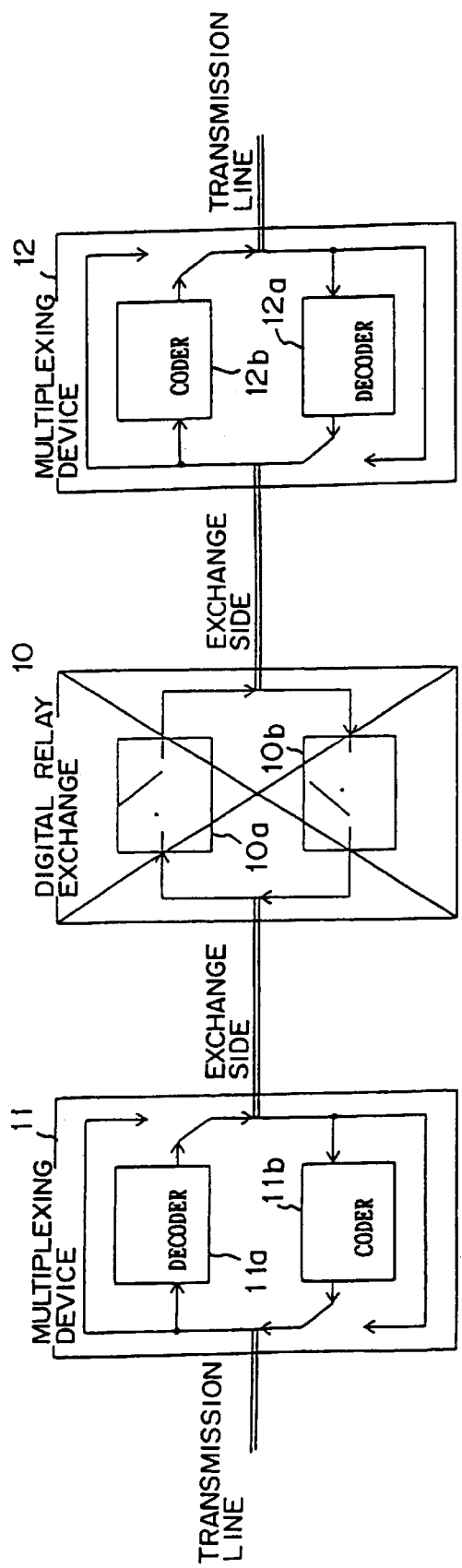
FIG. 2B is a schematic diagram for explaining the system for switching to the relay exchange mode, according to a first preferred embodiment (No. 1)
Figure 3:
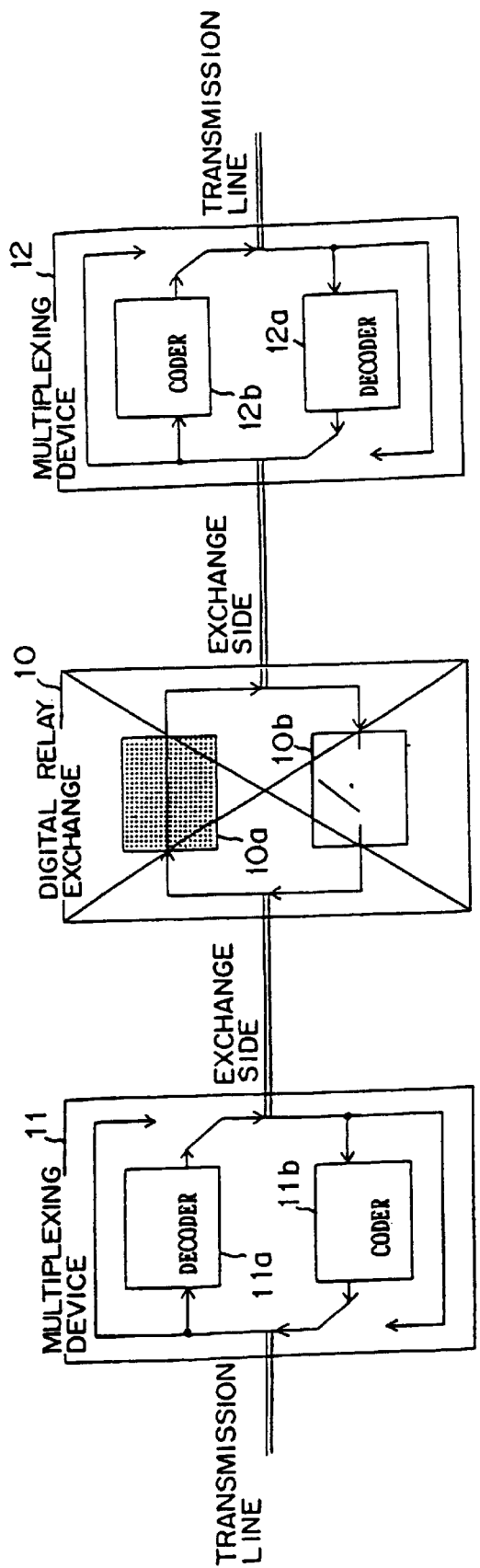
FIG. 3 is a schematic diagram for explaining the system for switching to the relay exchange mode, according to the first preferred embodiment (No. 2)
Figure 4:
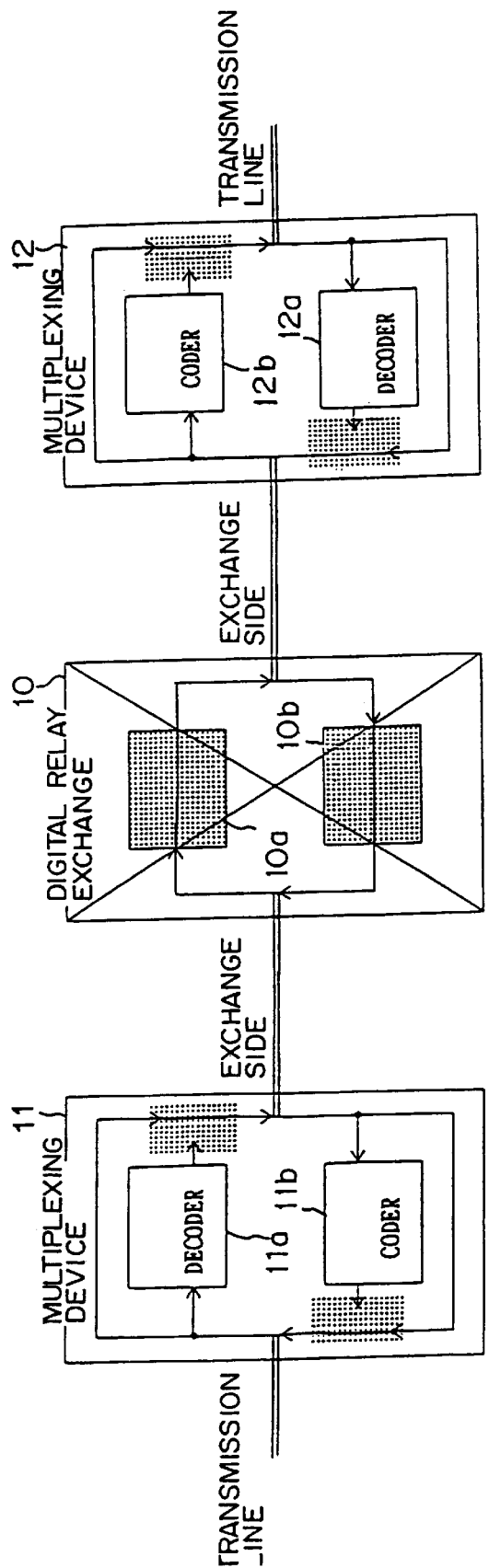
FIG. 4 is a schematic diagram for explaining the system for switching to the relay exchange mode, according to the first preferred embodiment (No. 3)

Provided next is the explanation about the system for switching to the relay exchange mode by using these consecutive and inconsecutive F bits, by referring to FIGS. 2B, 3, and 4. FIG. 2B shows the state where the paths in both of the directions between two multiplexing devices 11 and 12 are not connected within a digital relay exchange 10. In this state, all of decoders 11a and 12a and coders 11b and 12b, which are included in the respective multiplexing devices 11 and 12, are connected between the transmission lines and the digital relay exchange 10, and both of the multiplexing devices 11 and 12 are not switched to the relay exchange mode. The inconsecutive F bits are respectively inserted in the outputs of the decoders 11a and 12a by F bit inserting units, which are not shown in FIG. 2B, within the multiplexing devices 11 and 12, and are output to the relay exchange 10.

FIG. 3 shows the state where one of the paths 10a is connected within the digital relay exchange 10. If either of the paths is connected in such a way, the voice signal in which the inconsecutive F bits output from the multiplexing device 11 are inserted is input to the multiplexing device 12 side, and the inconsecutive F bits inserted in the output of the decoder 12a are changed to consecutive F bits by detecting the inconsecutive F bits. Since the other of the paths 10b is not connected at this time, these consecutive F bits are never input to the multiplexing device 11 side.

FIG. 4 shows the state where also the other of the paths 10b is connected. In this state, the multiplexing device 11 detects the consecutive F bits output from the multiplexing device 12. As a result of this detection, the multiplexing device 11 switches its operating mode to the relay exchange mode. The decoder 11a and the coder 11b, which are included in the multiplexing device 11, are respectively disconnected from the transmission line or the digital relay exchange 10. The multiplexing device 11 then begins to operate in the relay exchange mode for directly connecting the transmission line and the digital relay exchange 10.

As described above, the consecutive F bit signal is a signal which consecutively includes 5 or more "10" patterns, while the inconsecutive F bit signal which consecutively includes, for example, only 3 "10" patterns. Therefore, the multiplexing device 11 detects the input of the consecutive F bits output from the multiplexing device 12, and also the input of the inconsecutive F bits as a matter of course.

Accordingly, the multiplexing device 11 changes the inconsecutive F bits output to the digital relay exchange 10 side to the consecutive F bits, inserts the consecutive F bits in the output of the decoder 11a, and outputs the signal including the consecutive F bits to the digital relay exchange 10. The consecutive F bits are input to the multiplexing device 12 via the path 10a, and the multiplexing device 12 detects the input of the consecutive F bits, and switches its operating mode to the relay exchange mode. As a result, also the multiplexing device 12 side enters the state where the exchange and the corresponding transmission line are directly and substantially connected.

Figure 5:
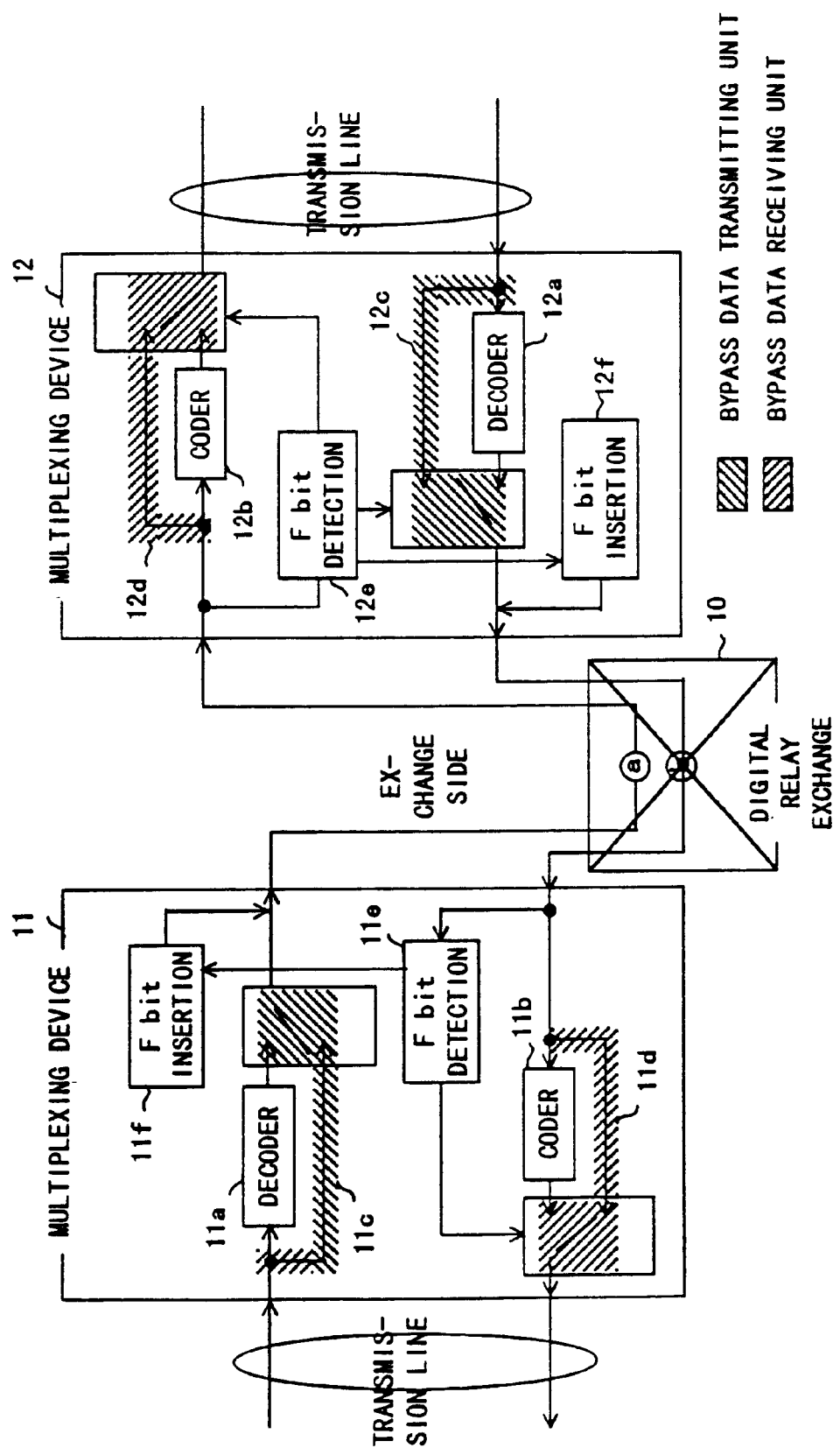
FIG. 5 is a schematic diagram for explaining the operations performed by the multiplexing device according to the first preferred embodiment.

FIG. 5 is a schematic diagram explaining the operations performed by the multiplexing devices 11 and 12 shown in FIGS. 2 through 4. The multiplexing devices 11 and 12 have identical configurations. For example, the multiplexing device 11 comprises a bypass data transmitting unit 11c for transmitting the signal input from a transmission line to the exchange side not via the decoder 11a in the relay exchange mode; and a bypass data receiving unit lid for outputting the signal input from the digital relay exchange 10 to the transmission line side unchanged not via the coder 11b. F bit detection 11e operations are performed for the data input from the exchange side, while F bit insertion 11f operations are performed for the data to be output to the exchange side.

Figure 6:
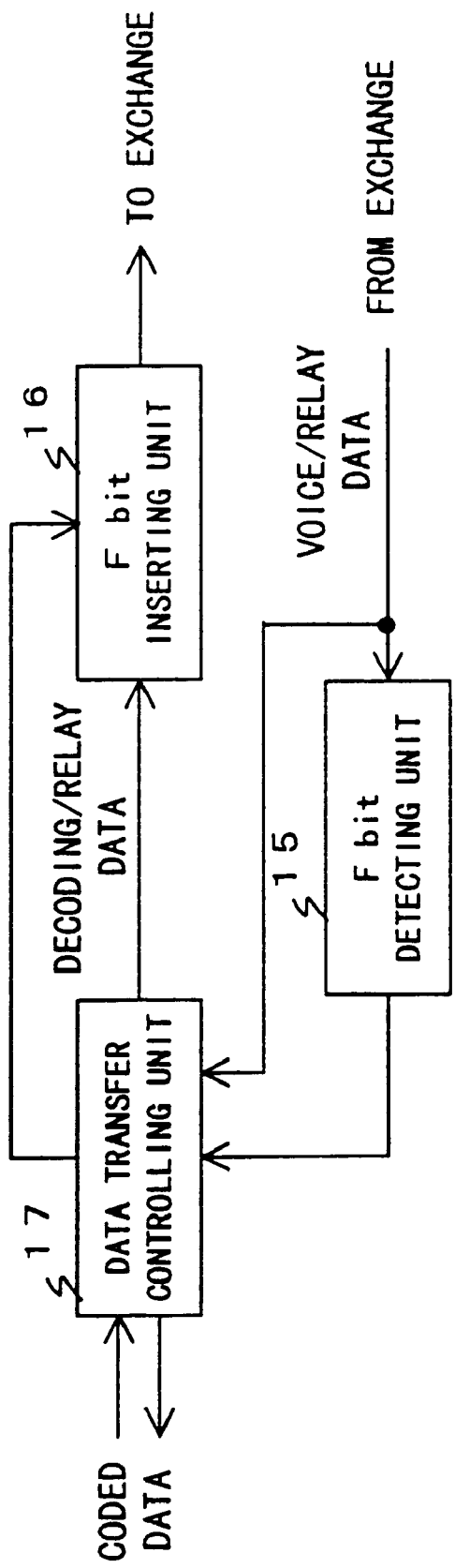
FIG. 6 is a block diagram showing the configuration of the multiplexing device according to the first preferred embodiment.

FIG. 6 is a block diagram showing the configuration of the multiplexing device. In this figure, the multiplexing device comprises: an F bit detecting unit 15 for detecting F bits from the voice data input from an exchange side; an F bit inserting unit for inserting F bits in the data to be output to the exchange side; and a data transfer controlling unit 17 for inputting/outputting coded data to/from a transmission line. The data transfer controlling unit 17 controls a data transfer for the voice data input from the exchange side and the output of the F bit detecting unit 15, and provides the decoding/relay data to be output to the exchange side to the F bit inserting unit 16. The details of the F bit detecting unit 15, the F bit inserting unit 16, and the data transfer controlling unit 17 will be described later.

Figure 7:
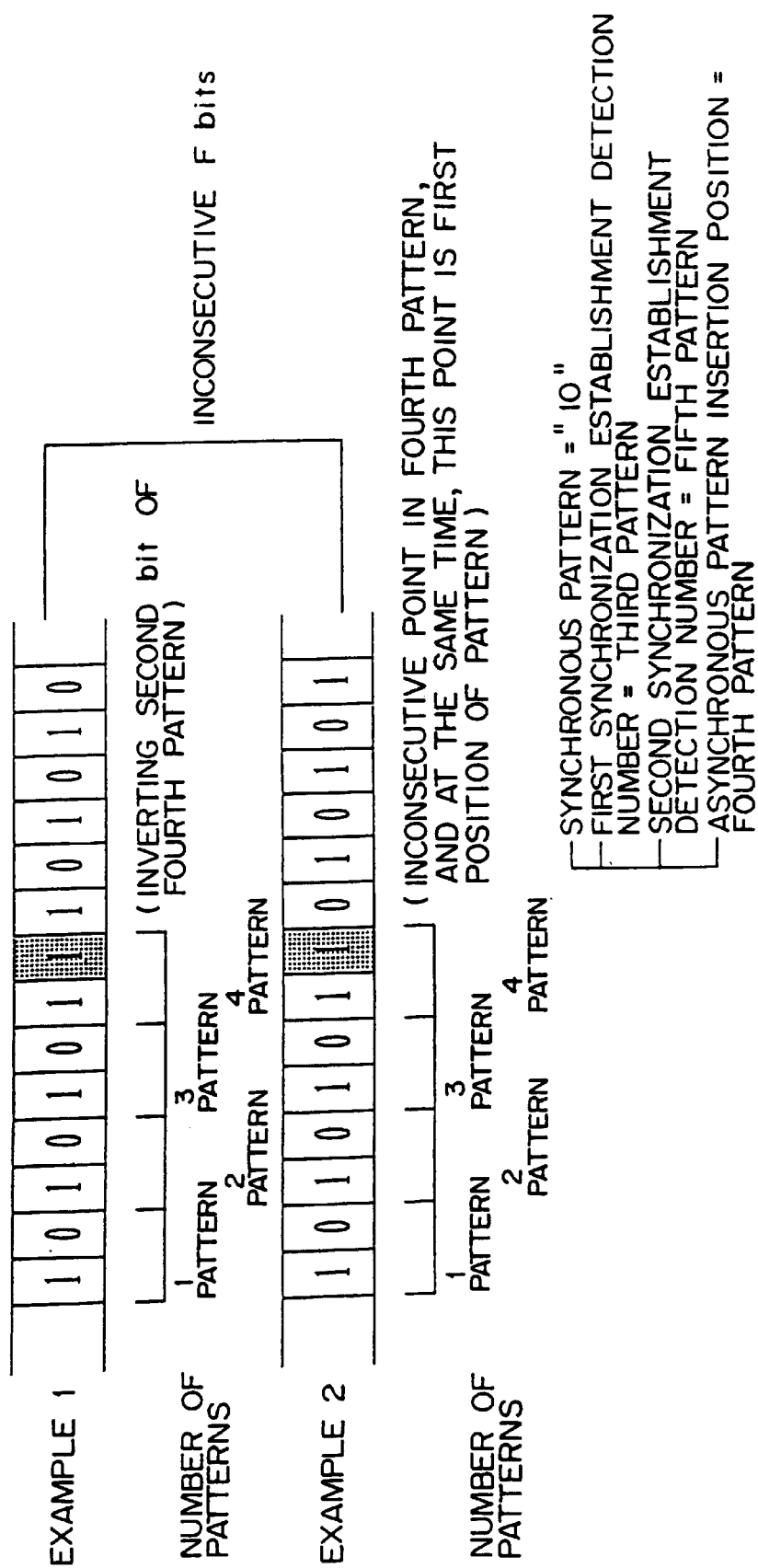
FIG. 7 is a diagram for explaining inconsecutive F bits used in the first preferred embodiment.

FIG. 7 is a diagram for explaining the inconsecutive F bits used in the first preferred embodiment. As described above, the synchronization pattern used for F bits is "10", and the inconsecutive F bits consecutively include three "10" patterns. In the example 1 shown in FIG. 7, the value of the second bit in the fourth synchronous pattern is inverted from "0" to "1", and then the synchronous pattern "10" inserted in the fifth and subsequent patterns. In the example 2, after the value of the second bit in the fourth pattern is inverted to "1", the synchronous pattern is inserted so that the second bit in the fourth pattern and the first bit in the fifth pattern newly form the synchronous pattern.

Here, the number of synchronous patterns to be consecutively inserted for the inconsecutive F bits, that is, 3 patterns, is hereinafter referred to as a first synchronization establishment detection number. When this number of patterns is detected within an input signal, a multiplexing device changes these inconsecutive F bits to be inserted in the signal output to an opposing side via an exchange, to consecutive F bits.

Figure 8:
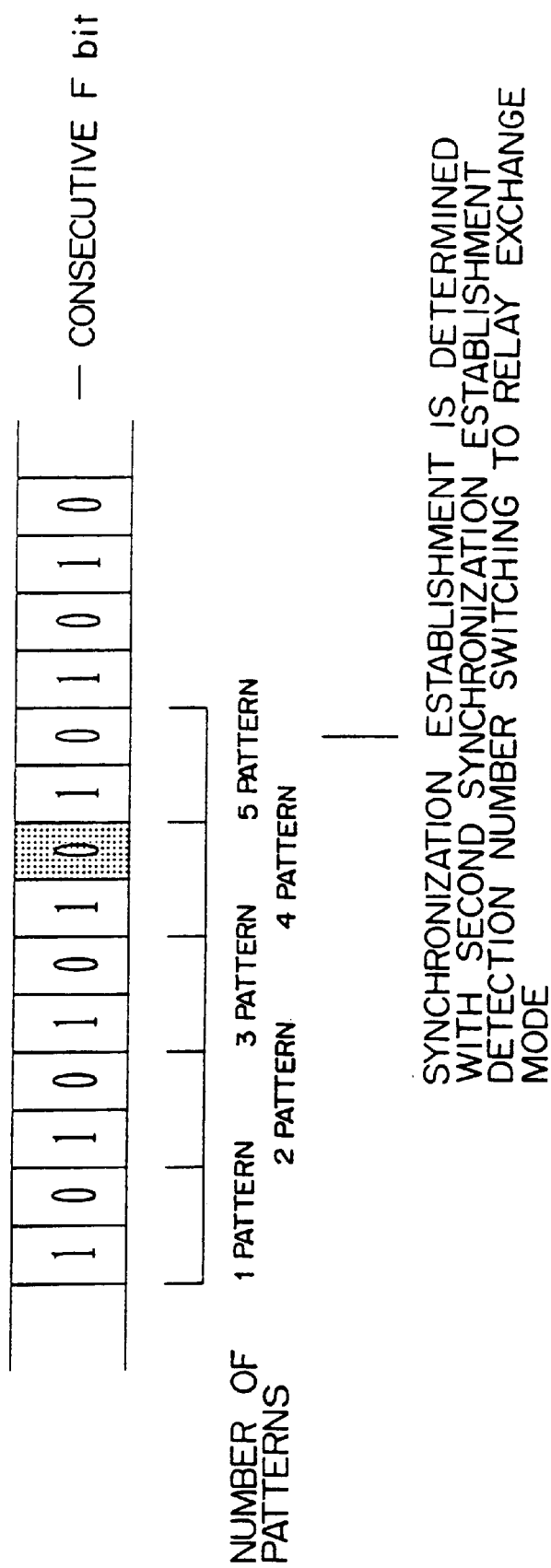
FIG. 8 is a diagram for explaining consecutive F bits used in the first preferred embodiment.

FIG. 8 is a diagram for explaining consecutive F bits. When the input of the consecutive F bits is detected, a multiplexing device switches its operating mode to the relay exchange mode. Here, the number of synchronous patterns, which is intended to detect the consecutive F bits, is assumed to be "5". This number of synchronous patterns is hereinafter referred to as a second synchronization establishment detection number. Whether F bits are either inconsecutive or consecutive is determined according to the contents of the fourth pattern, as referred to in the explanation about the example 1 shown in FIG. 7. Therefore, the fourth pattern is hereinafter referred to as an asynchronous pattern insertion position.

Figure 9:
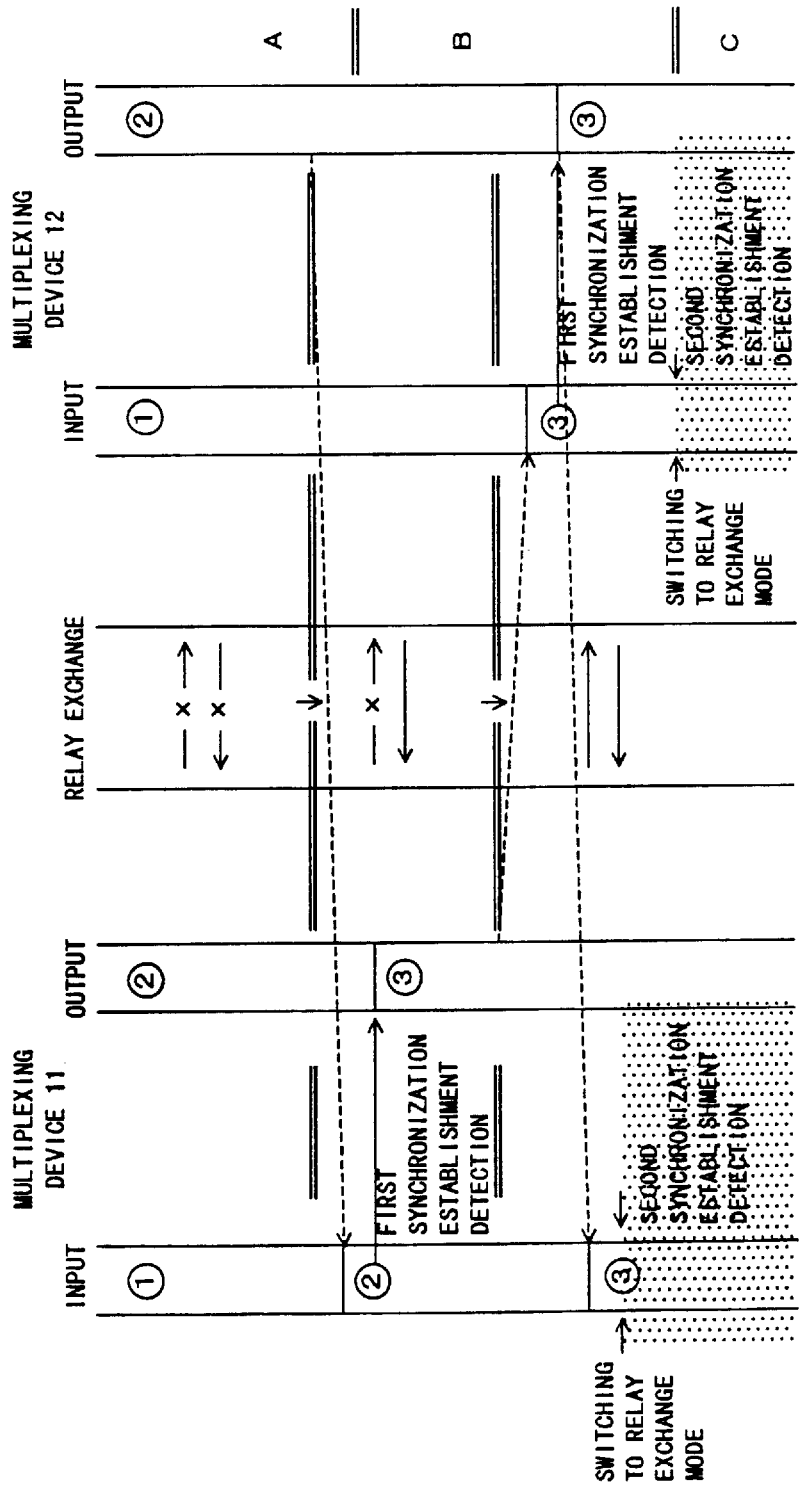
FIG. 9 is a diagram for explaining the progress of switching to the relay exchange mode according to the first preferred embodiment.

FIG. 9 is a diagram explaining the progress of the operations for switching to the relay exchange mode, which are performed in the first preferred embodiment. Here, the switching to the relay exchange mode will be explained based on the assumption that the path from the multiplexing device 12 to the multiplexing device 11, that is, [b] (circled characters and numbers shown in the drawings are hereinafter denoted by being bracketed in this specification), which is shown in FIG. 5, is initially connected in FIG. 9.

When the paths in both of the directions within an exchange are not connected, each of the multiplexing devices 11 and 12 outputs the signal [2] obtained by inserting the inconsecutive F bits in a signal [1] to the multiplexing device on an opposing side. This state is illustrated in "A" of FIG. 9.

When the path from the multiplexing device 12 to the multiplexing device 11 is connected, the multiplexing device 11 side detects the first synchronization establishment detection number, that is, the inconsecutive F bits including 3 synchronization patterns from the input signal, inserts the consecutive F bits in the signal to be output from the multiplexing device 11 itself to the multiplexing device 12 side instead of the inconsecutive F bits, and outputs the signal [3] to the exchange side on the multiplexing device 11 side.

When the path from the multiplexing device 11 to the multiplexing device 12 is connected, the multiplexing device 12 side detects the synchronous patterns the numbers of which are equal to the first and second synchronization establishment detection numbers "3" and "5" from the input signal, changes the F bits to be inserted in the signal output to the multiplexing device 11 side to the consecutive F bits (up to this operation is the state "B"), and switches its operating mode to the relay exchange mode.

Because the path from the multiplexing device 12 to the multiplexing device 11 was previously connected, the signal [3] which the consecutive F bits are inserted in and is output from the multiplexing device 12, is input to the multiplexing device 11. Also the multiplexing device 11 side detects the second synchronization establishment, and switches its operating mode to the relay exchange mode. This is the state "C".

With the above described switching progress, the switchings to the relay exchange mode are made almost at the same time. As a result, a voice communication is enabled while a call is being connected by a relay exchange, thereby preventing a ring-back tone from being muffled due to the mismatch between the switching forms of opposing CODECs.

Provided next is the explanation about a second preferred embodiment according to the present invention. In the second preferred embodiment, F bits are started to be inserted in a voice signal when the change from the voiceless to the voiced state of an input signal is detected within a multiplexing device by using the phenomenon that a voiceless code (FFh or 7Fh based on $\mu$LAW) is normally output from a digital relay exchange to the multiplexing device when a path is not connected.

Figure 10:
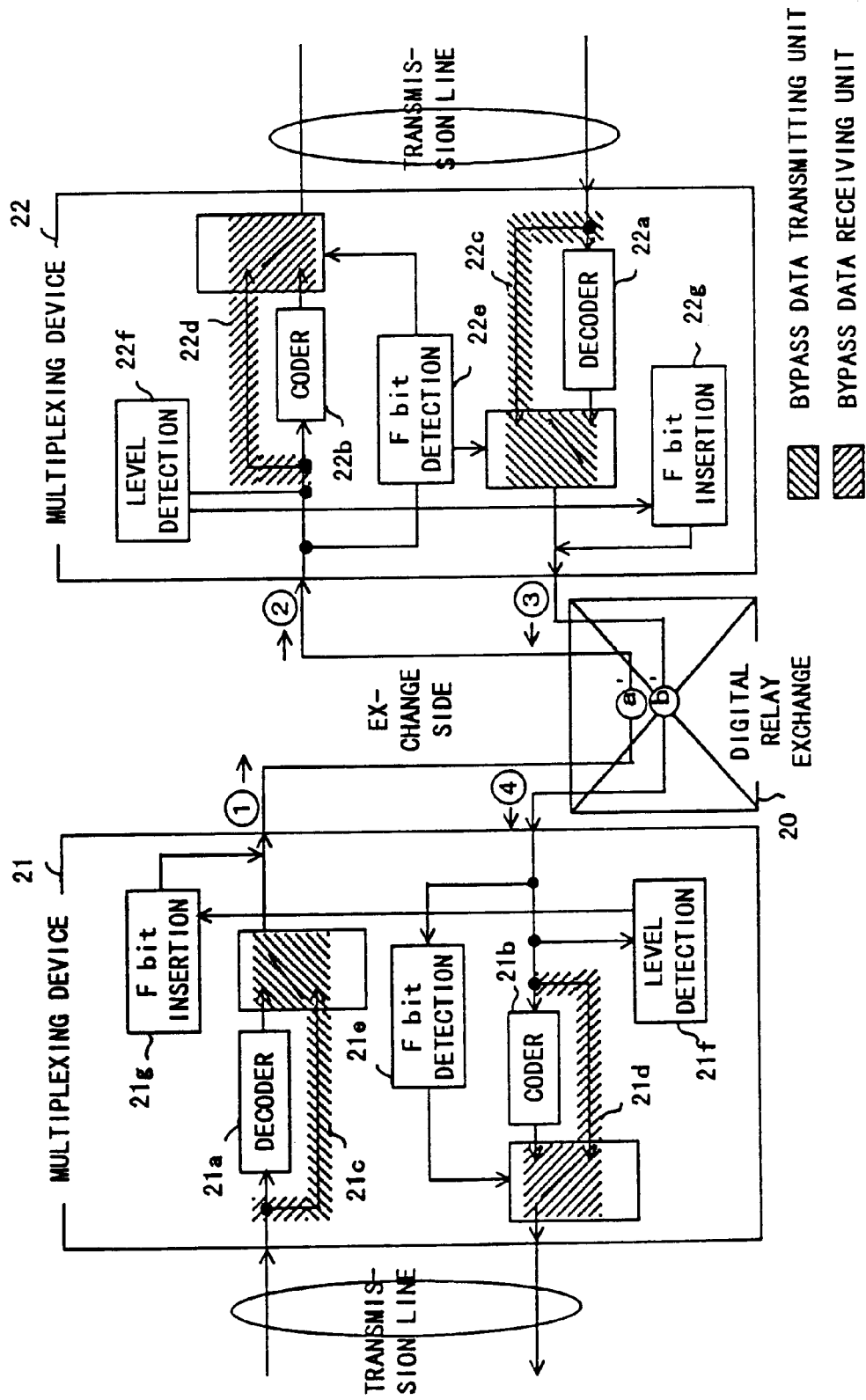
FIG. 10 is a schematic diagram for explaining the operations of the multiplexing device according to the second preferred embodiment.
Figure 11:
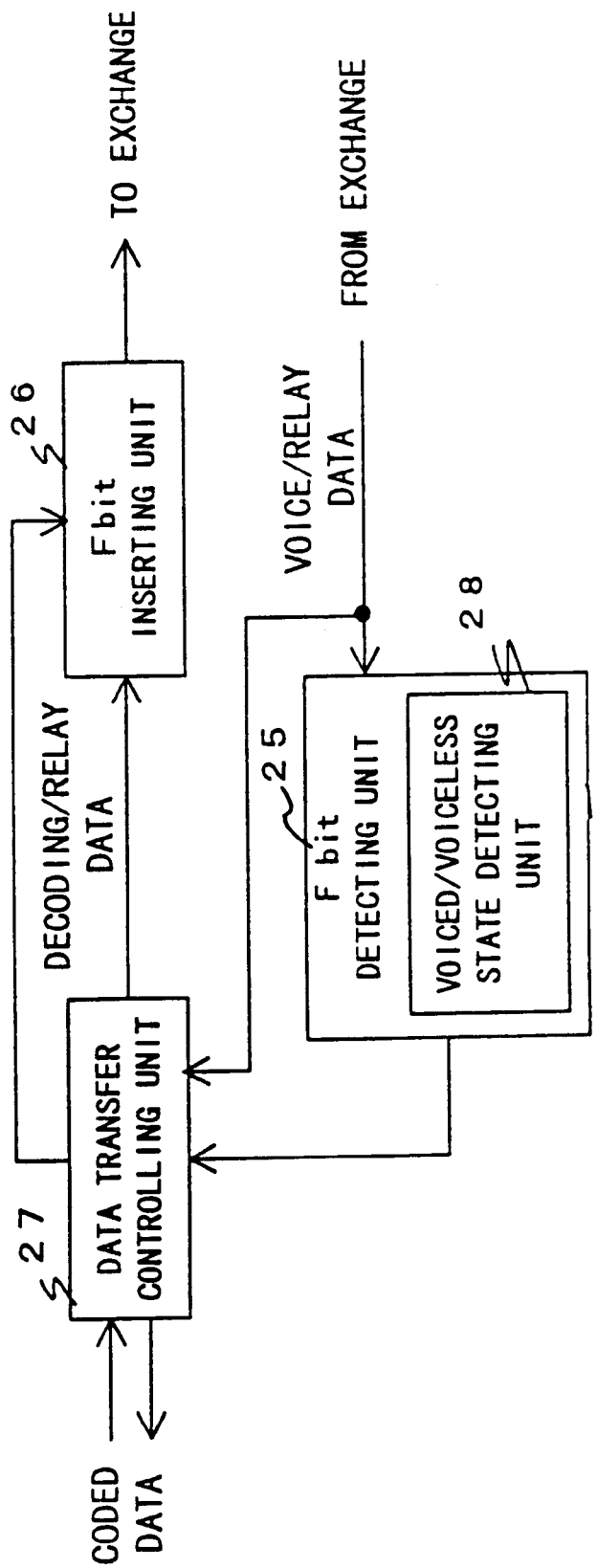
FIG. 11 is a block diagram showing the configuration of the multiplexing device according to the second preferred embodiment.

FIG. 10 is a schematic diagram explaining the operations of the multiplexing device according to the second preferred embodiment, while FIG. 11 is a block diagram showing the configuration of the multiplexing device. FIGS. 10 and 11 are almost the same as FIGS. 5 and 6 showing the first preferred embodiment. However, for example, there is a difference in that the multiplexing device shown in FIG. 11 further comprises a voiced/voiceless state detecting unit 28 for the data output from an exchange.

Provided next is the explanation about a method for switching to the relay exchange mode, which is implemented according to the second preferred embodiment, by referring to FIG. 10. If the paths in both of the directions within a digital relay exchange are not connected in FIG. 10, neither of multiplexing devices 21 and 22 insert F bits. If one of the paths, [a]' in FIG. 10, is connected, the multiplexing device 22 detects the voiced state of an input signal [2], and outputs the signal in which F bits are inserted to an exchange. Since the other of the paths [b]' is not connected on the multiplexing device 21 side at this time, the multiplexing device 21 detects the voiceless state of an input signal [4] and does not insert F bits in the signal [1] to be output to an exchange side.

When the other of the paths [b]' is connected, the voice signal [4] in which F bits are inserted by the multiplexing device 22 is input to the multiplexing device 21. The multiplexing device 21 detects the voiced state of the input signal, inserts F bits in the signal [1] to be output to the exchange side, detects the F bits, and switches its operating mode to the relay exchange mode. Since the path [a]' from the multiplexing device 21 to the multiplexing device 22 was previously connected, the multiplexing device 22 detects the F bits from the input signal [2], and switches its operating mode to the relay exchange mode.

Figure 12:
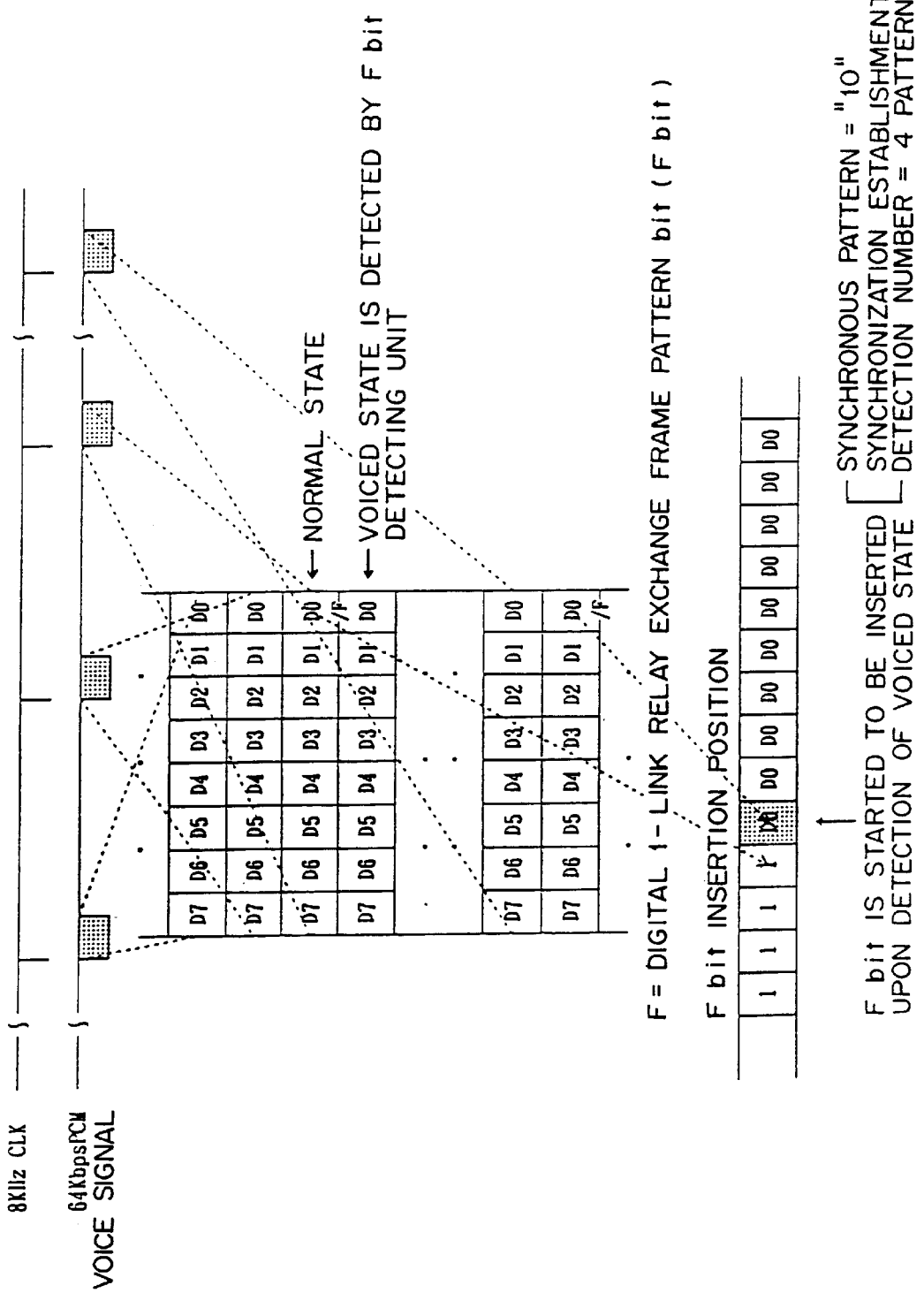
FIG. 12 is a diagram for explaining the method for inserting F bits according to the second preferred embodiment.

FIG. 12 is a diagram for explaining the method for inserting F bits, according to the second preferred embodiment. As shown in the upper part of FIG. 12, one of 4 LSBs, that is, one of 4 "DOs" of the 8 bits of a PCM signal, is selected as an F bit insertion position when a voiced state is detected. The data "DOs" are replaced with an F bit pattern. The insertion of the F bit pattern is started when the contents of the LSBs selected as F bit insertion positions are changed from the state where the values of LSBs are consecutively "1", that is, the voiceless state to the state where the data "DOs" are included, that is, the voiced state.

Figure 13:
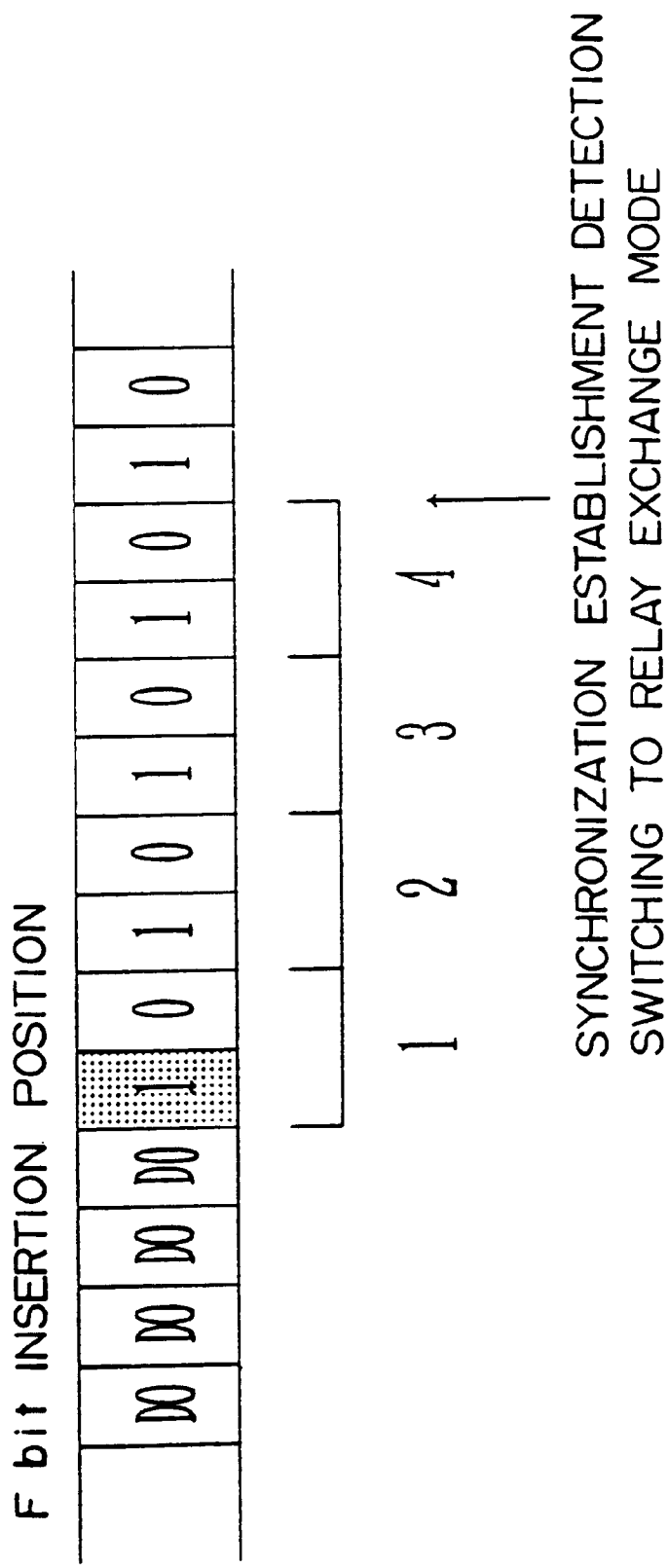
FIG. 13 shows the result of the insertion of F bits in a voiced signal.

FIG. 13 shows the result of the insertion of F bits in a voiced signal. When a voiced state is detected, the synchronous pattern "10" is consecutively inserted instead of data "DOs" of the LSBs in which F bits must be inserted. The synchronization establishment detection number for switching to the relay exchange mode is assumed to be "4" in the second preferred embodiment. When the voiced state is detected and the synchronous pattern is started to be inserted as F bits as described above, the synchronous pattern "10" is continues to be inserted without a limitation on its number such as 4 or 5, while the operation for inserting F bits is performed.

FIG. 14 is a diagram explaining the progress of the operations for switching to the relay exchange mode, according to the second preferred embodiment of the present invention. When both of the paths within a relay exchange are not connected in FIG. 14, the relay exchange outputs a voiceless signal [1] to multiplexing devices 21 and 22, both of which output a signal [2] in which F bits are not inserted to their exchange sides. This is the state A.

When the path in the direction from the multiplexing device 22 to the multiplexing device 21 is connected, the multiplexing device 21 detects the voiced state of an input signal, and outputs the signal [3] obtained by inserting F bits in the output of a decoder to the exchange side. Because the path to the multiplexing device 22 is yet to be connected at this time, the multiplexing device 22 side continues to detect the voiceless state of the input signal.

When also the path from the multiplexing device 21 to the multiplexing device 22 is connected, the multiplexing device 22 detects synchronization establishment from the input of the signal [3] which F bits are inserted in and is output from the multiplexing device 21, switches its operating mode to the relay exchange mode, and detects the voiced state of the input signal. Therefore, the multiplexing device 22 outputs the signal [3] in which F bits are inserted to the multiplexing device 21 via the exchange as the signal to be output to the exchange side. Up to this operation is the state "B".

Because the path to the multiplexing device 21 was previously connected, the multiplexing device 21 detects the input of the signal which the F bits are inserted in and is output from the multiplexing device 22, detects synchronization establishment, and switches its operating mode to the relay exchange mode. Consequently, both of the multiplexing devices 21 and 22 operate in the relay exchange mode. This state is C.

Provided next is the explanation about a third preferred embodiment according to the present invention. In the third preferred embodiment, the connection state of a voice path is determined depending on the content of a status (S) bit in addition to that of an F bit, and switching to the relay exchange mode is made based on the result of the determination. F bits themselves are always inserted in a voice signal in a similar manner as in the first preferred embodiment.

Figure 15:
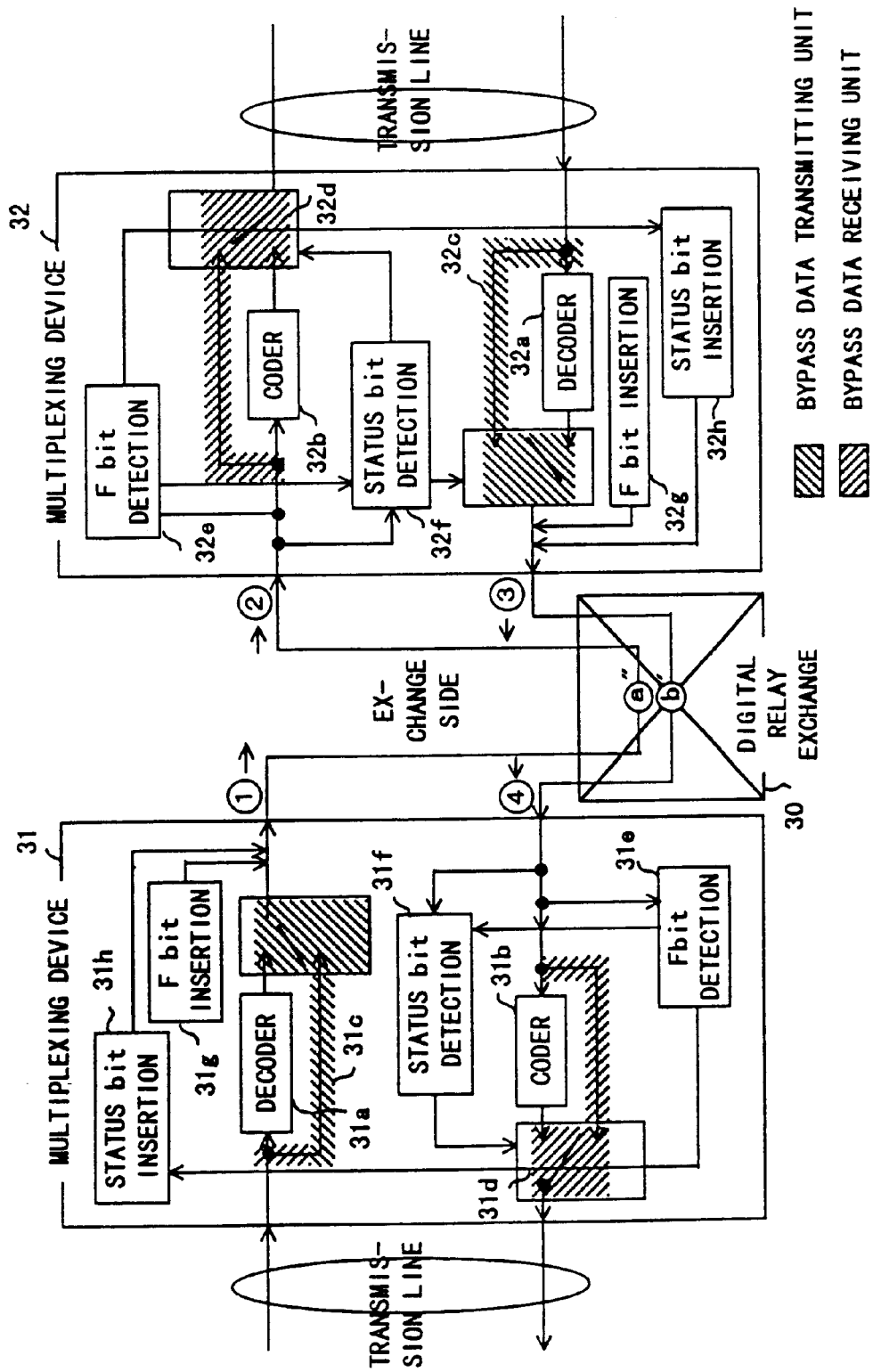
FIG. 15 is a schematic diagram for explaining the operations of a multiplexing device according to the third preferred embodiment.
Figure 16:
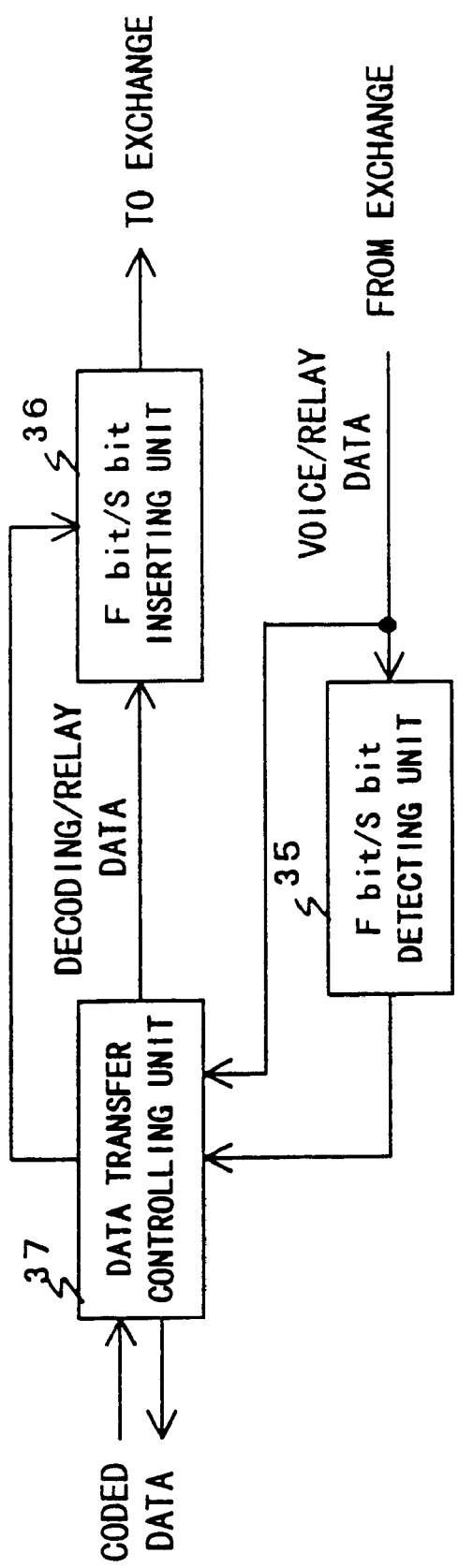
FIG. 16 is a block diagram showing the configuration of the multiplexing device according to the third preferred embodiment.

FIG. 15 is a schematic diagram explaining the operations of the multiplexing device according to the third preferred embodiment, while FIG. 16 is a block diagram showing the configuration of the multiplexing device according to the third preferred embodiment. FIGS. 15 and 16 are almost the same as FIGS. 5 and 6 showing the first preferred embodiment. However, for example, there is a difference in that an F bit/S bit detecting unit 35 for detecting an S bit in addition to an F bit from the voice/relay data from an exchange, which is shown in FIG. 16, replaces the F bit detecting unit 15 shown in FIG. 6.

The operations for switching to the relay exchange mode, which are performed in the third preferred embodiment, will be explained by referring to FIG. 15. When neither of paths [a]" and [b]" within a digital relay exchange 30 are connected, both of multiplexing devices 31 and 32 insert F bits in the signal to be output to their exchange sides, insert the status bit set to, for example, OFF, and output the signal to the multiplexing device on an opposing side.

When the path [a]" from the multiplexing device 31 to the multiplexing device 32 is connected, the multiplexing device 32 detects the F bits included in the input signal [2], switches the status bit to be inserted in the signal [3] to the digital relay exchange 30 from OFF to ON, and outputs the signal to the multiplexing device 31 side.

When the path [b]" from the multiplexing device 32 to the multiplexing device 31 is connected, the multiplexing device 31 detects the F bits and the status bit set to ON from the input signal, switches the status bit included in the signal output from the multiplexing device 31 itself to the digital relay exchange 30 from OFF to ON, and switches its operating mode to the relay exchange mode. Since the path [a]" to the multiplexing device 32 was previously connected, the multiplexing device 32 detects ON of the status bit, and switches its operating mode to the relay exchange mode. Here, the operations for switching to the relay exchange mode in the two multiplexing devices are completed.

In the third preferred embodiment, two methods are adopted for the case where the multiplexing device according to the third preferred embodiment is used and opposed to the conventional multiplexing device (type [a]) to be described later. With the method (1), a status bit (S bit) and an F bit are inserted as different bits as described above. ON of the S bit is defined to be "1". Additionally, an error of a detection is prevented by adopting a protection number also for the detection of an S bit. With the method (2), some of F bits are used as S bits, so that the multiplexing device according to the third preferred embodiment can oppose the conventional multiplexing device.

Figure 17:
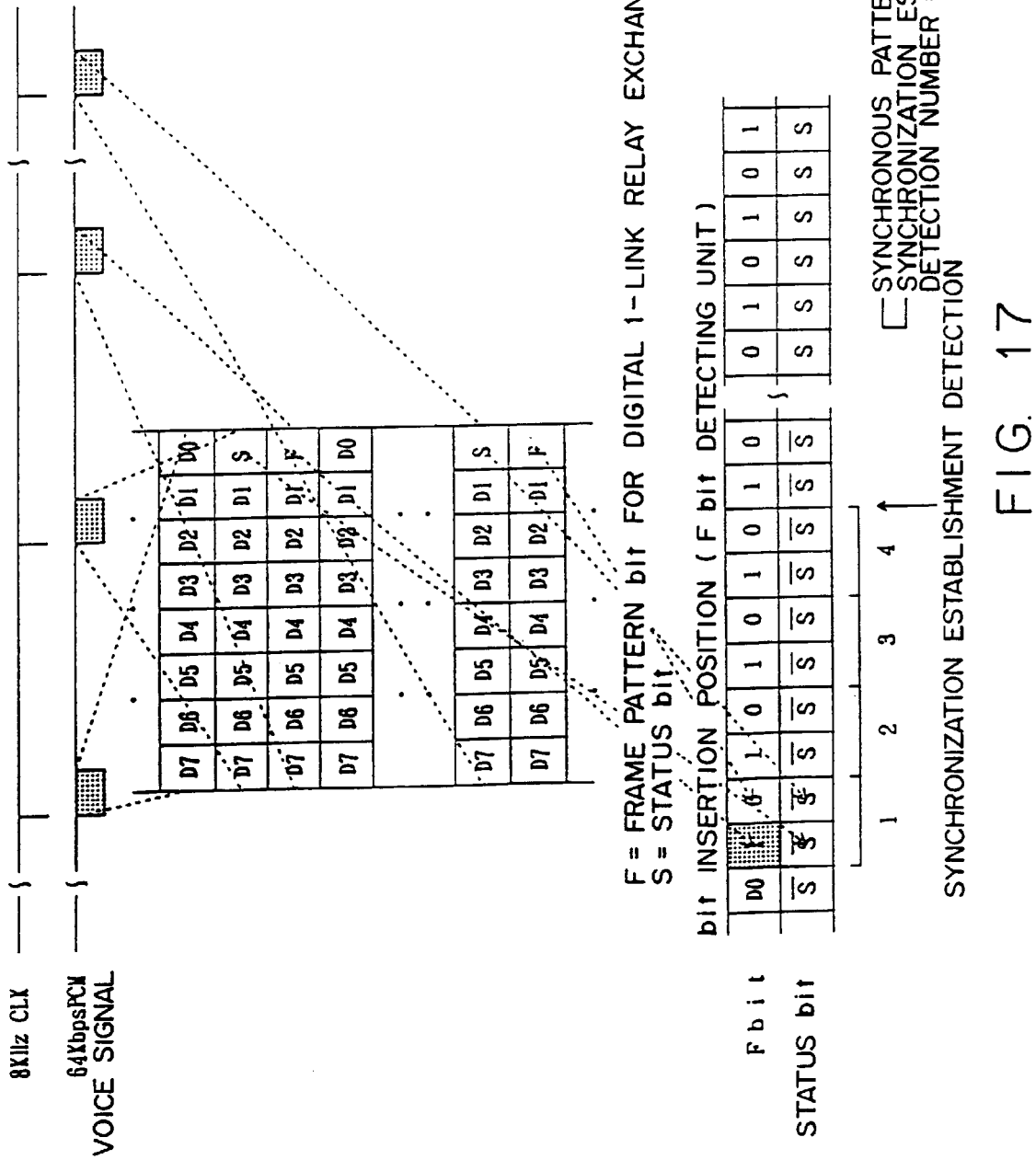
FIG. 17 is a diagram for explaining the method for inserting F and S bits, which is implemented with a system (1)

FIG. 17 is a diagram for explaining the above described method (1) for inserting F bits and S bits. As shown in the upper part of FIG. 17, F bits and their corresponding S bits are periodically inserted in the LSBs of the 8 bits of a PCM voice signal.

As shown in the lower part of FIG. 17, when the path from the multiplexing device on an opposing side is not connected, an S bit set to OFF, that is, S=0, is inserted in correspondence with each F bit. In FIG. 17, an upper F bit and a lower S bit show the correspondence between the F bit and the S bit, which are inserted during 500 $\mu$s. The F bit synchronous pattern is "10", and the synchronization establishment detection number is "4" in a similar manner as in the second preferred embodiment.

Figure 18:
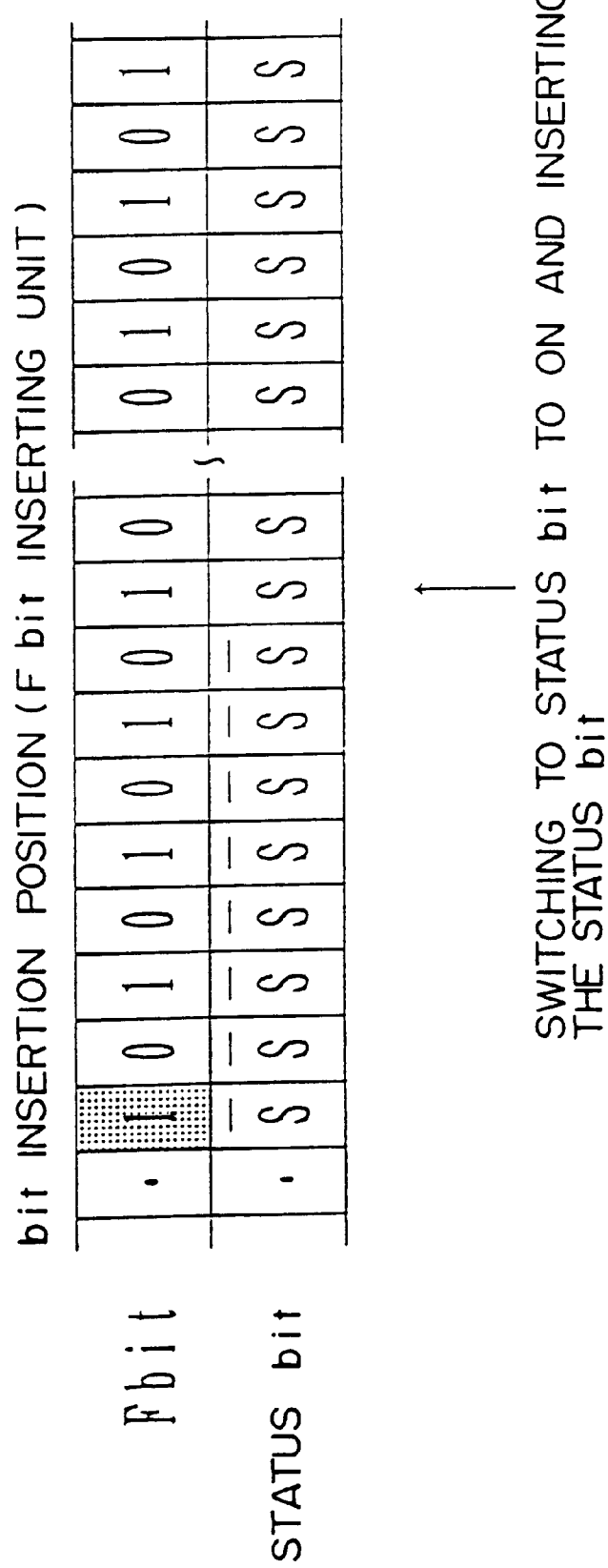
FIG. 18 is a diagram for explaining the state where an S bit is switched from OFF to ON, and is inserted.

FIG. 18 shows the state where F bits are detected, and S bits are switched from OFF to ON and are inserted. 4 synchronous patterns are detected from the signal output from the multiplexing device on an opposing side in FIG. 17, and its result is notified to an F bit inserting unit to be described later. The corresponding S bit is switched from OFF to ON, that is, from "0" to "1", and the signal in which this S bit and the F bits are inserted is output to an exchange side.

Figure 19:
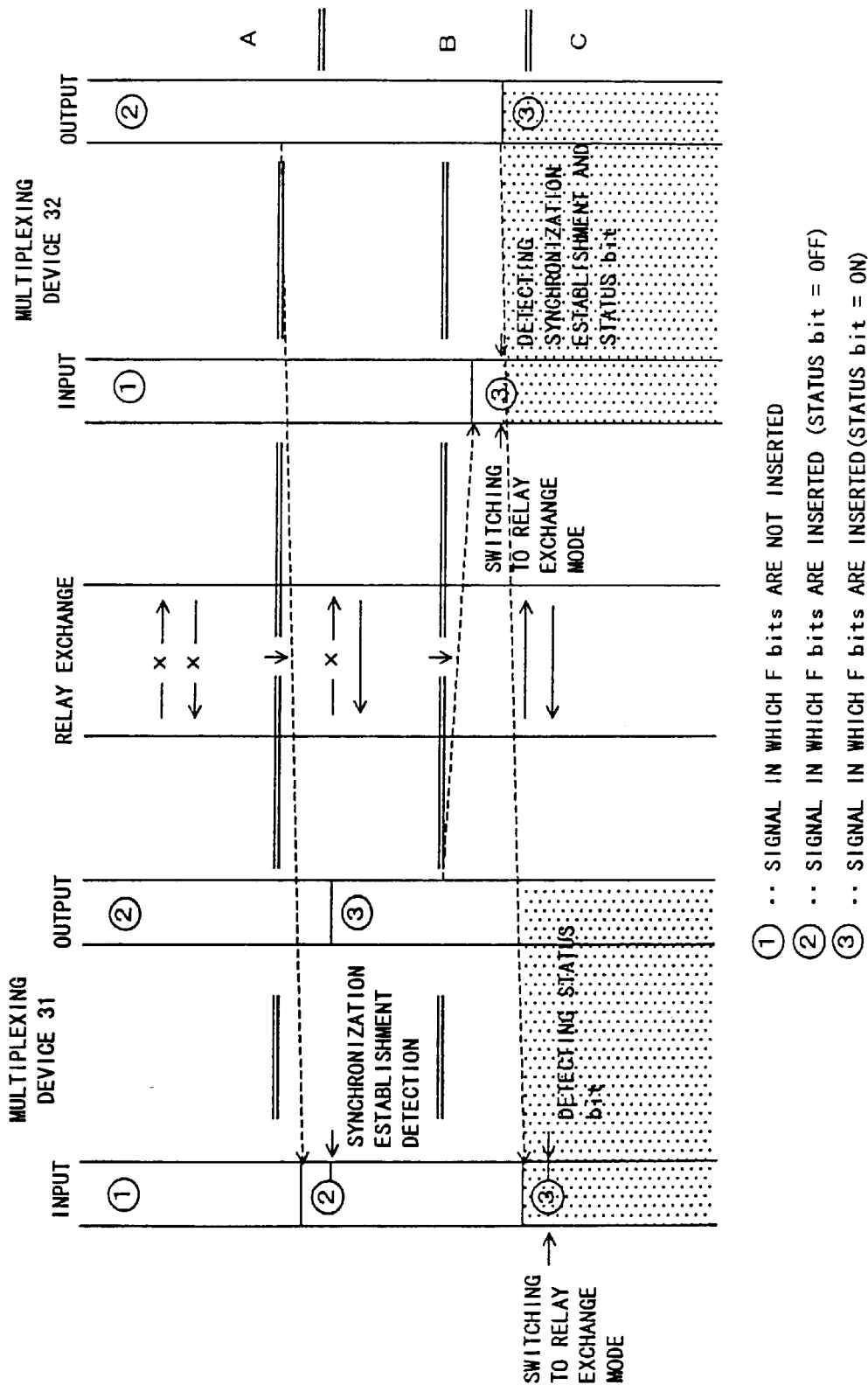
FIG. 19 is a diagram for explaining the progress of switching to relay exchange mode according to the third preferred embodiment.

FIG. 19 is a diagram explaining the progress of the operations for switching to the relay exchange mode, which are performed in the third preferred embodiment. In FIG. 19, both of multiplexing devices 31 and 32 output the signal [2] obtained by inserting the S bit set to OFF and F bits in an input signal [1] to their exchange sides. This state is "A".

When the path from the multiplexing device 32 to the multiplexing device 31 is connected, the multiplexing device 31 changes the S bit inserted in the signal output to the multiplexing device 32 side to ON, upon detection of synchronization establishment by detecting the 4 F bit patterns, and outputs the signal [3] to the exchange side. When the path to the multiplexing device 32 is connected, the multiplexing device 32 detects the synchronization establishment by detecting the F bits and changes the S bit inserted in the signal output to the multiplexing device 31 side to ON at this time point. This state is "B".

Simultaneously, the multiplexing device 32 switches its operating mode to the relay exchange mode by detecting the status bit which is set to ON and is inserted by the multiplexing device 31. Since the path to the multiplexing device 31 was previously connected, the multiplexing device 31 detects ON of the S bit from the input of the signal in which the S bit which is switched to ON and is inserted by the multiplexing device 32, and switches its operating mode to the relay exchange mode.

Because the S bit is independent from the F bits with this method (1), it can be inserted/detected by a simple circuit. By way of example, if the S bit is inserted, for example, after an F bit with a delay of one clock pulse at 8 KHz, the S bit can be detected by determining whether the data is either "0" or "1" with one clock pulse delay after the detection of the F bit. Although a signal deteriorates more than that of the conventional type (a), the deterioration does not become significant. This is because also the S bit uses an LSB.

Figure 20:
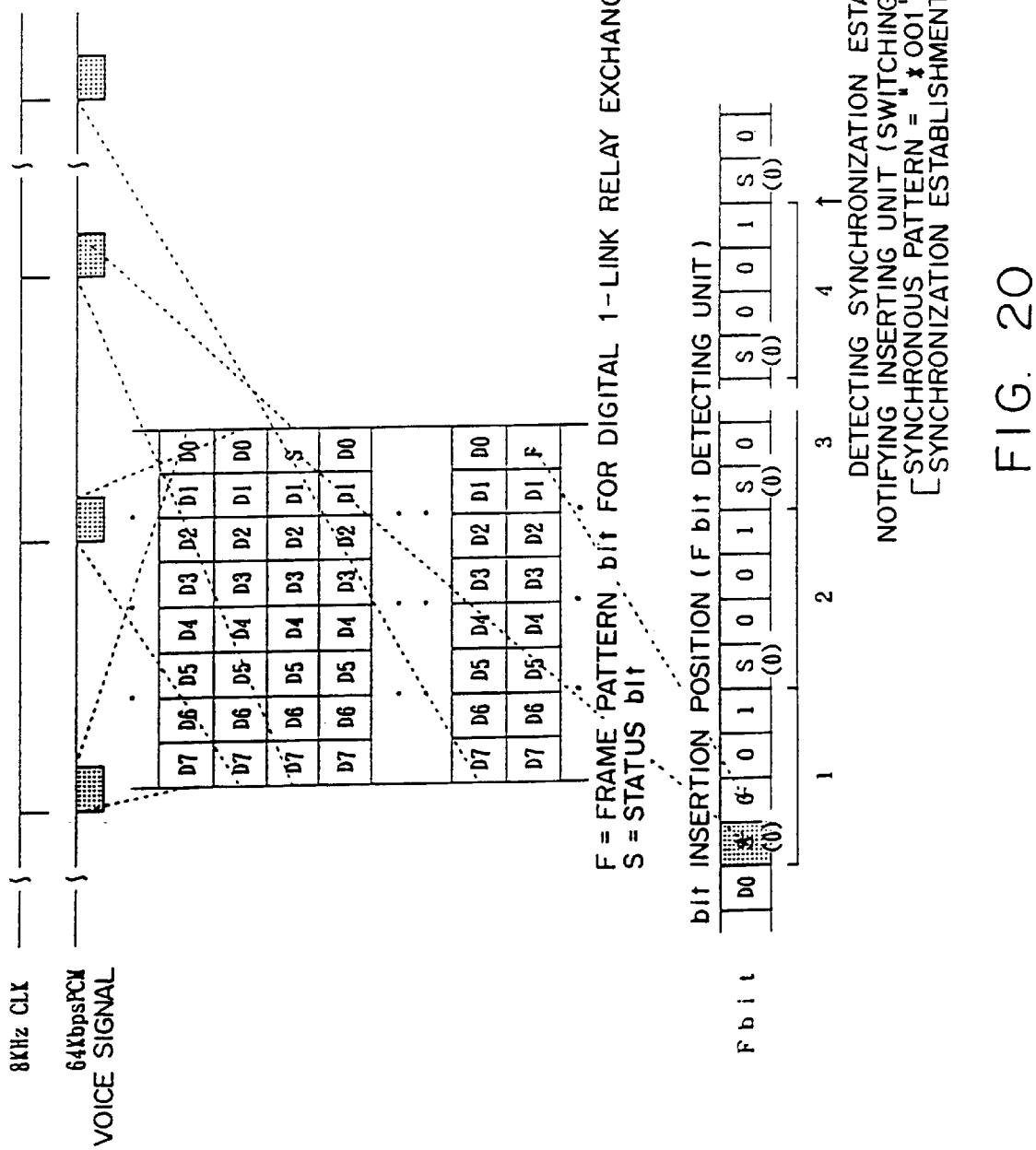
FIG. 20 is a diagram for explaining the method for inserting S and F bits, which is implemented with a system (2) (No. 1)
Figure 21:
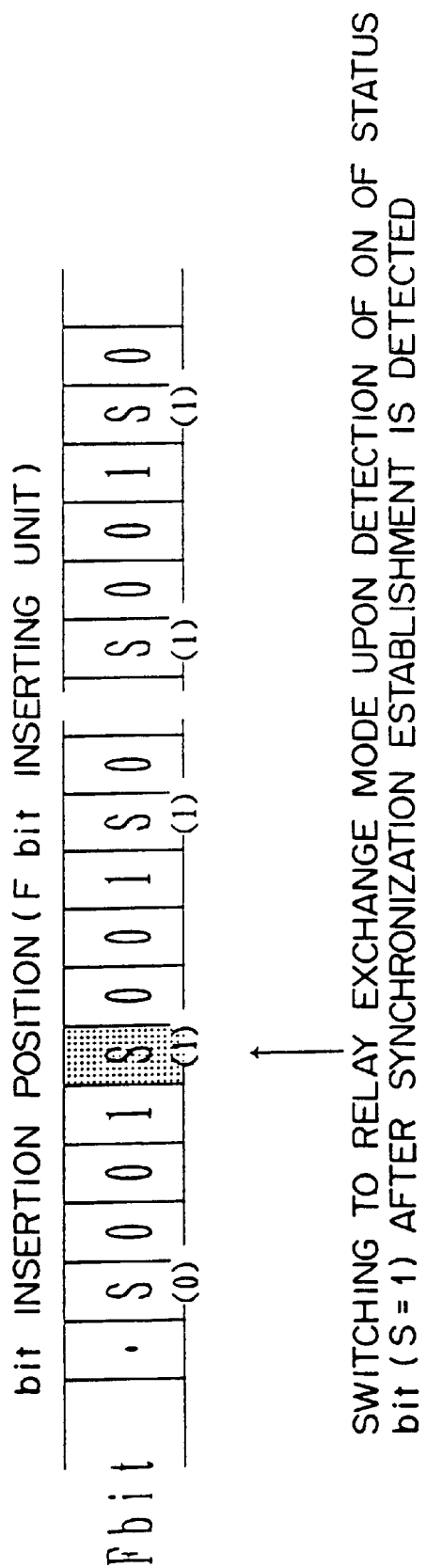
FIG. 21 is a diagram for explaining the method for inserting S and F bits, which is implemented with the system (2) (No. 2)

FIGS. 20 and 21 are diagrams explaining the above described method (2) for inserting S bits and F bits. With the method (2), some of the F bits are used as S bits as described above. The synchronous pattern may be of 2 bits in a similar manner as in the above provided explanation. However, either of the two bits is used as an S bit. Accordingly, which of the F bit and the S bit is either a master or a slave cannot be determined although the respective F bit and the S bit must be originally a master and a slave. The method (2) will therefore be explained based on the assumption that the synchronous pattern of proper F bits is "*001", and the synchronization establishment detection number is 4. As a matter of course, it is possible to assume that the synchronous pattern of F bits is "01" of 2 bits, the high-order bit is used as an S bit, and the synchronous pattern of an (improper) F bit, which includes an inverted S bit, is "11".

FIG. 20 shows the state where S bits prior to the detection of synchronization establishment, that is, S bits set to OFF, are inserted as some of the F bits. The synchronous pattern of proper F bits is "*001" ("*" may be either 0 or 1), and an S bit set to OFF, that is "0" is inserted in the position of the first bit "*". As a result, the multiplexing device side to which the signal including this F bit is input establishes synchronization by detecting the 4 synchronous patterns, changes the S bit to ON, and inserts the S bit.

Figure 36:
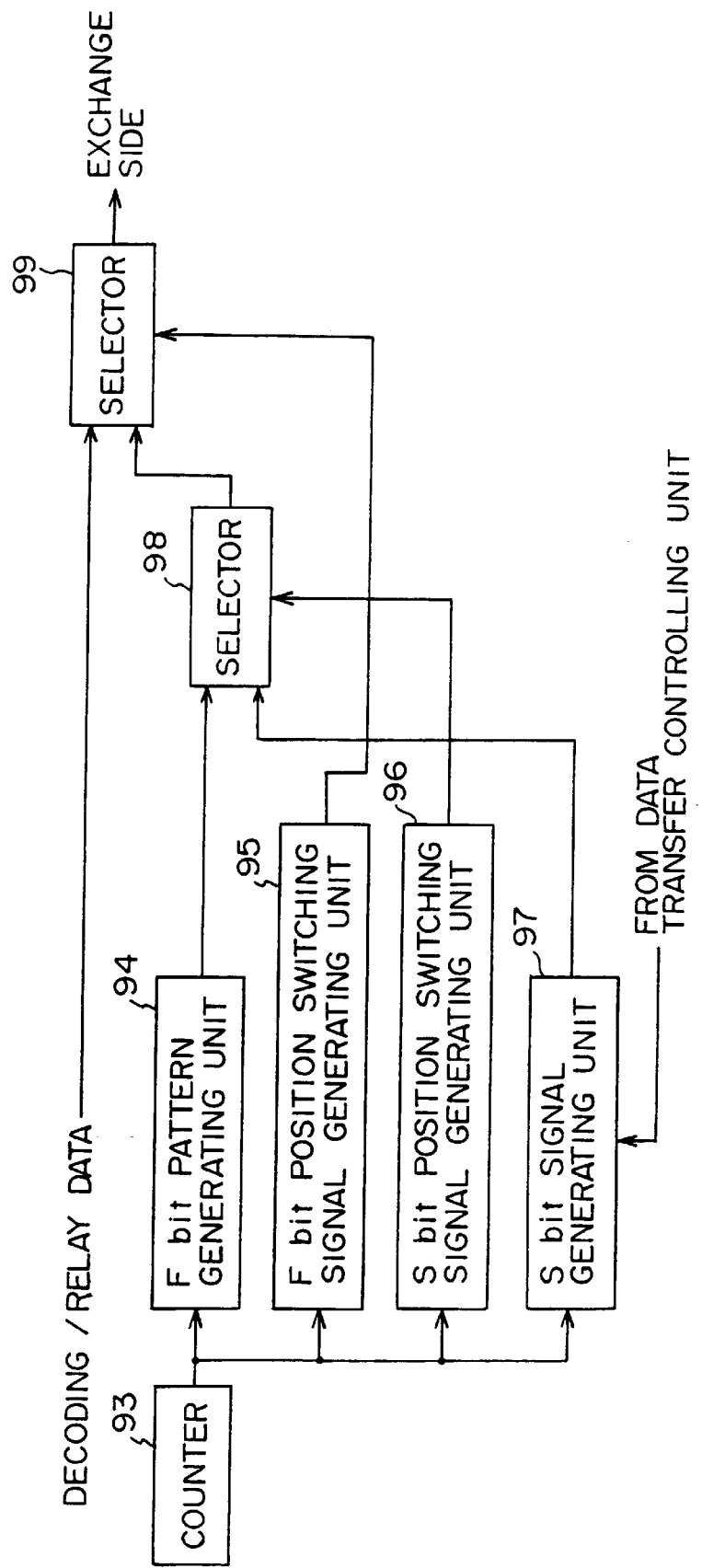
FIG. 36 is a block diagram showing the configuration of an F bit/S bit inserting unit implementing the method (2) according to the third preferred embodiment.

The configuration of the multiplexing device implementing the method (2) is the same as that implementing the method (1) except for the partial difference of the configuration of an F bit inserting unit which will be described later and is shown in FIG. 36. Also the progress of the operations for switching to the relay exchange mode is fundamentally the same as that shown in FIG. 19.

FIG. 21 is a diagram explaining F bits output to the multiplexing device on an opposing side after synchronization establishment is detected. In FIG. 21, the S bit set to ON, that is, "1" is inserted in the first bit of the synchronization pattern and is transmitted to the multiplexing device on the opposing side, from when the synchronization establishment is detected. The multiplexing device on the opposing side switches its operating mode to the relay exchange mode by detecting ON of the S bit.

Figure 22:
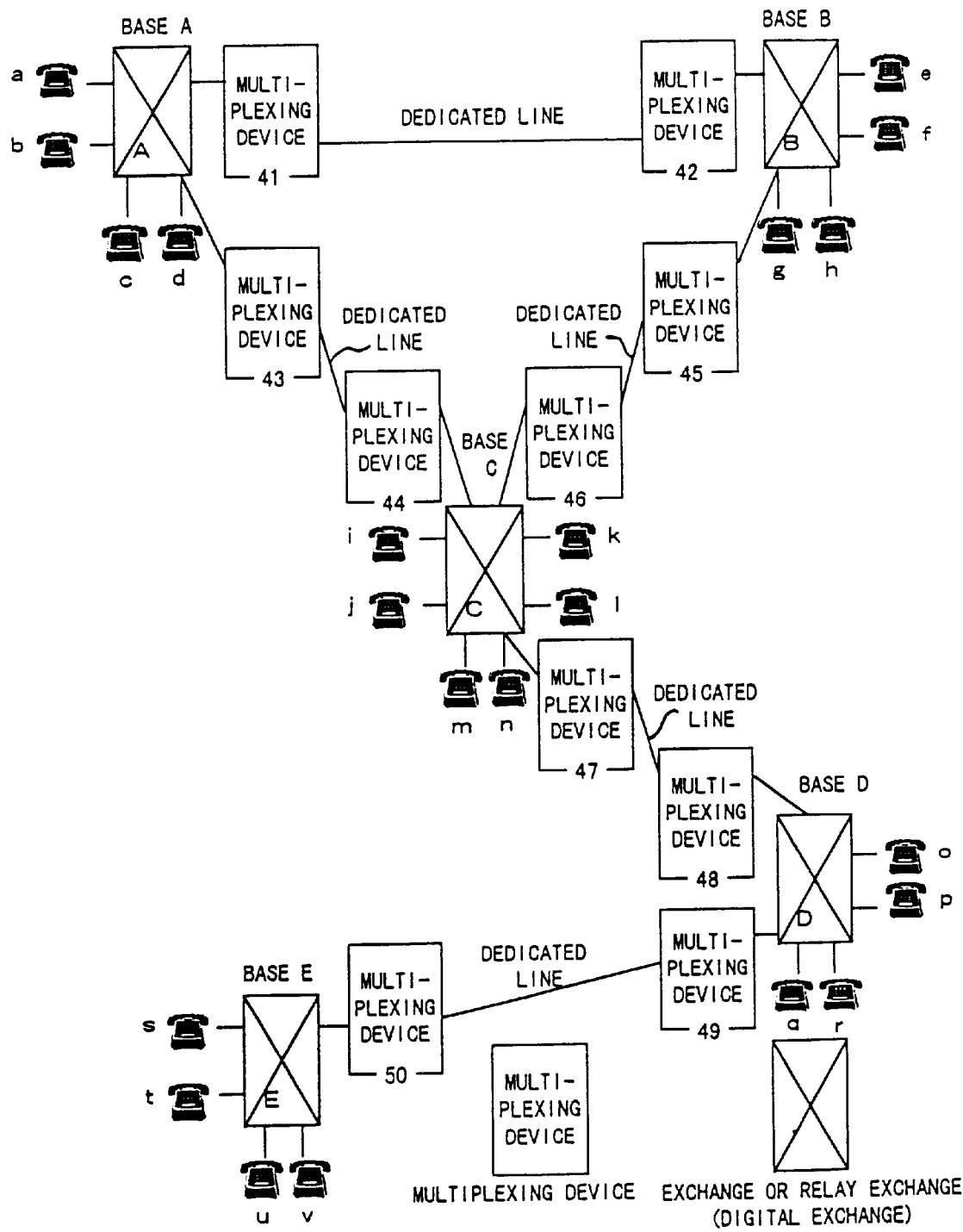
FIG. 22 exemplifies a voice network system to which the present invention is applied.

FIG. 22 is a schematic diagram exemplifying a voice network system to which the present invention is applied. In FIG. 22, when a telephone call is made from a telephone "a" connected to an exchange "A" to a telephone "o" connected to an exchange "D", an exchange C serves as a relay exchange. When a call is originated with a PB signal from the telephone "a", the exchange "A" makes a connection to the exchange "C" via multiplexing devices 43 and 44, and the exchange C makes a connection to the exchange D via multiplexing devices 47 and 48.

Assume that the multiplexing devices shown in FIG. 22 are devices for coding a voice signal into a 16 Kbps signal. This coding is a non-reversible conversion, and the quality of the voice signal of a decoded signal deteriorates more than that of an original input signal. That is, a voice signal is repeatedly coded and decoded each time it passes through a multiplexing device, and its voice quality deteriorates much more than that of the original signal. The deterioration of voice quality can be minimized in the following way: the multiplexing devices 44 and 47 do not code/decode a voice signal and transmit the signal via the relay exchange C unchanged, and the multiplexing devices, which are closest to call originating and terminating telephones, are opposed. This is a digital 1-link relay operation.

Figure 1A:
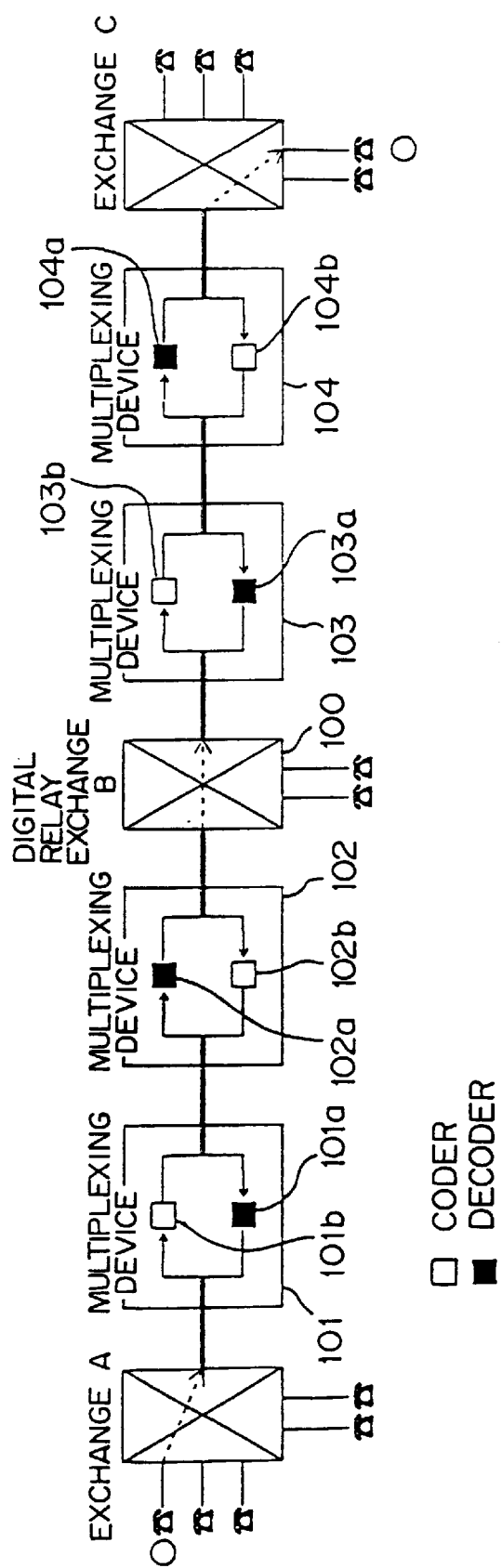
FIG. 1A exemplifies the network configuration for explaining a digital 1-link relay capability.
Figure 1B:
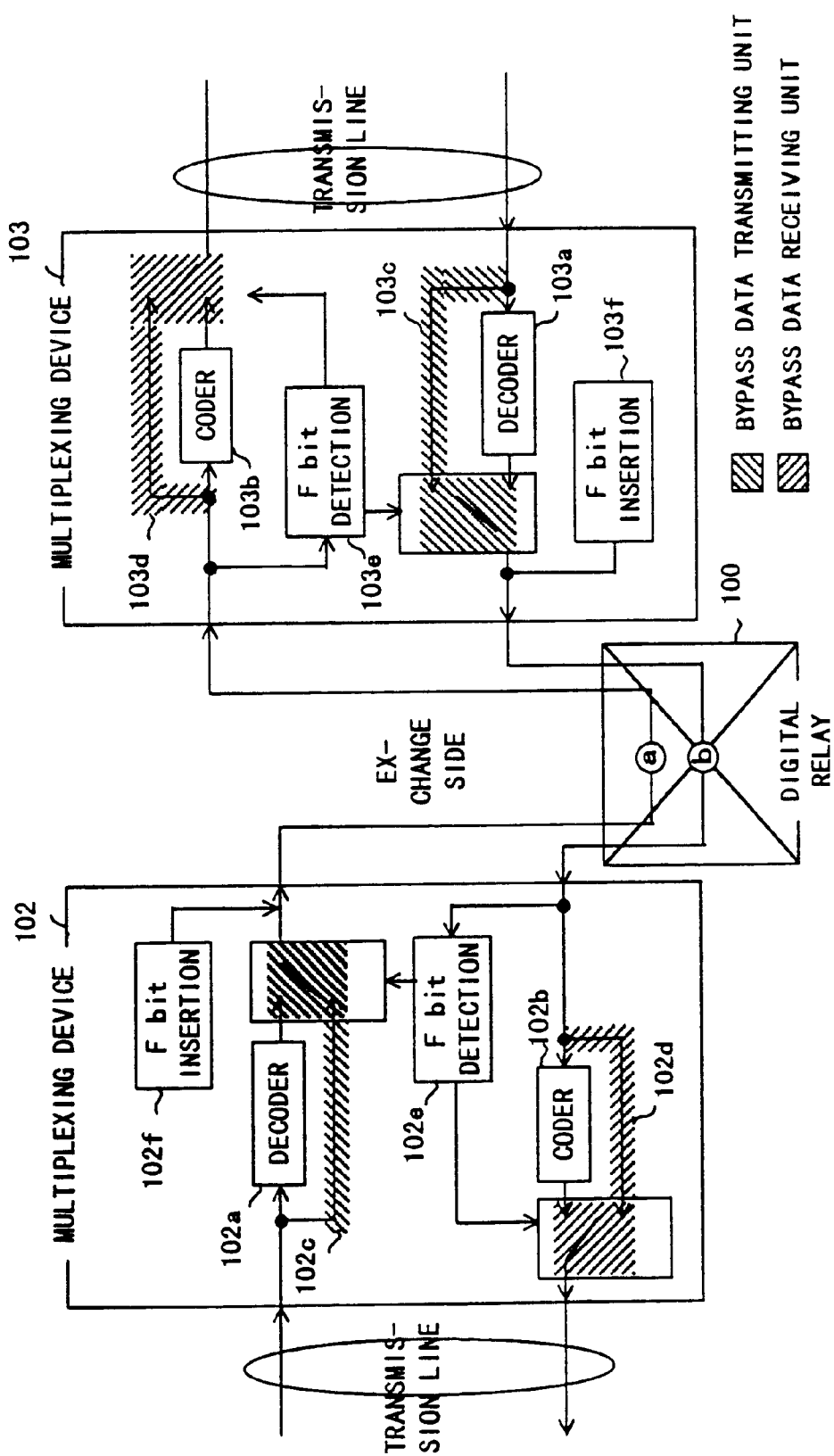
FIG. 1B is a schematic diagram for explaining the operations of a multiplexing device.
Figure 1C:
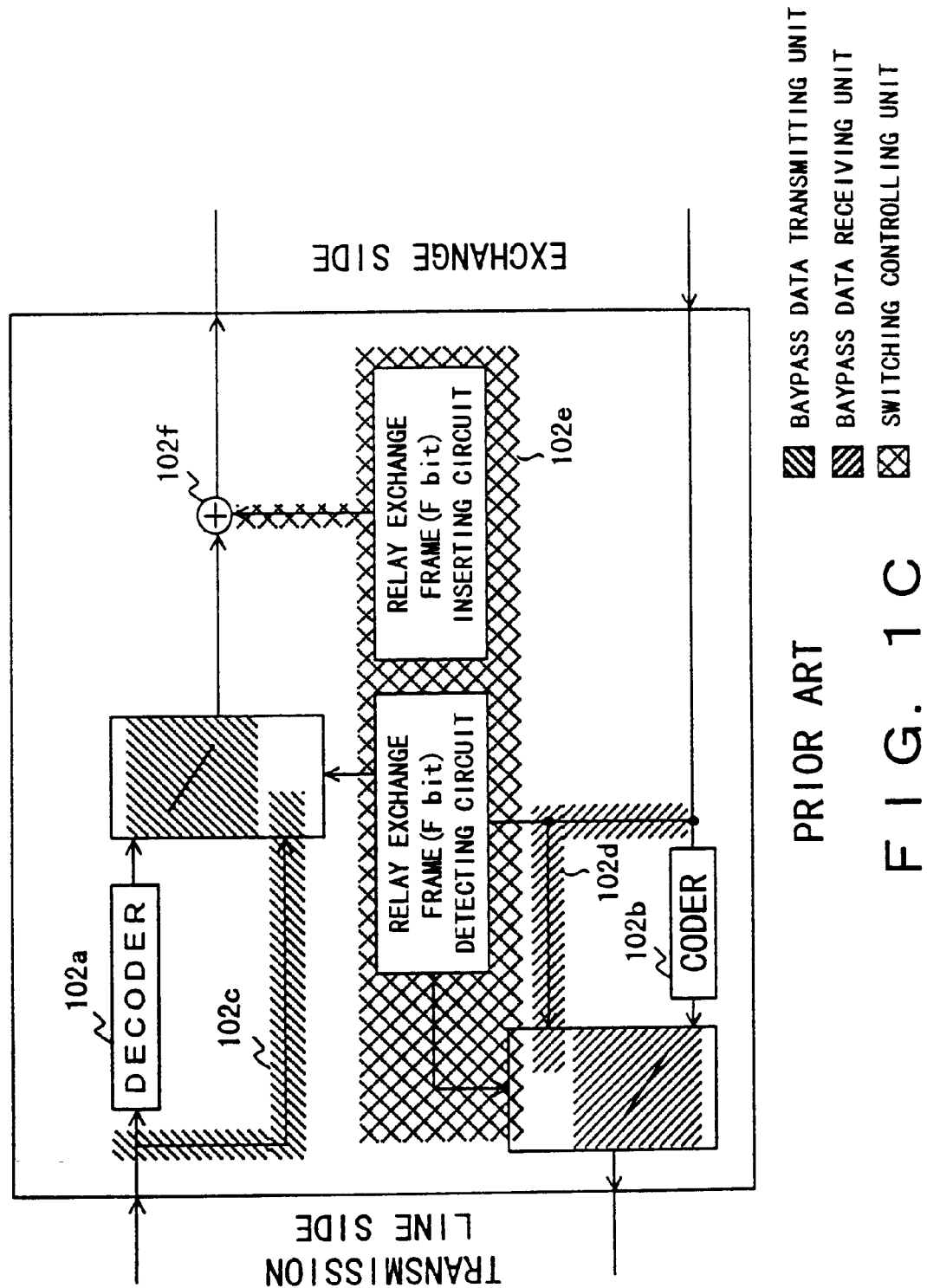
FIG. 1C is a schematic diagram for explaining the capabilities of the multiplexing device shown in FIG. 1B.
Figure 1D:
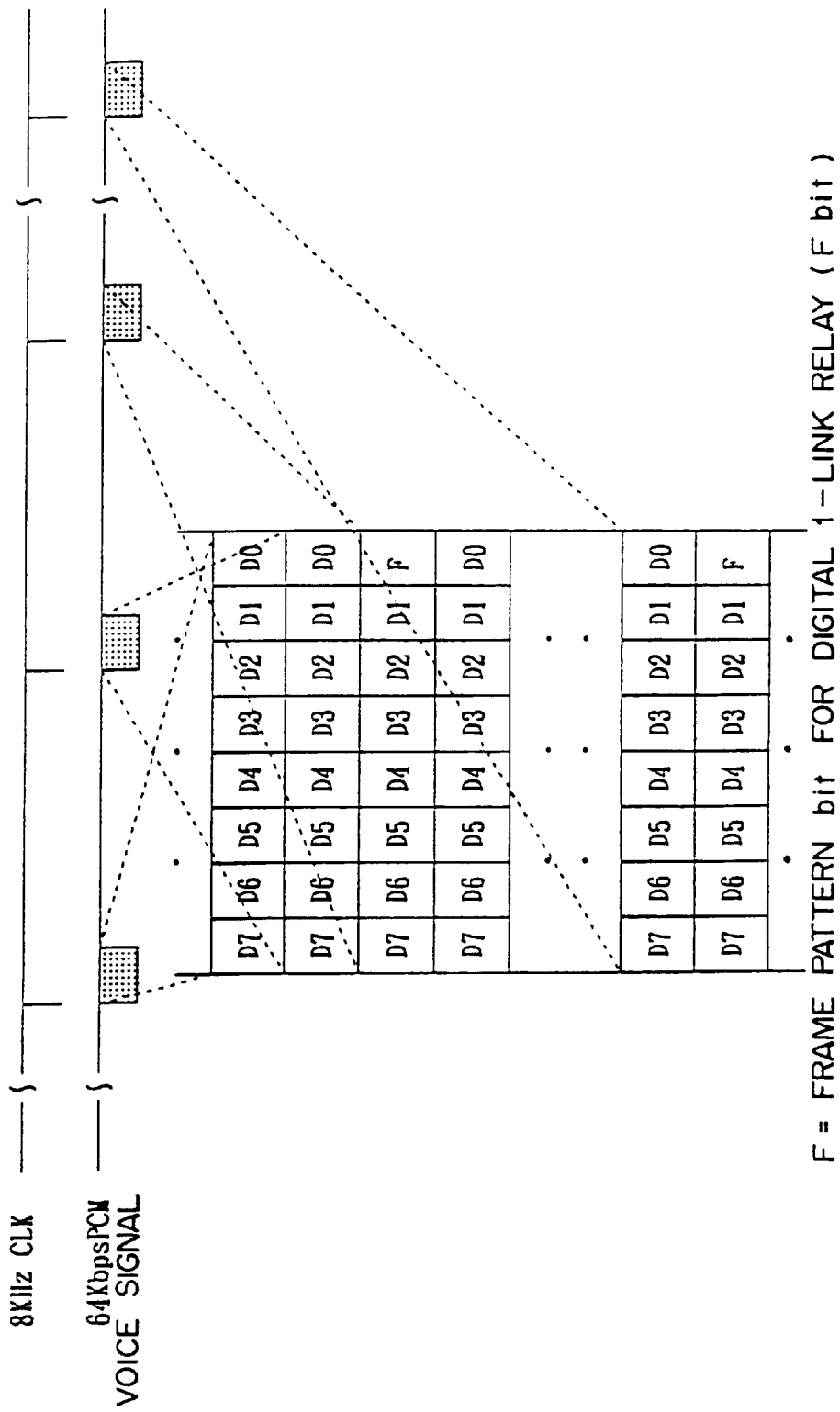
FIG. 1D is a diagram for explaining the method for inserting an F bit as a synchronous bit for relay exchange switching in a PCM voice signal.
Figure 1E:
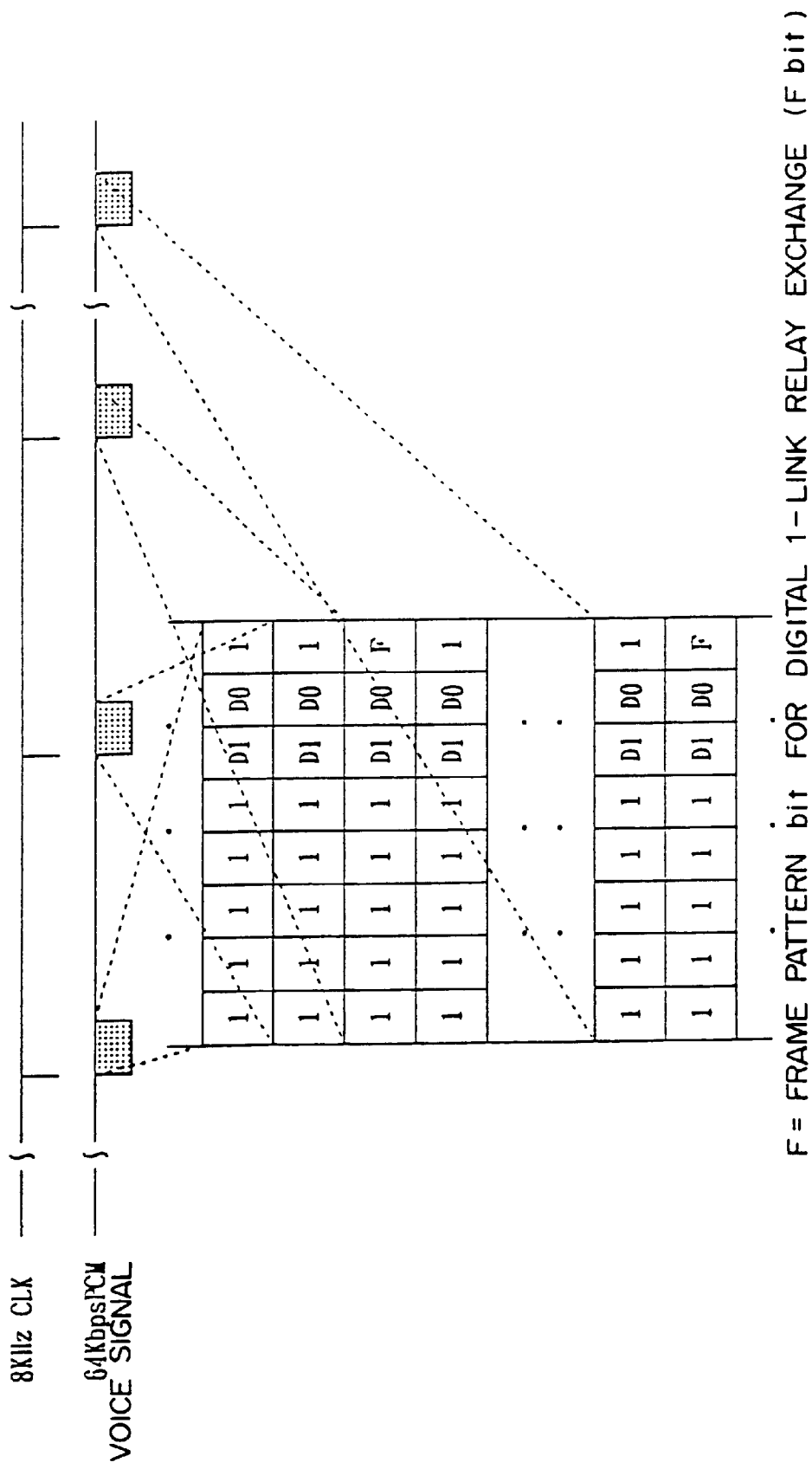
FIG. 1E is a diagram for exemplifying a PCM signal after operating mode is switched to the relay exchange mode.
Figure 1F:
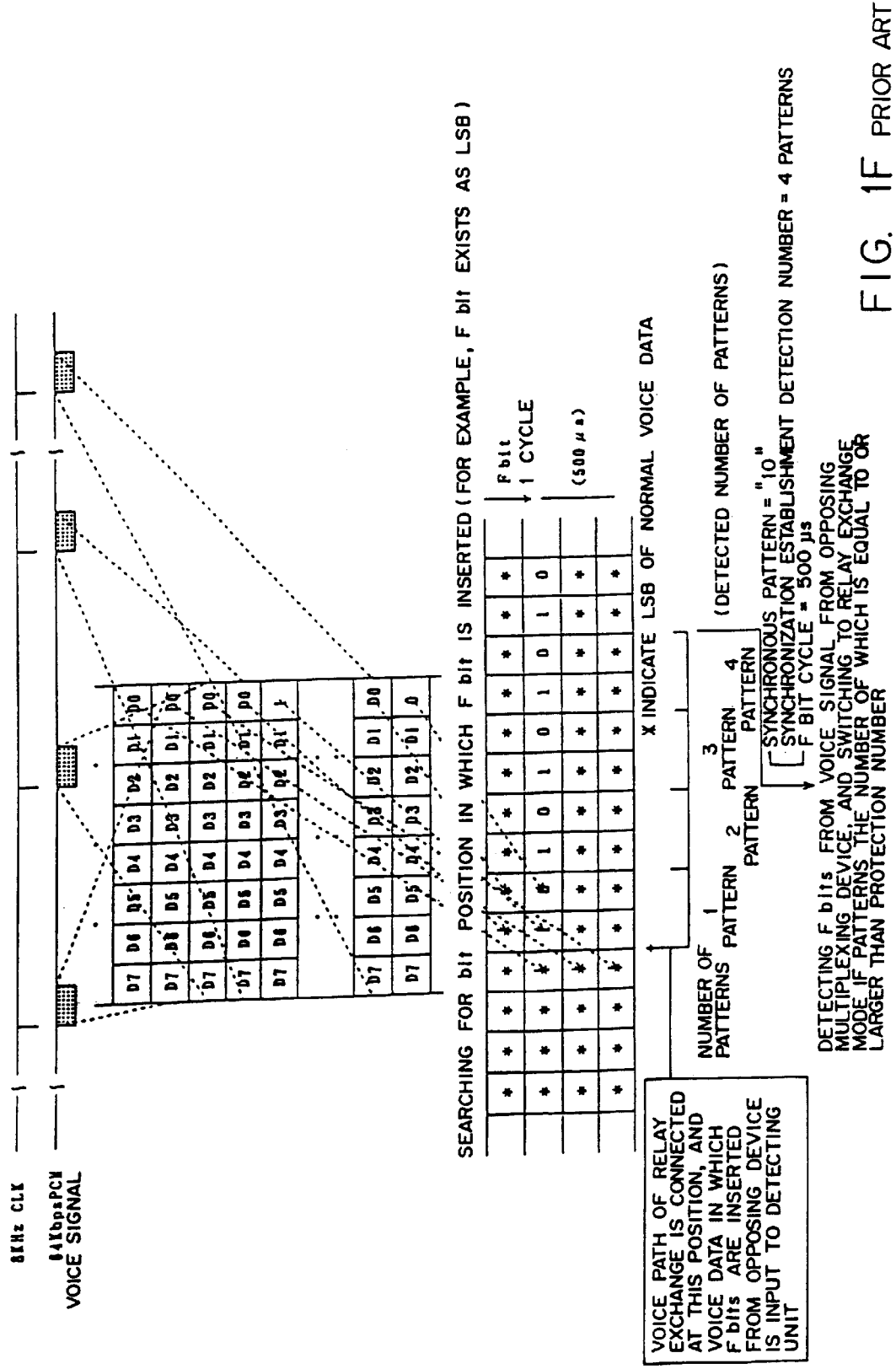
FIG. 1F is a diagram for explaining the method for establishing synchronization with F bits, which is implemented by the multiplexing device of a conventional type (a)
Figure 1G:
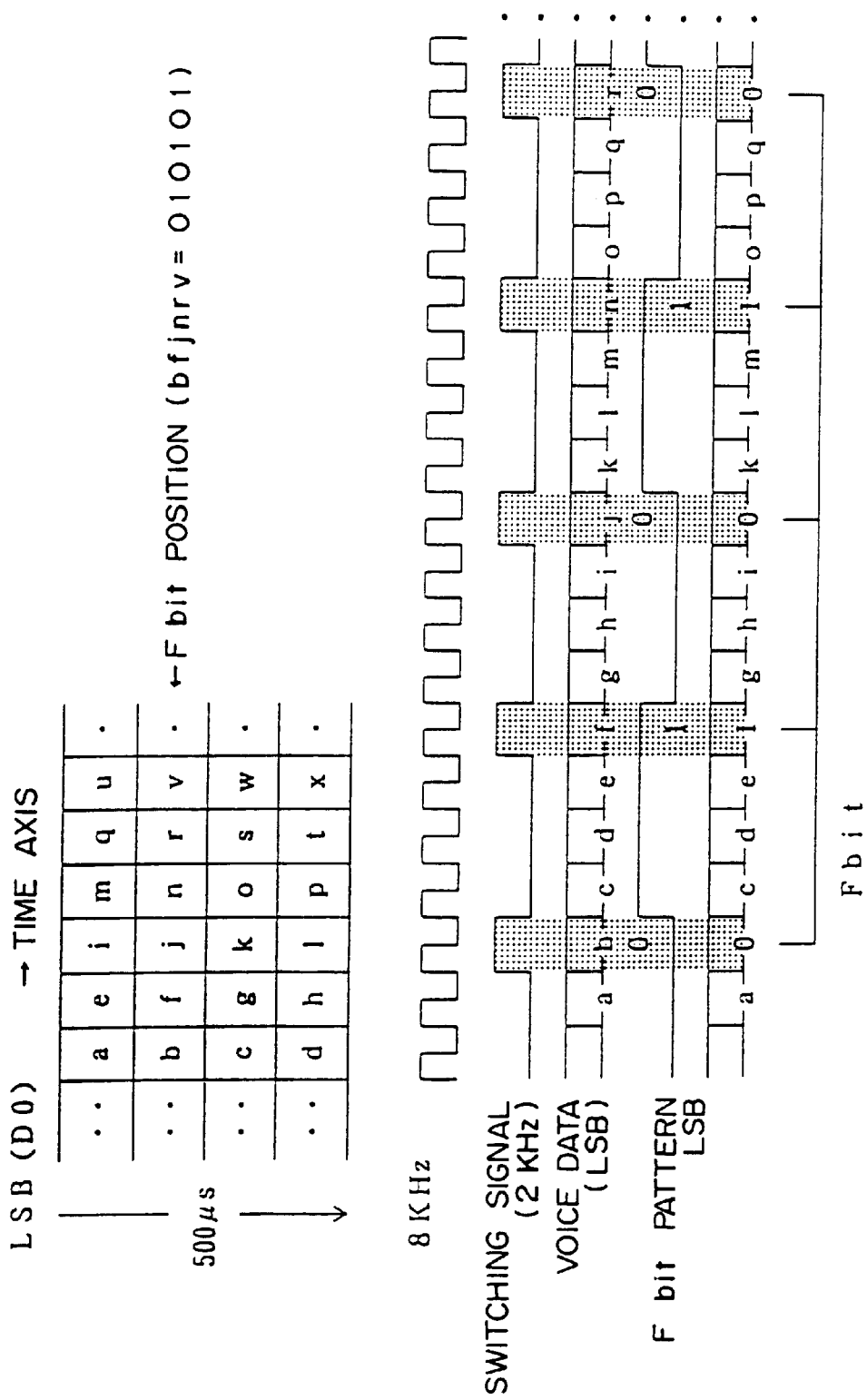
FIG. 1G is a diagram for explaining the method for inserting F bits in LSBs of voice data.
Figure 1H:
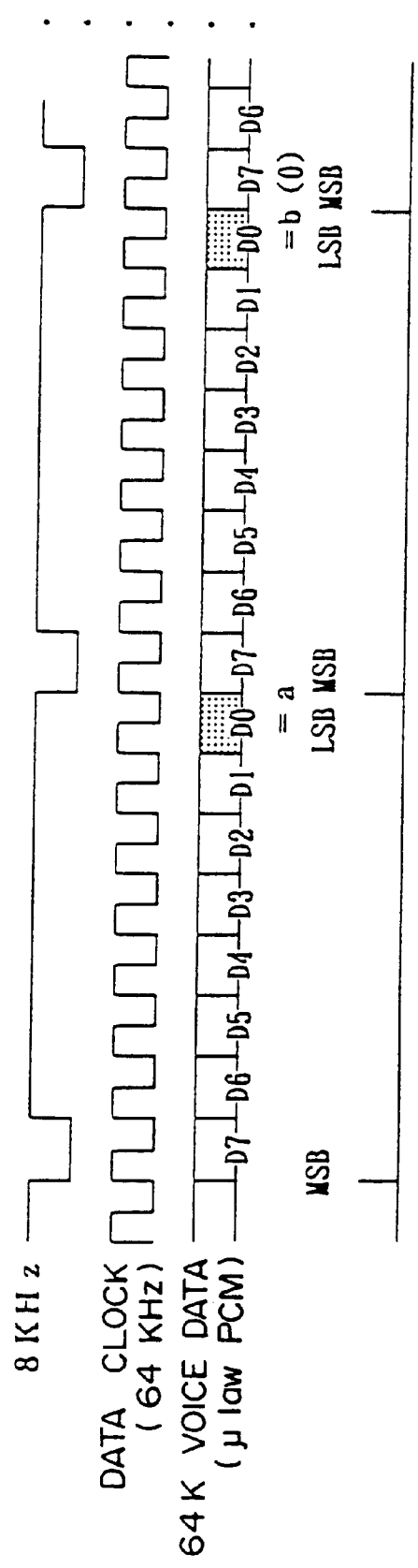
FIG. 1H is a diagram for explaining the allocation of F bits in an actual PCM signal.
Figure 1J:
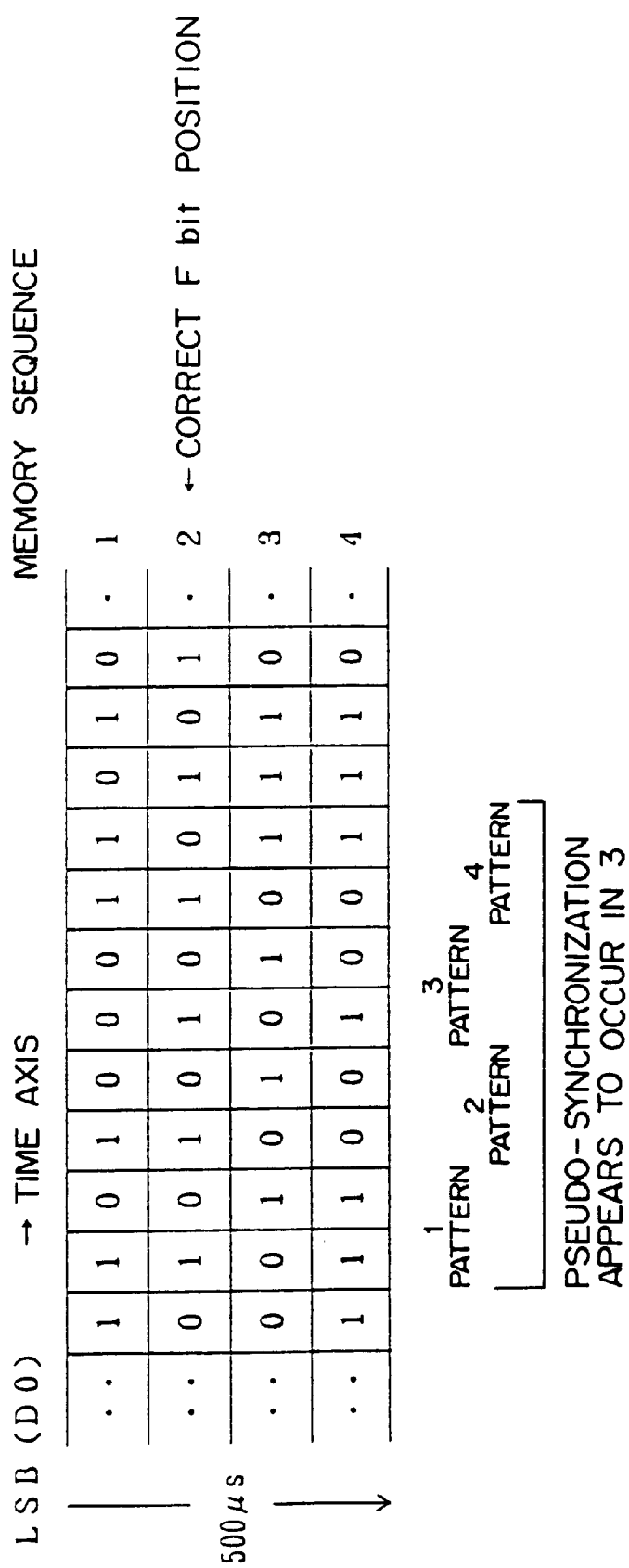
FIG. 1J is a diagram for exemplifying a signal pattern which causes synchronization in a pseudo manner.
Figure 1K:
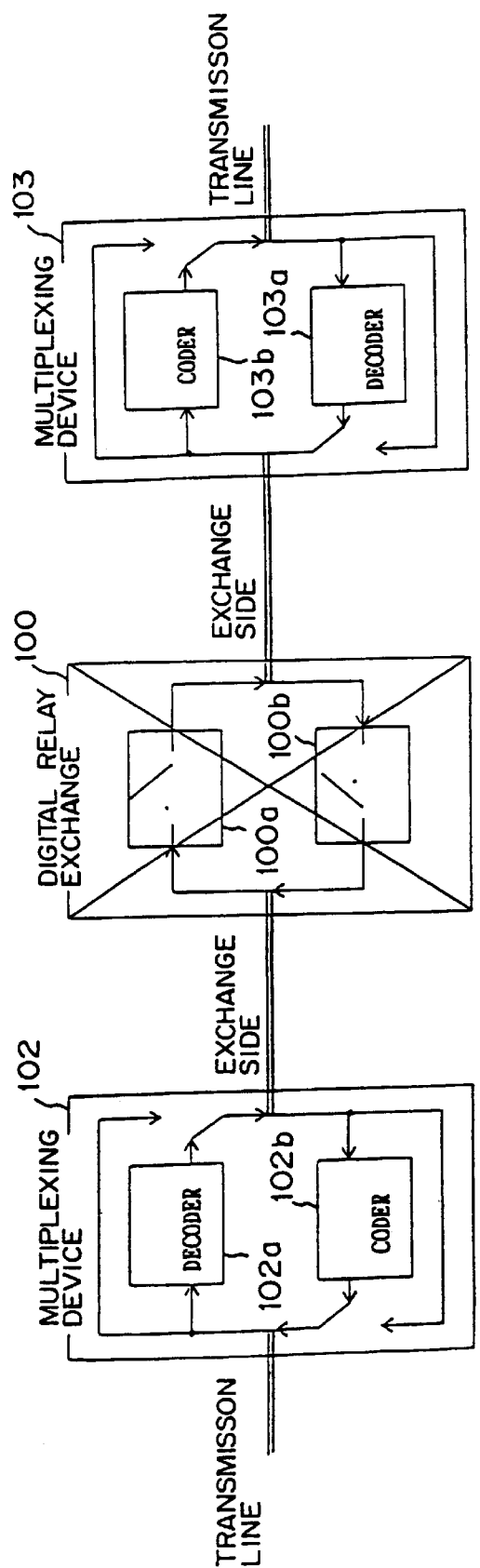
FIG. 1K is a schematic diagram for explaining the operations for switching to the relay exchange mode, which are performed by the multiplexing device of the conventional type (a) (No. 1)
Figure 1L:
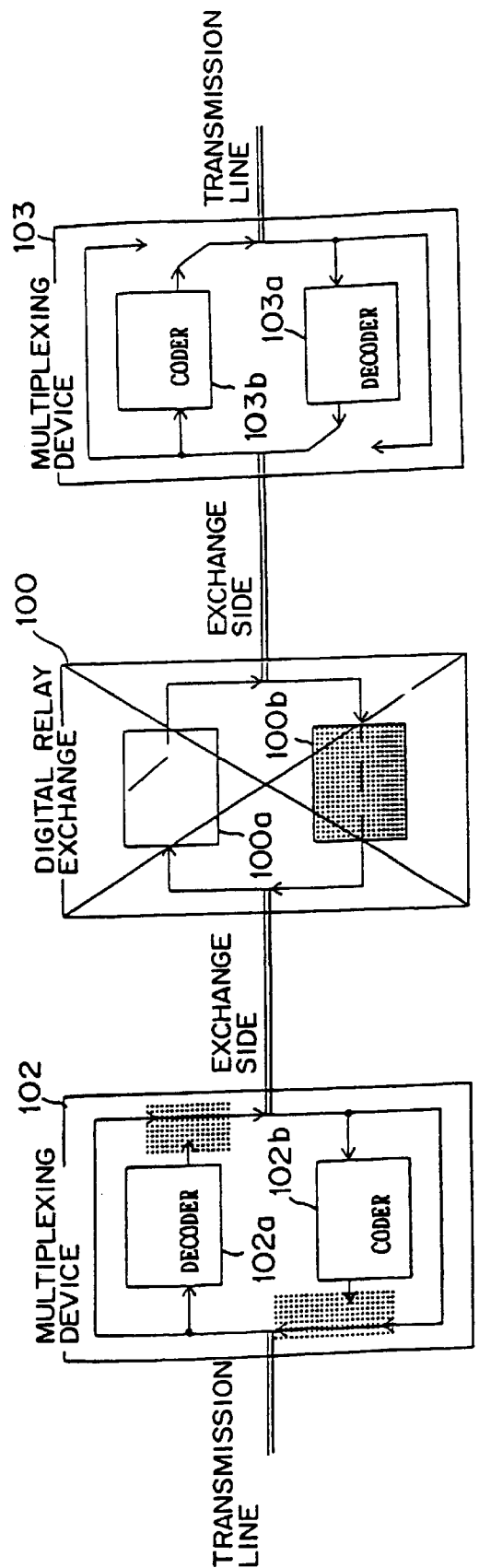
FIG. 1L is a schematic diagram for explaining the operations for switching to the relay exchange mode, which are performed by the multiplexing device of the conventional type (a) (No. 2)
Figure 1M:
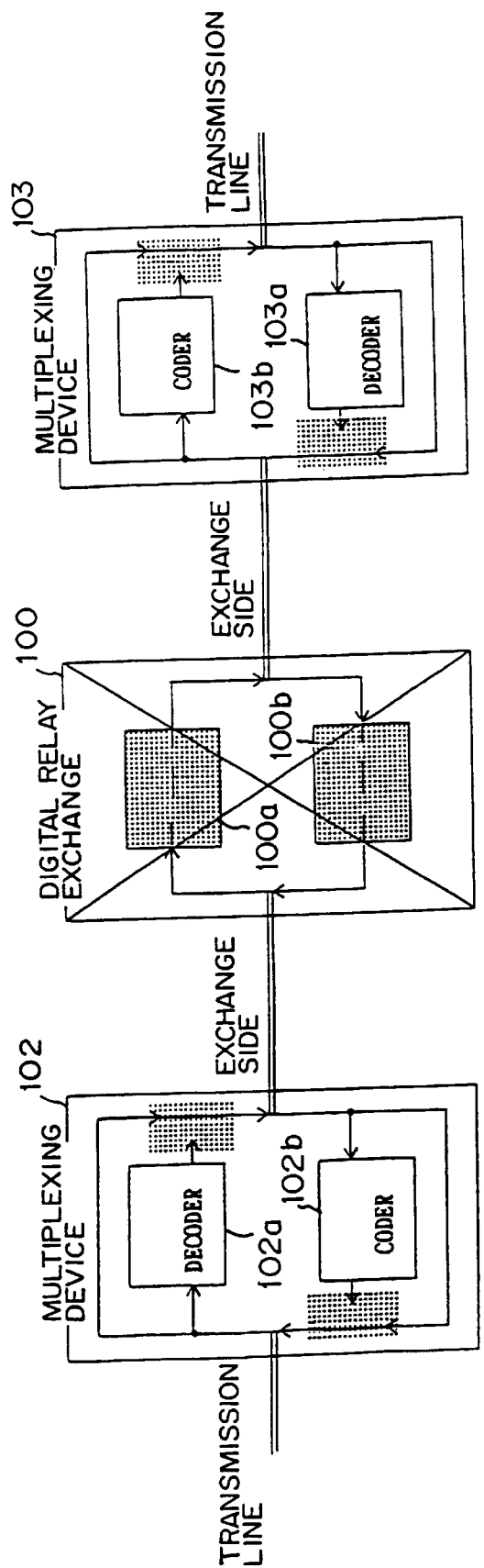
FIG. 1M is a schematic diagram for explaining the operations for switching to the relay exchange mode, which are performed by the multiplexing device of the conventional type (a) (No. 3)

Since voice paths in both directions are not simultaneously connected depending on the type of an exchange in this case, not both but only one of the multiplexing devices may be sometimes switched to the relay exchange mode as referred to in the explanation of FIG. 1L. Therefore, according to the present invention, switching to the relay exchange mode is not made while a voice path is being connected, and coding and decoding are performed between the multiplexing devices 43 and 44 and between 47 and 48. This prevents the forms of voice data of the multiplexing devices from mismatching, so that the telephone number information with a PB signal from the telephone "a" can be transmitted to the exchange D, and a call connection with the PB signal can be made. Then, the digital 1-link relay operation is performed upon completion of the connection, thereby minimizing the voice deterioration.

Provided above are the explanations about the first to third preferred embodiments according to the present invention. Provided next are the explanations about the details of the configuration of the multiplexing device, which is intended to insert/detect an F bit which plays an important role in the present invention, and about the flow of the operation thereof.

Figure 23:
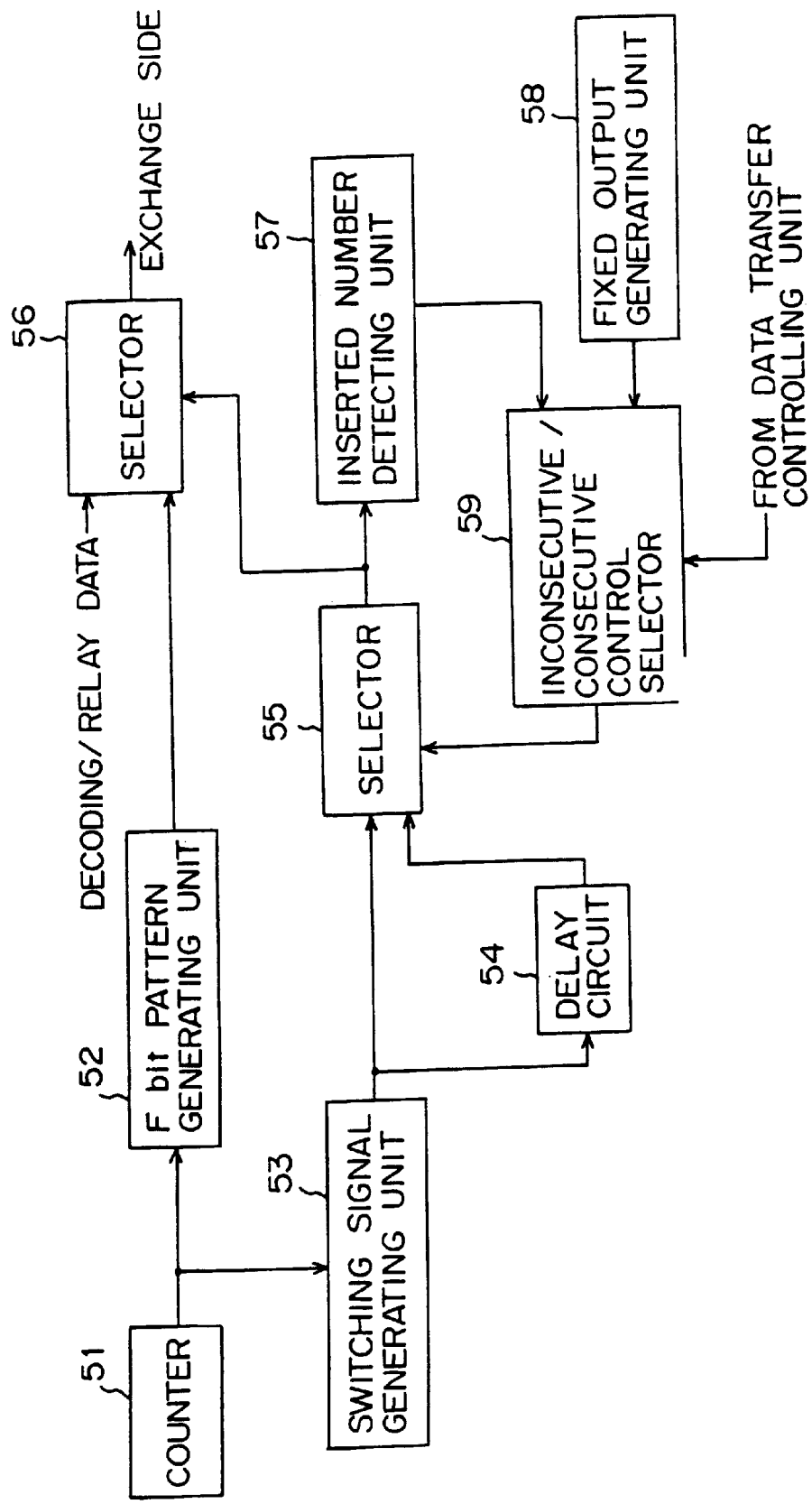
FIG. 23 shows the configuration of an F bit inserting unit according to the first preferred embodiment.
Figure 24:
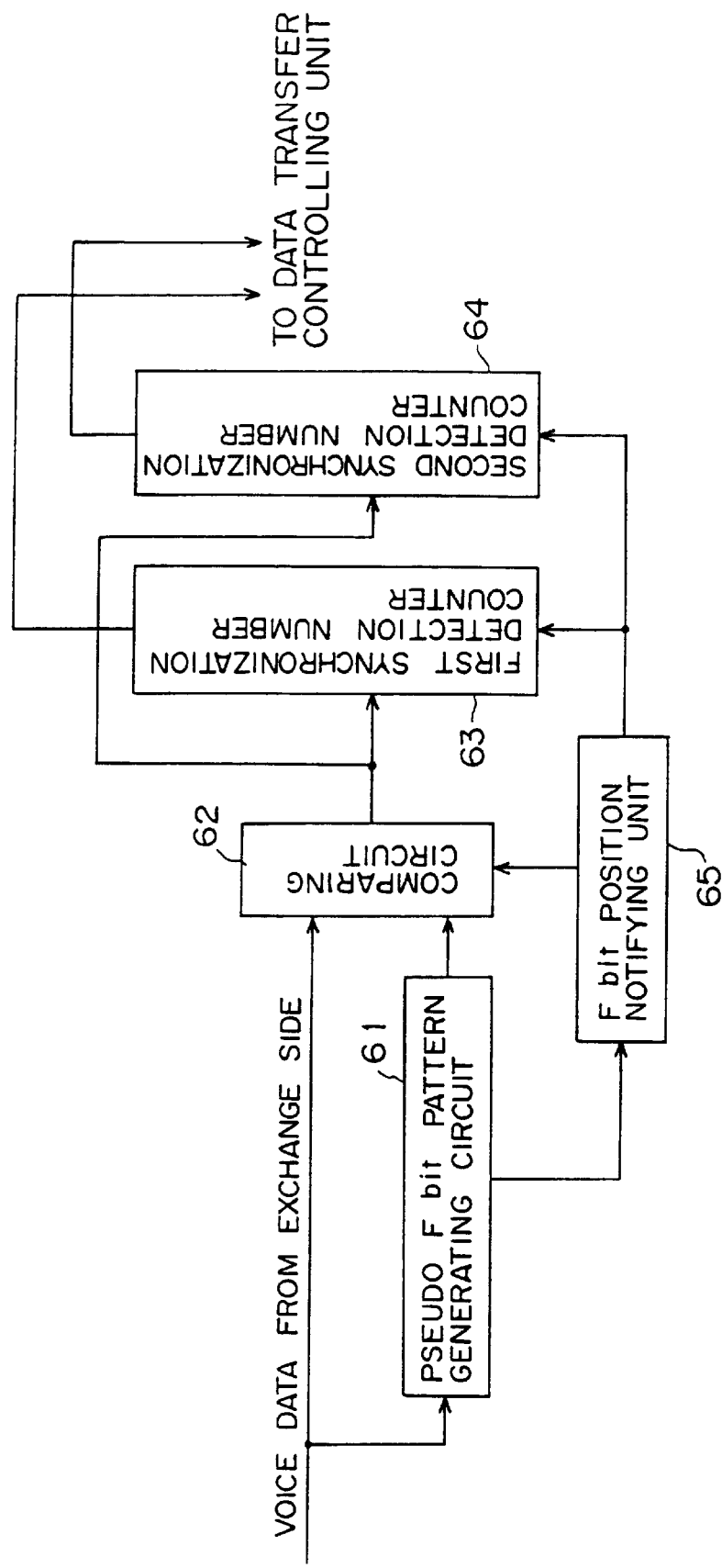
FIG. 24 is a block diagram showing the configuration of an F bit detecting unit according to the first preferred embodiment.
Figure 25:
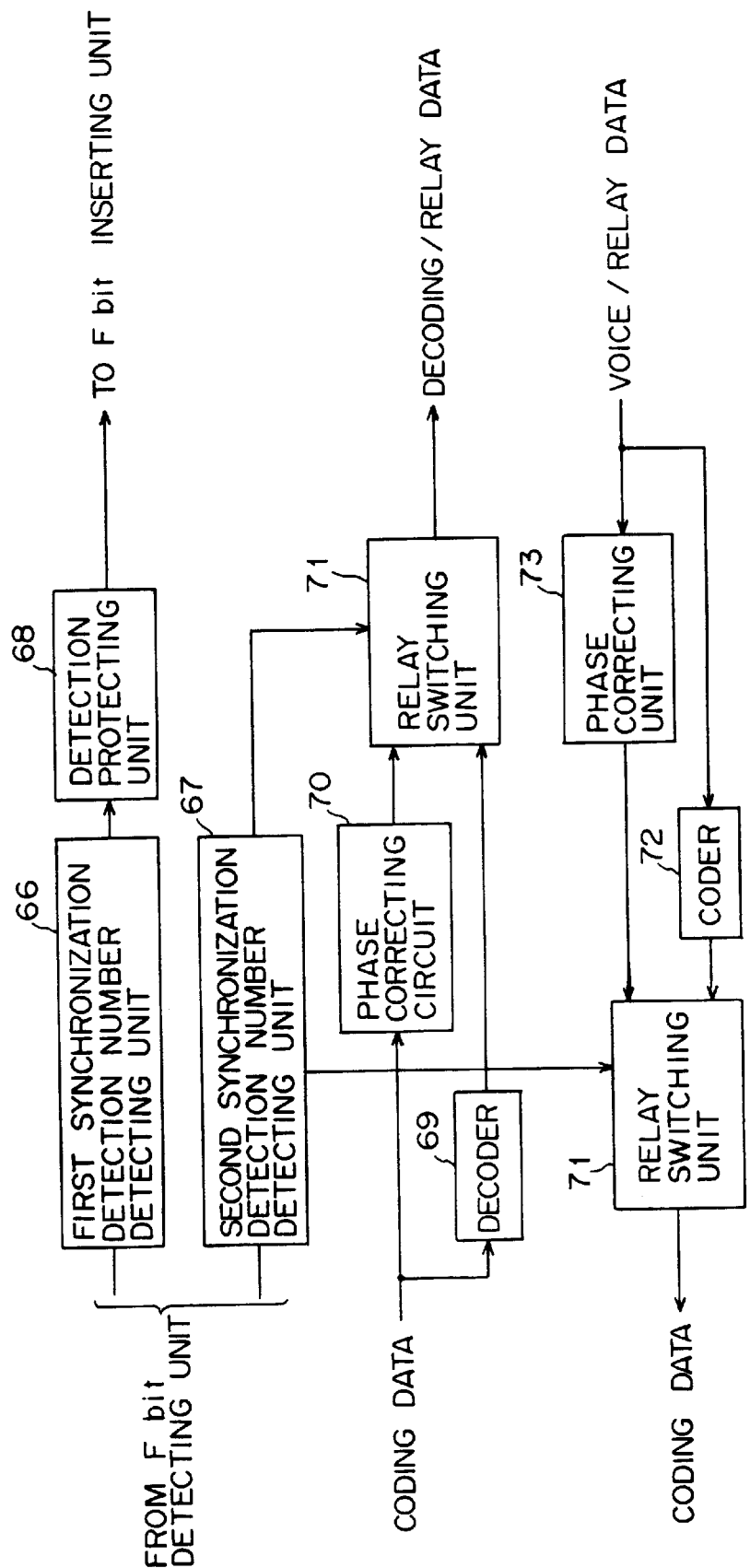
FIG. 25 is a block diagram showing the configuration of a data transfer controlling unit according to the first preferred embodiment.

FIGS. 23 through 25 are block diagrams showing the details of the configurations of an F bit inserting unit, an F bit detecting unit, and a data transfer controlling unit, which are shown in FIG. 6 in the first preferred embodiment. First of all, FIG. 23 shows the configuration of the F bit inserting unit.

In FIG. 23, the F bit inserting unit is composed of a counter 51 for counting a clock; an F bit pattern generating unit 52 for generating an F bit pattern, for example, a consecutive pattern such as "01"; a switching signal generating unit 53 for generating a switching signal intended to insert an F bit pattern in decoding/relay data to be output to an exchange; a delay circuit 54 for delaying the output of the switching signal generating unit 53 depending on need; a selector 55 for selecting either of the outputs of the switching signal generating unit 53 and the delay circuit 54; a selector 56 for selecting either of the decoding/relay data to be output to the exchange and the output of the F bit pattern generating unit 52; an insertion number detecting unit 57 for detecting the number of F bit patterns such as "01" from the output of the selector 55; a fixed output generating unit 58 for generating a fixed output intended to fix the output of the selector 55 to either of the two inputs after the first synchronization establishment detection number is detected; and an inconsecutive/consecutive control selector 59 for providing a selection control signal for the selector 55. The selection control signal for the selector 56 is provided as the output of the selector 55.

FIG. 24 is a block diagram showing the configuration of the F bit detecting unit. In FIG. 24, the F bit detecting unit is composed of a pseudo F bit pattern generating circuit 61 for generating a pseudo F bit pattern intended for comparison with the F bit pattern included in the voice data input from an exchange; a comparing circuit 62 for making a comparison between the voice data input from the exchange and the output of the pseudo F bit pattern generating circuit 61; and first and second synchronization detection number counters 63 and 64 for respectively detecting synchronization based on the output of the comparing circuit 62; a second synchronization detection stage number counter 64; and an F bit position notifying unit 65 for notifying the position of an F bit from the pseudo F bit pattern generating circuit 61 to the comparing circuit 62 and the counters 63 and 64.

FIG. 25 is a block diagram showing the configuration of the data transfer controlling unit. In FIG. 25, the data transfer controlling unit is composed of a first synchronization detection number detecting unit 66 for detecting the first synchronization based on the output of the first synchronization detection number counter 63 included in the F bit detecting unit; a second synchronization detection number detecting unit 67 for detecting the second synchronization based on the output of the second synchronization detection stage number counter 64; a detection protecting unit 68 for protecting the detection of the output of the first synchronization detection number detecting unit 66 by regarding the detection as being continuous until a time point at which the synchronization is again detected, for example, for 100 μs, because of the out-of-synchronization state after the first detection; a decoder 69 for decoding coded data; a phase correcting circuit 70 for correcting a phase when coded data is relayed unchanged; a relay switching unit 71, which is selected and controlled by the second synchronization detection number detecting unit, for outputting either of the outputs of the decoder 69 and the phase correcting circuit 70; a coder 72 for coding the input from an exchange side; a phase correcting unit 73 for correcting a phase when voice/ relay data is relayed unchanged not via the coder 72; and a relay switching unit 74 for selecting either of the outputs of the coder 72 and the phase correcting unit 73 similar to the relay switching unit 71.

Figure 26:
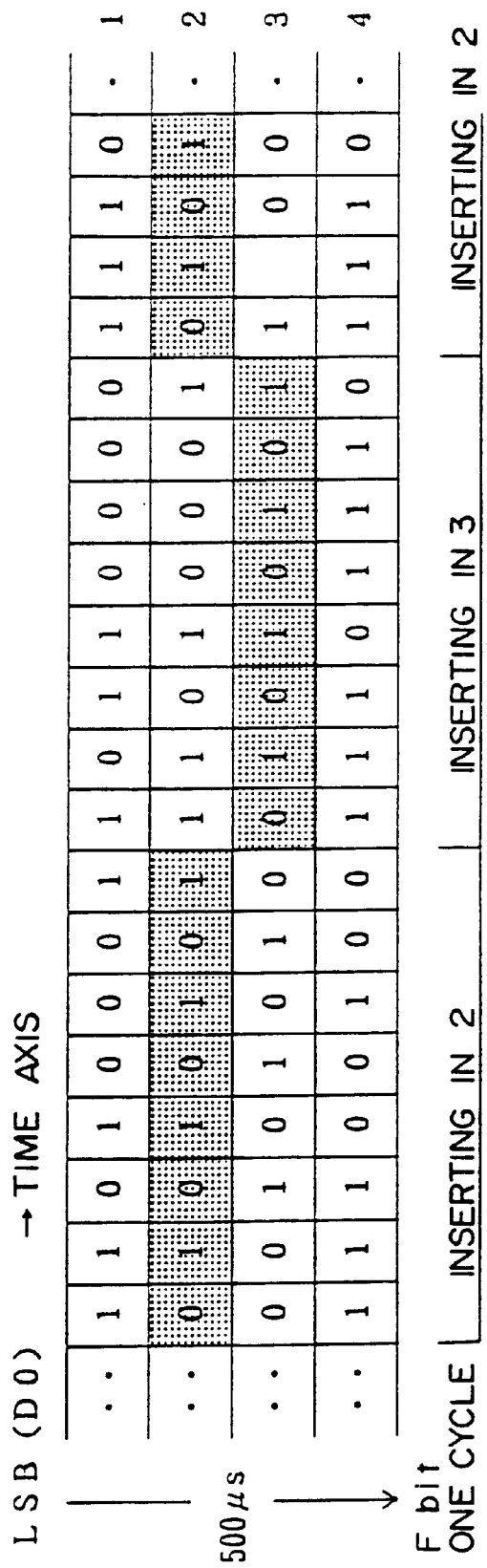
FIG. 26 is a diagram explaining the method for periodically changing the position in which an F bit is inserted.

FIG. 26 is a diagram for explaining the method for periodically changing an F bit insertion position within the 4 memory sequences referred to in the explanation of FIG. 1J. In FIG. 26, the F bit insertion positions in which 4 synchronization patterns "01" are consecutively inserted are changed between the memory sequences 2 and 3 for ease of explanation. One example of such a method for changing an F bit insertion position is a method with which, for example, a counter for counting the number of synchronous patterns to be inserted is arranged within the F bit inserting unit shown in FIG. 23, an F bit insertion signal with a 125-μs delay from the signal indicating a normal F bit insertion position as the output of the selector 55 is prepared in addition to the normal signal, and the insertion position is alternately switched when the counter notifies that its value reaches the number of synchronous patterns to be inserted.

Figure 27:
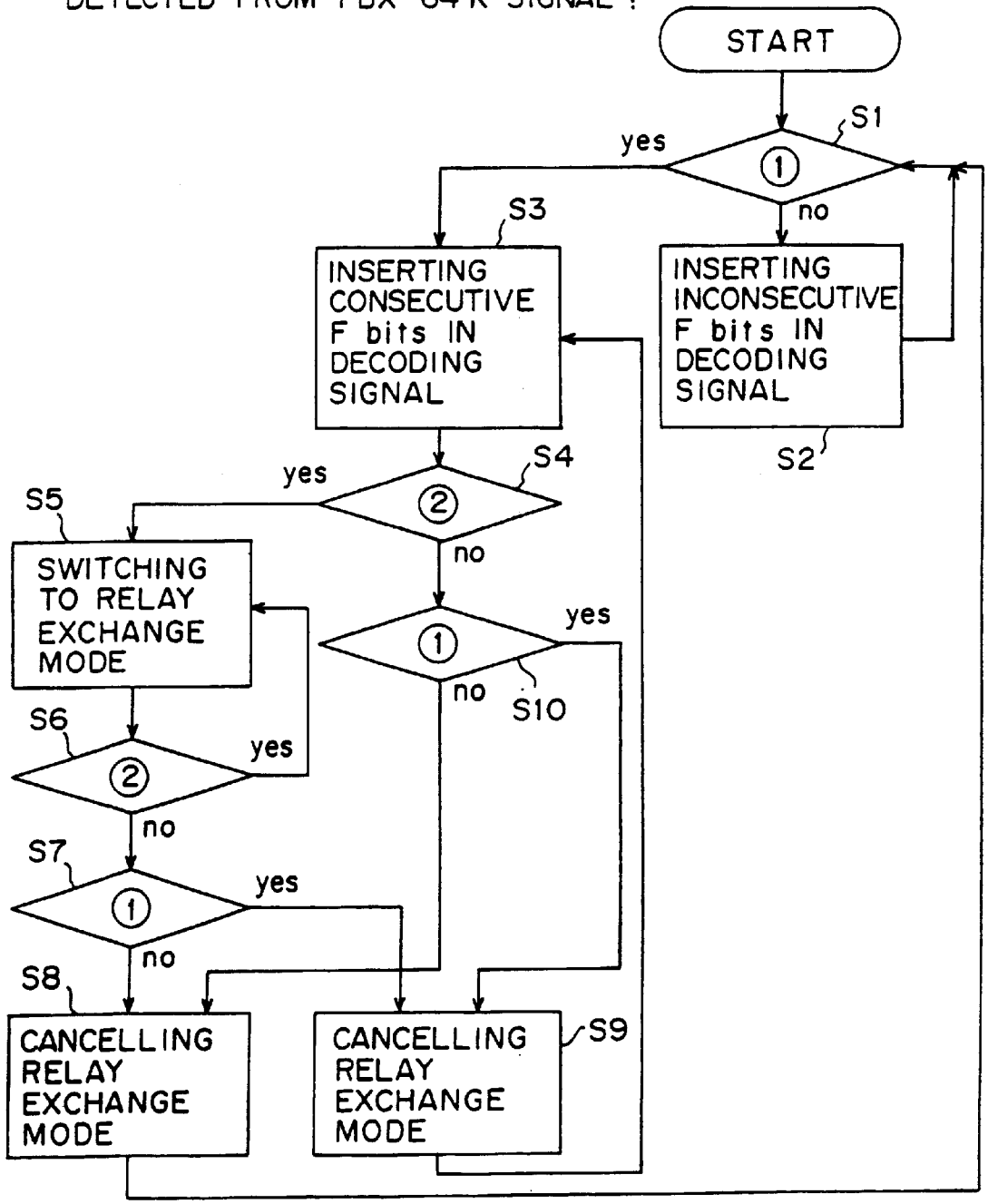
FIG. 27 is a flowchart showing the process performed by the multiplexing device according to the first preferred embodiment.

FIG. 27 is a flowchart showing the operations performed by the multiplexing device according to the first preferred embodiment. Once the process is started in FIG. 27, it is first determined whether or not the first synchronization establishment detection number of F bits is detected from the 64 Kbps signal output from a PBX (Private Branch Exchange) side in step S1 as a determination [1]. If "NO" in step S1, inconsecutive F bits are inserted in a decoded signal in step S2. The process then goes back to step S1.

If "YES" in step S1, consecutive F bits are inserted in the decoded signal in step S3. Then, it is determined whether or not the second synchronization establishment detection number is detected in step S4 as a determination [2]. If "YES" in step 4, the operating mode is switched to the relay exchange mode in step S5, and the multiplexing device begins to operate in the relay exchange mode. Then, the determination [2] is made in step S6. If the second synchronization establishment detection number is detected, the process goes back to step S5 where the multiplexing device continues to operate in the relay exchange mode. Namely, the insertion of consecutive F bits is continually performed even after the operating mode is switched to the relay exchange mode as described above, and the relay exchange mode operations are performed during that time.

If the second synchronization establishment stage number is not detected in step S6, it is determined whether or not the first synchronization establishment detection number is detected as the determination [1] in step S7. If "NO", a call is fundamentally determined to be released. Accordingly, the relay exchange mode is cancelled in step S8, and the process in and after step S1 is continued. If "YES" in step S7, the relay exchange mode is cancelled in step S9, and the process in and after step S3 is continued.

If the second synchronization establishment detection umber is not detected as a result of the determination [2] in step S4, the determination [1], that is, the determination of whether or not the first synchronization establishment detection number is detected, is again made in step S10. If "NO", pseudo synchronization is determined to be made. Therefore, the relay exchange mode is cancelled in step S8, and the process in and after step S1 is performed. If "YES" in step S10, an abnormal situation is determined to occur. Therefore, the relay exchange mode is cancelled in step S9, and the process in and after step S3 is repeated.

As described above in detail, according to the first preferred embodiment of the present invention, the signal in which inconsecutive F bits are inserted is output to an exchange side before the path from the multiplexing device on an opposing side is connected, or the signal in which consecutive F bits are inserted is output to the exchange side after the path is connected, and the switching to the relay exchange mode is made when the signal including the consecutive F bits is input from the multiplexing device on the opposing side. As a result, a call connection with a PBX signal can be enabled, and the quality of a voice signal can be prevented from deteriorating. Additionally, the use of only one type of an F bit synchronous pattern can prevent an increase in a circuitry size.

Figure 28:
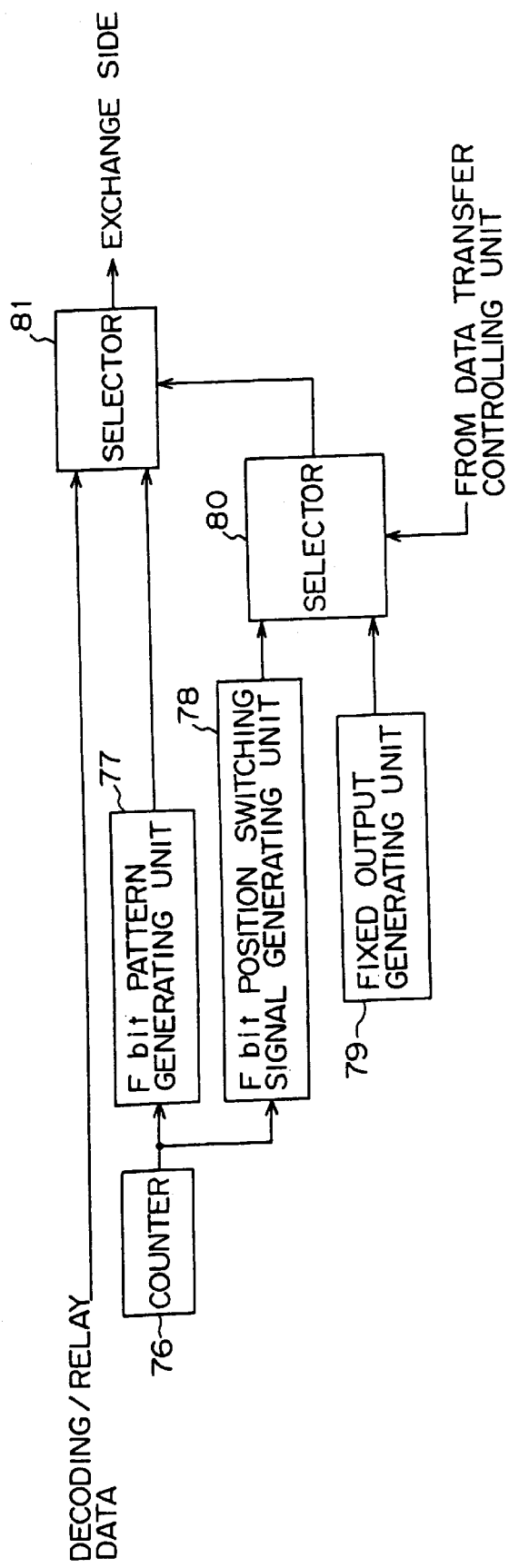
FIG. 28 is a block diagram showing the configuration of an F bit inserting unit according to the second preferred embodiment.

FIG. 28 is a block diagram showing the configuration of the F bit inserting unit according to the second preferred embodiment. As described above, F bits are inserted when the voiced state of the signal input from an exchange is detected.

The F bit inserting unit is composed of a counter 76 for counting a clock, an F bit pattern generating unit 77, an F bit position switching signal generating unit 78, a fixed output generating unit 79 for generating a fixed output when an F bit is not inserted, and two selectors 80 and 81.

Figure 29:
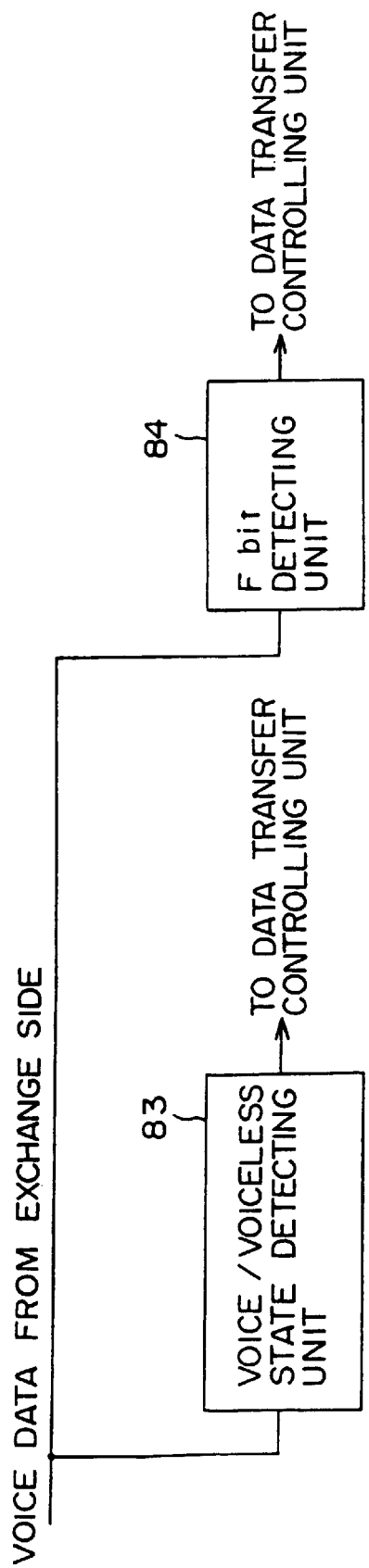
FIG. 29 is a block diagram showing the configuration of an F bit detecting unit according to the second preferred embodiment.

FIG. 29 is a block diagram showing the configuration of the F bit detecting unit. In FIG. 29, the F bit detecting unit is composed of a voiced/voiceless state detecting unit 83 and an F bit detecting unit 84, to both of which voice data from an exchange side is input.

Figure 30:
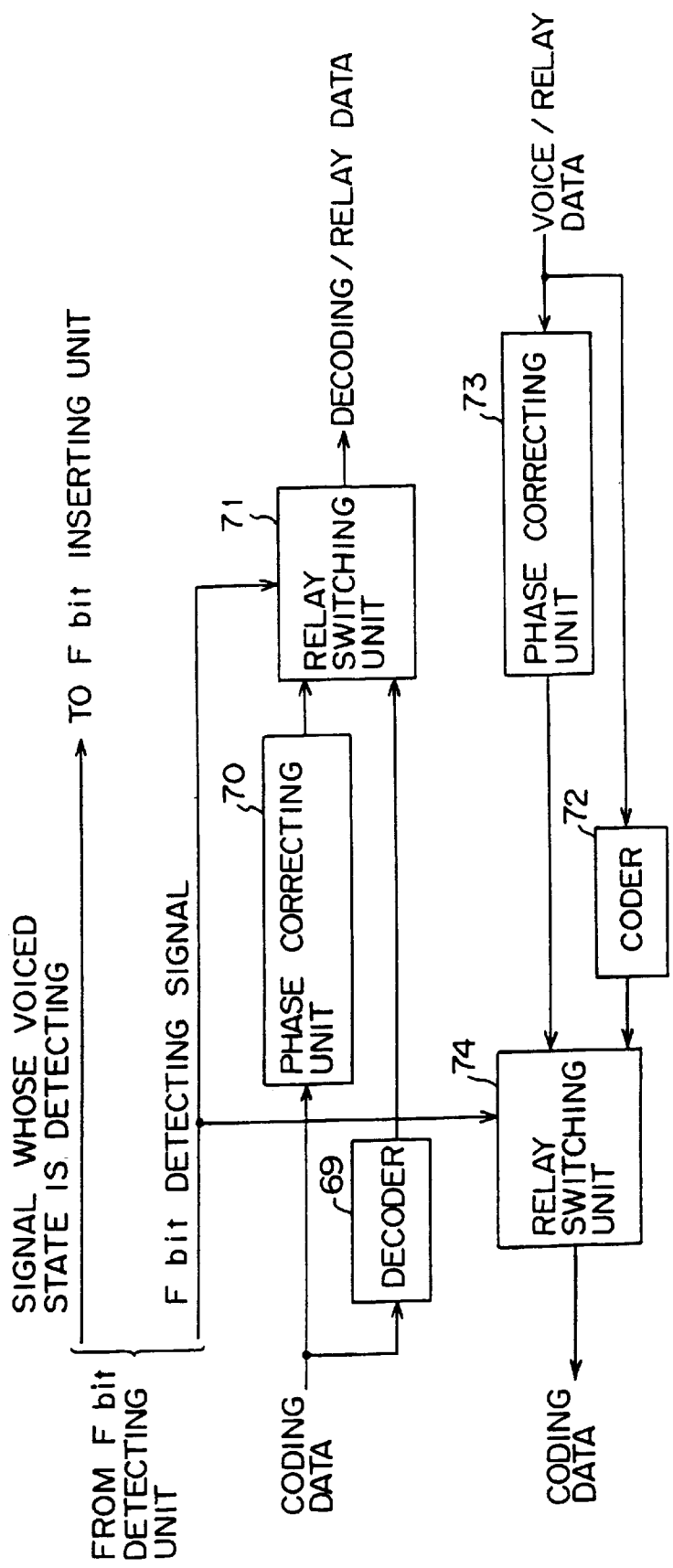
FIG. 30 is a block diagram showing the configuration of the data transfer controlling unit according to the second preferred embodiment.

FIG. 30 is a block diagram showing the configuration of the data transfer controlling unit. Compared with the F bit controlling unit according to the first preferred embodiment, which is shown in FIG. 25, there is a difference in that the switching operations of the relay switching units 71 and 74 are controlled by an F bit detection signal in FIG. 30.

Figure 31:
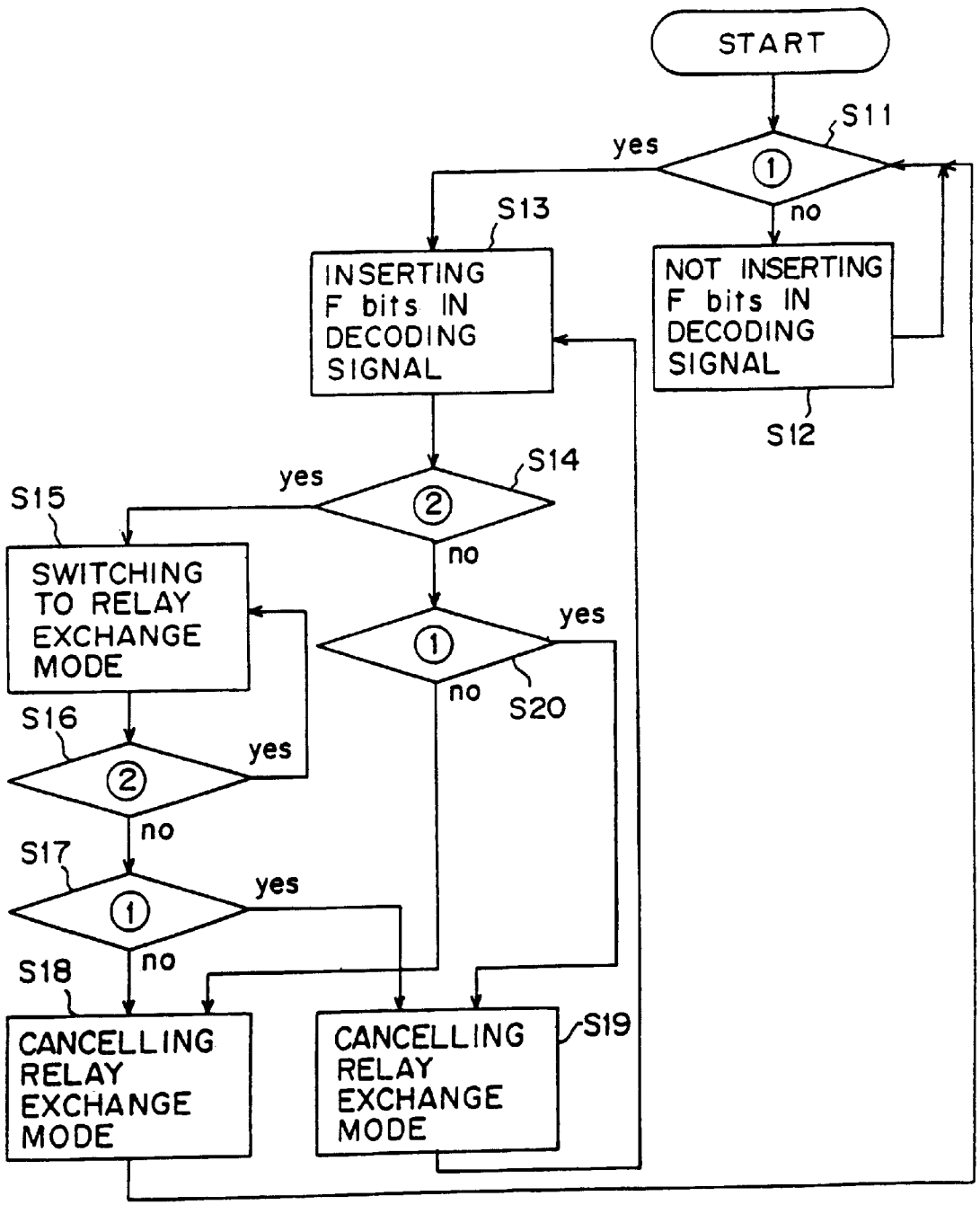
FIG. 31 is a flowchart showing the process performed by the multiplexing device according to the second preferred embodiment.

FIG. 31 is a flowchart showing the operations performed by the multiplexing device according to the second preferred embodiment. Once the process is started in FIG. 31, it is first determined whether or not the 64 Kbps signal from a PBX side is voiced in step S11 as a determination [1]. If "NO", F bits are not inserted in a decoded signal in step S12 and the process goes back to step S11.

If "YES" in step S11, F bits are inserted in the decoded signal in step S13. It is further determined whether or not synchronization establishment is detected based on F bits in step S14. If "YES", the operating mode is switched to the relay exchange mode in step S15. Then, the determination [2], that is, the determination of whether or not the detection of the synchronization establishment is continued is made in step S16. If "YES", the process goes back to step S15 and the multiplexing device continues to operate in the relay exchange mode.

If "NO" in step S16, the determination [1], that is, the determination of whether or not the signal is voiced is again made in step S17. If "NO", the call is determined to be released. Therefore, the relay exchange mode is cancelled in step 518, and the process in and after step S11 is performed. If "YES" in step S17, the relay exchange mode is cancelled in step S19 and the process in and after step S13 is performed.

If the synchronization establishment is not detected in step S14, the determination [1] is again made in step S20. If the signal is determined not to be voiced, the process in and after step S11 is performed after the relay exchange mode is cancelled in step S18. If the signal is determined to be voiced, the process in and after step S13 is performed after the relay exchange mode is cancelled in step S19.

Figure 32:
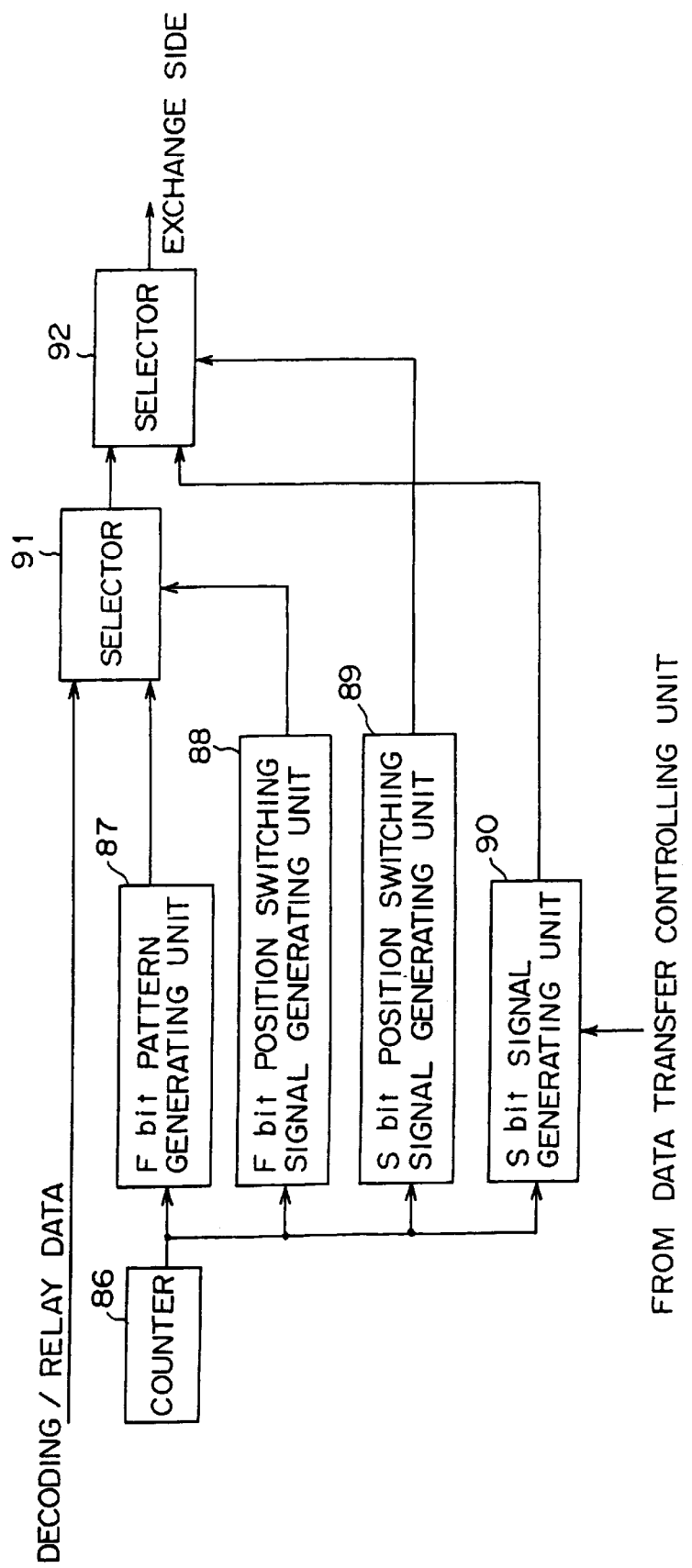
FIG. 32 is a block diagram showing the configuration of an F bit/S bit inserting unit implementing the method (1) according to the third preferred embodiment.

FIG. 32 is a block diagram showing the configuration of the F bit/S bit inserting unit implementing the method (1) according to the third preferred embodiment. With the method (1), the S bit indicating status is inserted independently from an F bit. Here, the explanation about the configuration of the F bit/S bit inserting unit is provided based on the assumption that the S bit is inserted after the corresponding F bit.

In FIG. 32, the F bit/S bit inserting unit is composed of a counter 86 for counting a clock, an F bit pattern generating unit 87, an F bit position switching signal generating unit 88, an S bit position switching signal generating unit 89, an S bit signal generating unit 90, and 8 two selectors 91 and 92. After an F bit pattern a s the output of the F bit pattern generating unit 87 is inserted in the decoding/relay data with the output of the F bit position switching signal generating unit 88, the output of the S bit signal generating unit 90, that is, an S bit, is inserted by the selector 92 with the output of the S bit position switching signal generating unit 89, and the data is output to an exchange side.

Figure 33:
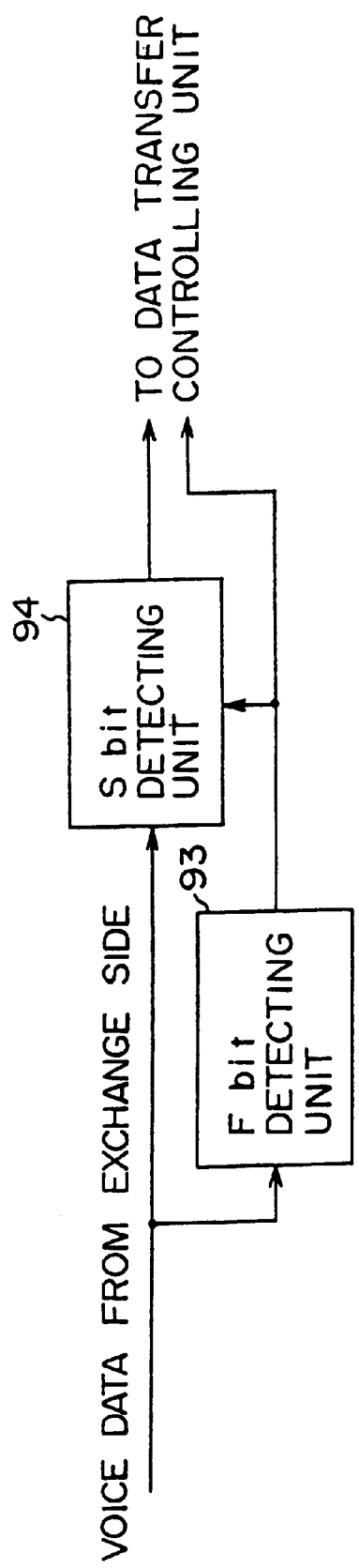
FIG. 33 is a block diagram showing the configuration of an F bit/S bit detecting unit implementing the method (1) according to the third preferred embodiment.

FIG. 33 is a block diagram showing the configuration of the F bit/S bit detecting unit. The F bit/S bit detecting unit is composed of an F bit detecting unit 93 and an S bit detecting unit 94, to both of which the voice data from an exchange side is input. Since an S bit is inserted after an F bit, the output of the F bit detecting unit 93 is provided to the S bit detecting unit 94.

As described above in detail, according to the second preferred embodiment of the present invention, the signal in which F bits are inserted is output to an exchange when the signal input from the exchange is detected to be voiced, and the switching to the relay exchange mode is made when the F bits are detected from the signal input from the multiplexing device on an opposing side via the exchange. As a result, effects similar to those in the first preferred embodiment can be obtained.

Figure 34:
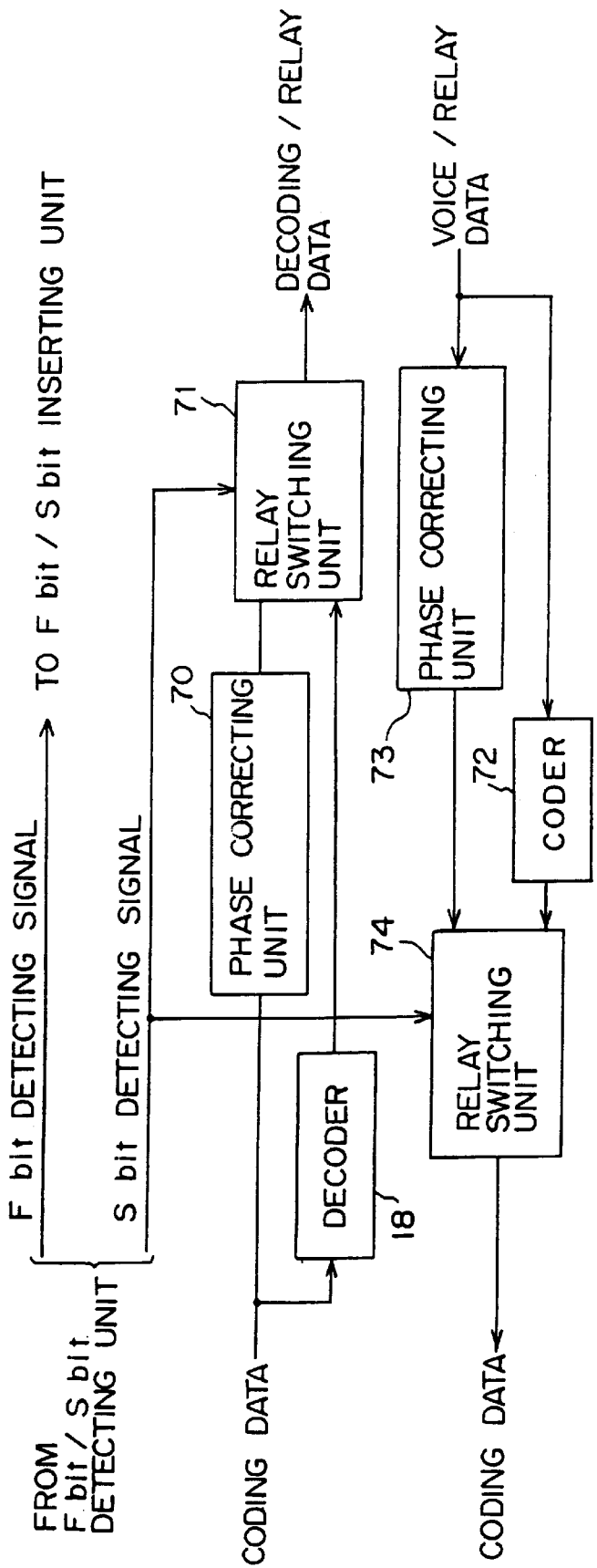
FIG. 34 is a block diagram showing the configuration of the data transfer controlling unit implementing the method (1) according to the third preferred embodiment.

FIG. 34 is a block diagram showing the configuration of the data transfer controlling unit implementing the method (1) according to the third preferred embodiment. Compared with the data transfer controlling unit according to the second preferred embodiment, which is shown in FIG. 30, there are differences in that the F bit detecting signal from the F bit/S bit detecting unit is provided to the F bit/S bit inserting unit, and that the switching operations of the two relay switching units 71 and 74 are controlled by an S bit detecting signal in FIG. 34.

Figure 35:
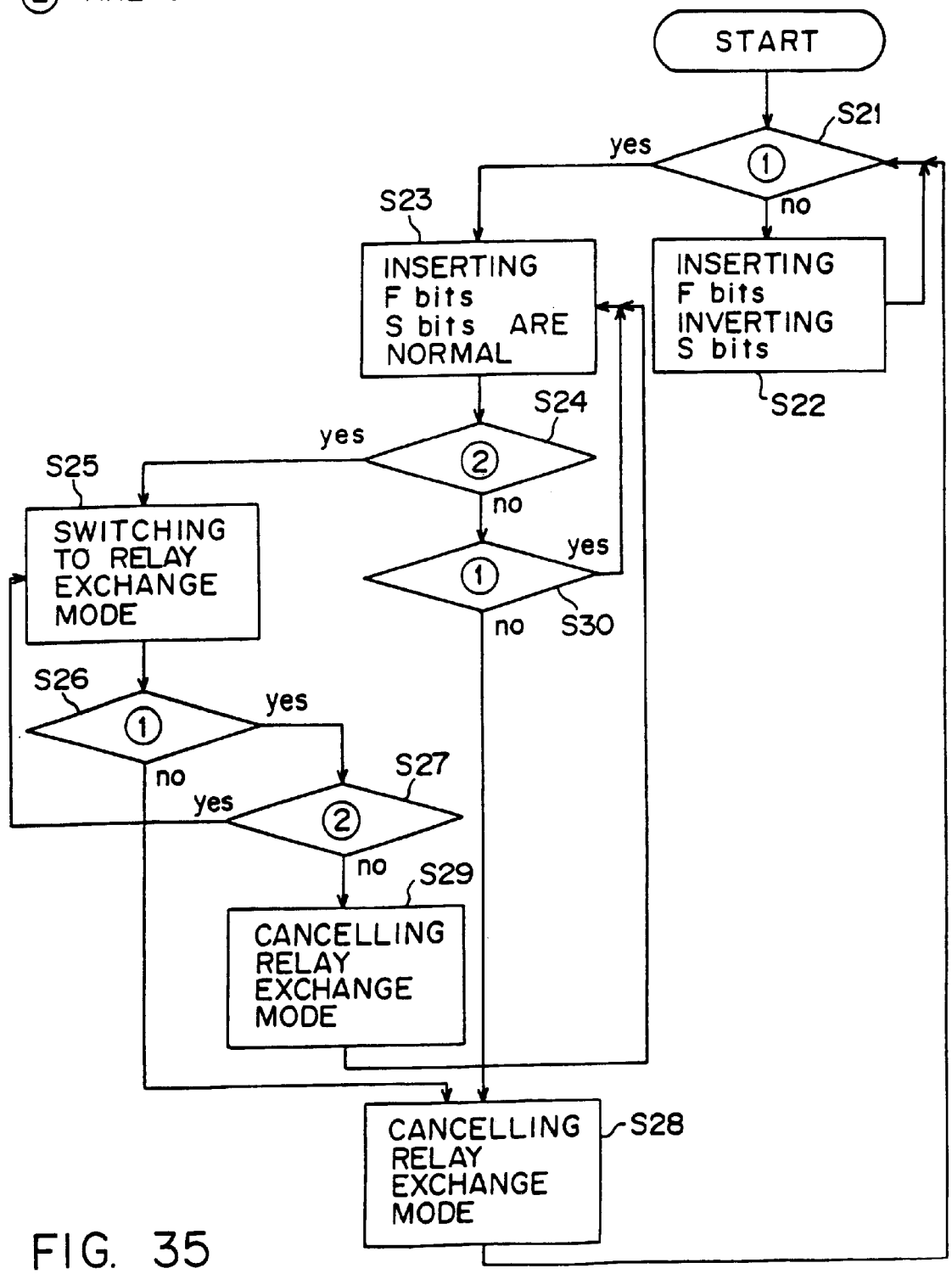
FIG. 35 is a flowchart showing the process performed by the multiplexing device included in the system (1) according to the third preferred embodiment.

FIG. 35 is a flowchart showing the operations performed by the multiplexing device implementing the method (1)

according to the third preferred embodiment. Once the process is started in FIG. 35, it is first determined whether or not F bit synchronization establishment is detected from a 64 Kbps signal in step S21 as a determination [1]. If "NO", F bits are inserted in step S22. Further, the S bit whose proper value such as "1" is inverted to "0" is inserted, and the process goes back to step S21.

When "YES" in step S21, the proper value of the S bit is inserted in addition to the F bits in step S23. It is then determined whether or not the value of the S bit included in the signal transmitted from the multiplexing device on an opposing side is proper in step S24. If "YES", the operating mode is switched to the relay exchange mode in step S25. The determination [1], that is, the determination of whether or not the detection of synchronization establishment is continued is again made in step S26. If "YES", the determination [2], that is, the determination of whether or not the value of the S bit is proper is again made in step S27. If "YES", the process goes back to step S25, and the multiplexing device continues to operate in the relay exchange mode.

If "NO" in step S26, the call is determined to be released. Therefore, the process in and after step S21 is performed after the relay exchange mode is cancelled in step S28. If the value of the S bit is determined not to be proper, a problem such as an immediate disconnection is determined to occur Therefore, the process in and after step S23 is performed after the relay exchange mode is cancelled in step S29.

If the value of the S bit is determined not to be proper in step S24, the determination [1] is again made in step S30. If the synchronization establishment is not detected, pseudo synchronization is determined to occur. Therefore, the process in and after step S21 is repeated after the relay exchange mode is cancelled in step S28. If the value of the S bit is determined to be proper, the process in and after step S23 is repeated.

FIG. 36 is a block diagram showing the configuration of the F bit/S bit inserting unit implementing the method (2) according to the third preferred embodiment. Compared with the F bit inserting unit implementing the method (1), which is shown in FIG. 32, there are differences in that the outputs of an F bit pattern generating unit 94 and an S bit signal generating unit 97 are provided to a selector 98, and its selection is controlled by the output of an S bit position switching signal generating unit 96, and that the output of the selector 98 and the decoding/relay data to an exchange are input to a selector 99, and its selection is controlled by the output of an F bit position switching signal generating unit 95. This is because S bits are inserted as some of F bits with the method (2).

The configurations of the F bit/S bit detecting unit and the data transfer controlling unit, which implement the method (2), are the same as those implementing the method (1), which are shown in FIGS. 33 and 34, and the flowchart of the operations of the multiplexing device is the same as that shown in FIG. 35. Accordingly, their explanations are omitted here. Note that the configurations of the F bit inserting unit, the F bit detecting unit, the data transfer controlling unit, etc. according to the first through third preferred embodiments, which are referred to in the explanations of FIGS. 23 through 26, are mere implementation examples. Needless to say, the present invention is not limited to these implementations.

Here, the explanations about the configuration of the multiplexing device and the flowchart of its operations are completed. Provided next is the explanation about the opposition between the multiplexing device according to the present invention and the multiplexing device of the conventional type (a). Since the multiplexing device according to the present invention uses only one type of a pattern such as "01" as an F bit pattern, the device can be used by being opposed to the multiplexing device of the conventional type (a), which uses only one type of F bit in a similar manner.

As described above in detail, according to the third preferred embodiment of the present invention, S bits are used as some of F bits in addition to F bits, and the signal in which the S bit set to ON is inserted is output to an exchange side when the path from the multiplexing device on an opposing side is connected, and the switching to the relay exchange mode is made upon detection of the ON of the S bit included in the signal input from the multiplexing device on the opposing side via the exchange, thereby obtaining effects which are almost similar to those described above.

Figure 37:
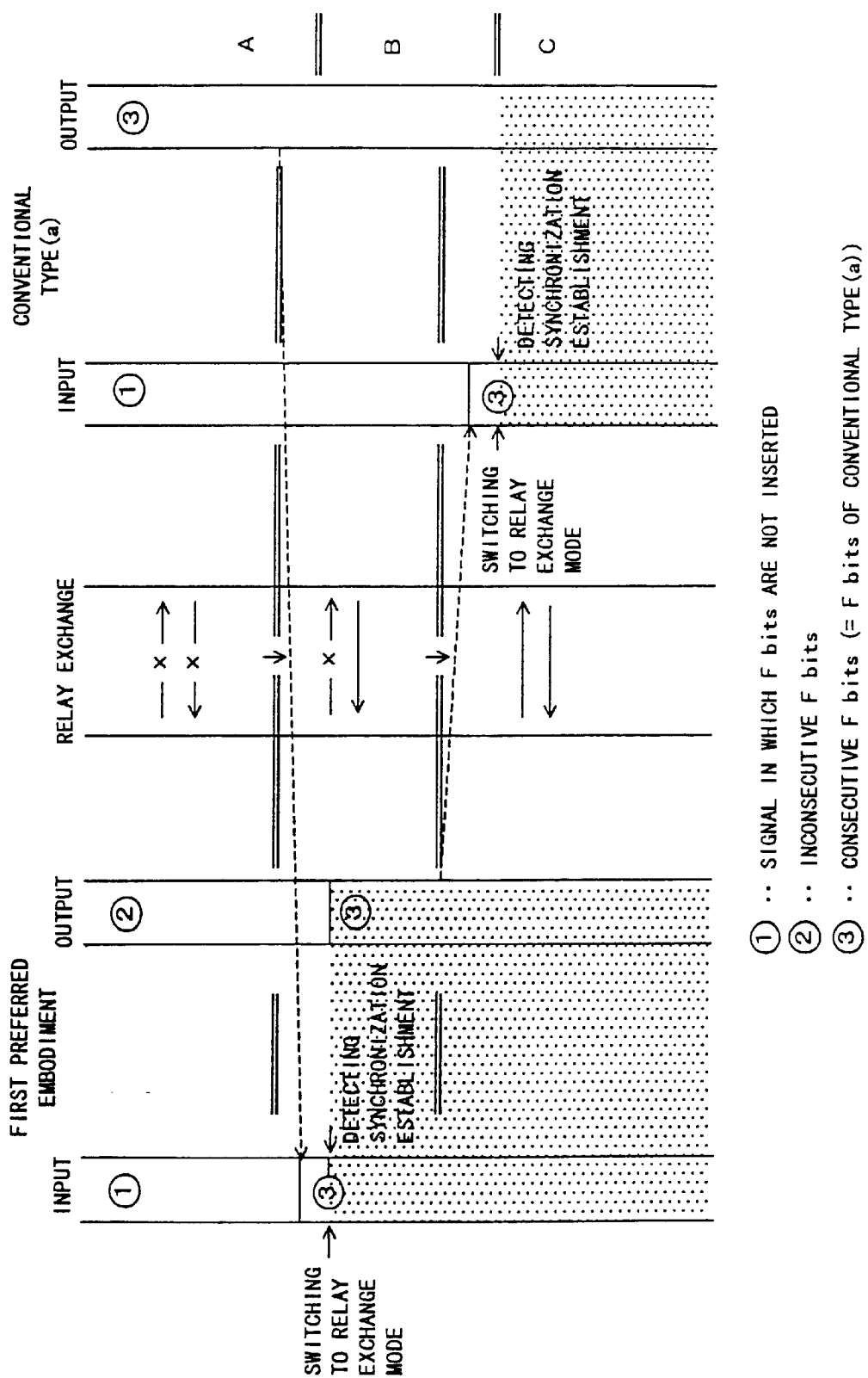
FIG. 37 is a diagram for explaining the progress of the operations for switching to the relay exchange mode when the multiplexing device according to the first preferred embodiment opposes the conventional type (a) (when the voice path to the multiplexing device according to the first preferred embodiment is initially connected)

FIG. 37 is a diagram explaining the progress of the operations for switching to the relay exchange mode, when the multiplexing device according to the first preferred embodiment and the conventional type (a) are connected. FIG. 37 shows the progress of the switching operations when the voice path from the conventional type (a) to the multiplexing device according to the first preferred embodiment is initially connected. Here, the explanation will be provided based on the assumption that the consecutive F bits used in the first preferred embodiment are the same as the F bit pattern of the conventional type (a), for example, a consecutive pattern "01". The second synchronization establishment detection number according to the first preferred embodiment is "5" as described above, while the number of F bit patterns to be detected is, for example, "4". Since the pattern "01" as the F bits of the conventional type (a) is continually and consecutively inserted, the difference between the numbers of patterns does not matter.

In the state A shown in FIG. 37, the paths in both of the directions within a relay exchange are not connected. The multiplexing device according to the first preferred embodiment outputs the coded signal [2] in which inconsecutive F bits are inserted, while the multiplexing device of the conventional type (a) outputs the signal [3] in which F bits of the conventional type (a), that are the same as the consecutive F bits are inserted.

When the path from the conventional type (a) within the relay exchange is connected in the state "B", the multiplexing device according to the first preferred embodiment detects the F bit inserted by the conventional type (a), establishes synchronization, and switches its operating mode to the relay exchange mode. At the same time, the multiplexing device according to the first preferred embodiment changes the inconsecutive F bits inserted in a voice signal so far to inconsecutive F bits, and outputs the signal.

When the other of the paths within the relay exchange, that is, the voice path to the conventional type (a) is connected in the state "C", the conventional type (a) detects synchronization establishment, and switches its operating mode to the relay exchange mode. In this way, the multiplexing device according to the present invention and the conventional type (a) can be opposed and used although the time points of switching to the relay exchange mode are not the same.

Figure 38:
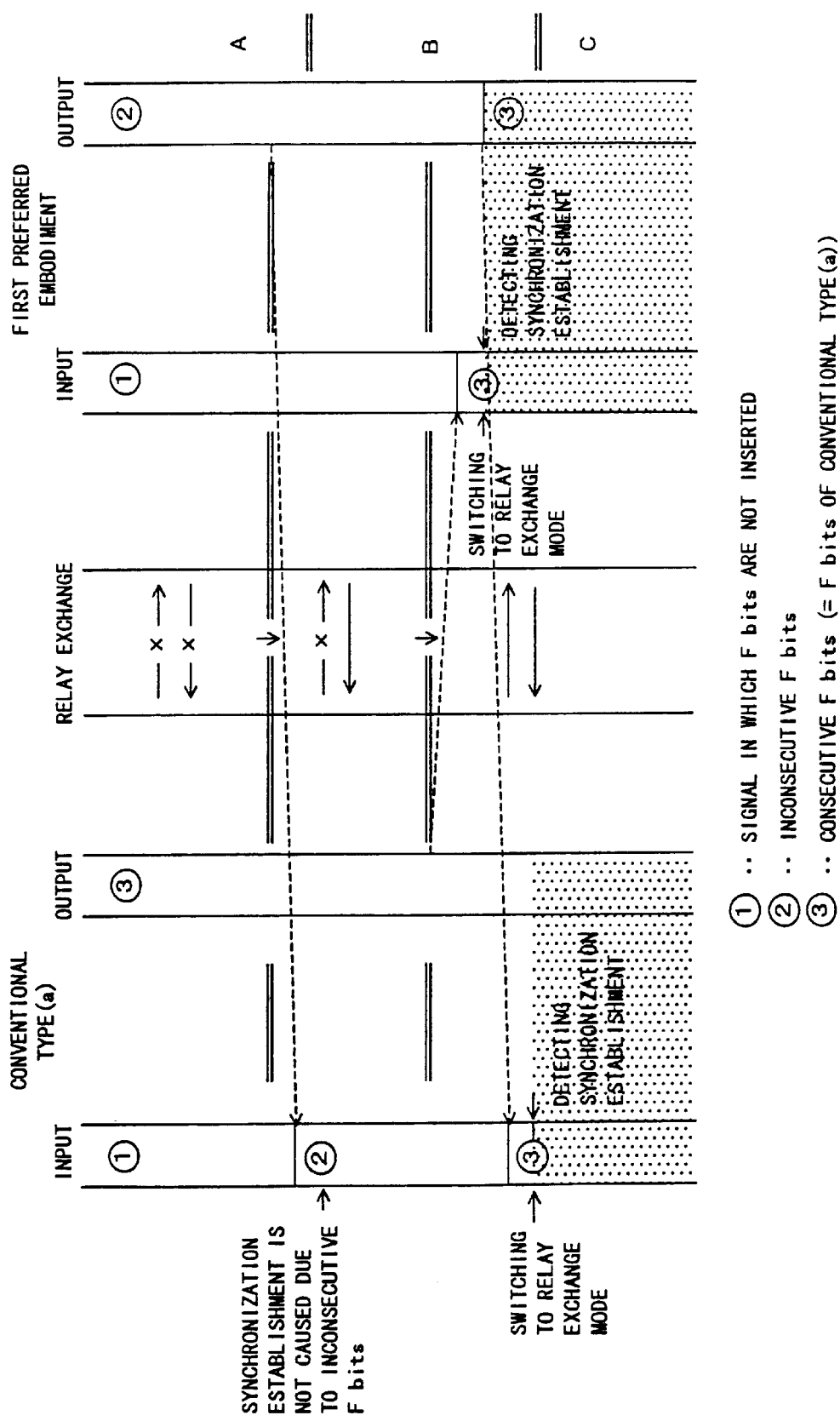
FIG. 38 is a diagram for explaining the progress of the operations for switching to the relay exchange mode when the multiplexing device according to the first preferred embodiment opposes the conventional type (a) (when the voice path to the conventional type (a) is initially connected)

FIG. 38 is a diagram explaining the progress of the operations for switching to the relay exchange mode when the multiplexing device according to the first preferred embodiment and the conventional type (a) are opposed. FIG.

38 shows the case where the voice path to the conventional type (a) is initially connected. The paths in both of the directions within a relay exchange are not connected in a state "A" shown in FIG. 38, which is the same as that shown in FIG. 37.

The voice path to the conventional type (a) is connected in a state (B). However, since the F bits inserted in the voice signal to be input to the conventional type (a) are inconsecutive, the conventional type (a) does not detect synchronization establishment, and does not switch its operating mode to the relay exchange mode at this time. When the voice path to the multiplexing device according to the first preferred embodiment is connected, the multiplexing device according to the first preferred embodiment detects synchronization establishment and switches its operating mode to the relay exchange mode. At the same time, the multiplexing device according to the first preferred embodiment inserts consecutive F bits in the voice signal instead of the inconsecutive F bits inserted so far, and inputs the voice signal to an exchange.

In a state "C", also the conventional type (a) detects the synchronization establishment with the consecutive F bits inserted in the coded signal, and switches its operating mode to the relay exchange mode.

As described above, the multiplexing device according to the first preferred embodiment of the present invention can be opposed to the conventional type (a), and used. If an exchange operates as a normal exchange, that is, if a telephone is directly connected to the exchange, the multiplexing device according to the present invention detects F bits similarly to the conventional type (a). However, since the voice signal which is directly input from the telephone to the exchange and is input from the exchange to the multiplexing device does not include F bits as a matter of course. Accordingly, the switching to the relay exchange mode is not made. For example, the switching to the relay exchange mode is not made. Namely, for example, the multiplexing device 101 shown in FIG. 1A does not switch its operating mode to the relay exchange mode. Naturally, the multiplexing device according to the present invention may be used as a multiplexing device which is directly connected to a subscriber exchange.

Provided next is the explanation about the opposition between the multiplexing device according to the second preferred embodiment and the conventional type (a). First of all, the case where the path to the conventional type (a) is initially connected will be considered. In this case, the multiplexing device according to the second preferred embodiment detects the voiceless state of the signal input from an exchange. Since F bits are not inserted in the signal, the conventional type (a) does not detects F bits from an input signal and does not switch its operating mode to the relay exchange mode. When the path to the multiplexing device according to the second preferred embodiment is connected, the voice signal in which F bits are inserted is input from the conventional type (a) to the multiplexing device according to the second preferred embodiment, which switches its operating mode to the relay exchange mode. At the same time, the multiplexing device according to the second preferred embodiment starts inserting F bits in the voice signal. The conventional type (a) receives this signal, detects the synchronization establishment, and switches its operating mode to the relay exchange mode in a similar manner.

If the path connection order is the reverse, that is, when the path to the multiplexing device according to the second preferred embodiment is initially connected, the signal in which F bits are inserted is input from the conventional type (a), and the multiplexing device according to the second preferred embodiment switches its operating mode to the relay exchange mode and starts inserting F bits. When the path to the conventional type (a) is connected next, also the conventional type (a) detects the F bit synchronization establishment, so that the operations for switching to the relay exchange mode are completed. In this way, the opposition to the conventional type (a) can be implemented.

As described above, the multiplexing device according to the second preferred embodiment can be opposed to the conventional type (a) and used. If a multiplexing device is directly connected to a subscriber exchange as the multiplexing device 101 shown in FIG. 1A, the operations for detecting the voiced state when a voice signal is input from a telephone, and for inserting F bits in the voice signal are performed. However, because the voice signal input from the exchange does not include F bits as a matter of course, the switching to the relay exchange mode is not made. The multiplexing device according to the second preferred embodiment may be used as the multiplexing device 101 in this case.

Provided next is the explanation about the opposition between the multiplexing device implementing the method (1) according to the third preferred embodiment and the conventional type (a). With the method (1), ON of a status bit is defined to be "1" as described above. Additionally, "1" is normally stored in an unused bit of a coded signal while switching to the relay exchange mode is being made, so that control is performed in order not to generate a lot of noise after the signal is converted into an analog signal.

When the path to the conventional type (a) is initially connected, the conventional type (a) detects the F bits that the multiplexing device implementing the method (1) inserts in a voice signal independently from the S bits, and switches its operating mode to the relay exchange mode. When the path to the multiplexing device implementing the method (1) is connected next, the multiplexing device implementing the method (a) detects the F bits from the conventional type (a). Additionally, since "1" is stored in an unused bit as described above, the multiplexing device implementing the method (1) detects the value of the S bit stored in the unused position as "1", that is ON, and switches its operating mode to the relay exchange mode in a similar manner.

If the path connection order is the reverse, that is, when the path to the multiplexing device implementing the method (1) is initially connected, the conventional type (a) detects F bits. However, it does not switch its operating mode to the relay exchange mode and does not perform the above described operation for storing "1" in an unused bit. Accordingly, the data at the positions corresponding to S bits are random. The detection of S bits, which is performed by the multiplexing device implementing the method (1), is protected. That is, S bits are determined to be ON only when the values of 5 or more S bits are detected to be ON. With this protection mechanism, the S bits included in the signal transmitted from the conventional type (a) are determined not to be ON. As a result, the multiplexing device implementing the method (1) does not switch its operating mode to the relay exchange mode.

When also the path to the conventional type (a) is connected next, the conventional type (a) detects the F bits, and switches its operating mode to the relay exchange mode. Because the conventional type (a) performs the operation for storing "1" in an unused bit after switching to the relay exchange mode, the multiplexing device implementing the method (1) which receives the voice signal determines the S bits to be ON, and completes the switching to the relay exchange mode. Although the multiplexing device implementing the method (1) requires the insertion and detection of S bits as described above, it can provide a voice quality equivalent to that of the conventional type (a).

Figure 39:
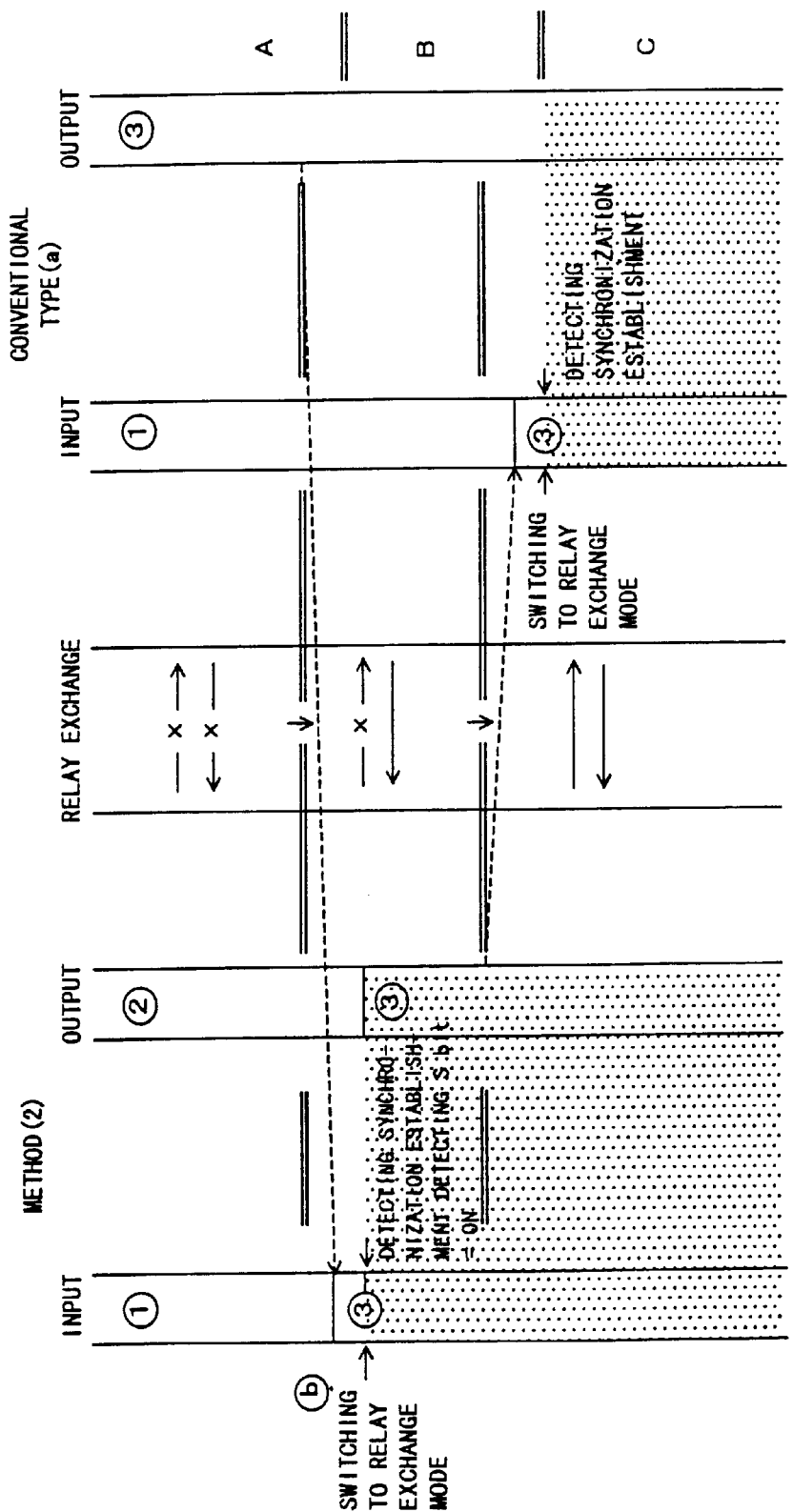
FIG. 39 is a diagram for explaining the progress of the operations for switching to the relay exchange mode when the multiplexing device included in the system (2) according to the third preferred embodiment opposes the conventional type (a) (when the path to the system (2) side is initially connected)

FIG. 39 is a diagram explaining the progress of the operations for switching to the relay exchange mode, when the multiplexing device implementing the method (2) according to the third preferred embodiment opposes the conventional type (a). FIG. 39 shows the case where the voice path to the multiplexing device implementing the method (2) is initially connected. As described above, the multiplexing device implementing the method (2) uses some of the F bits as S bits, and respectively defines the same values as those of an F bit pattern and the inverted values of an F bit pattern to be ON and OFF as the S bits. An F bit synchronous pattern when S bits are ON is assumed to be the same as that of the conventional type (a).

A state "A" shown in FIG. 39 is a state where the paths in both of the directions within a relay exchange are not connected. In this state, the multiplexing device implementing the method (2) inserts F bits including the S bits set to OFF in a voice signal, while the conventional type (a) continually inserts F bits in a coded signal.

When the voice path to the multiplexing device implementing the method (2) is connected in a state "B", the multiplexing device implementing the method (2) detects the F bits from the conventional type (a). Since this is the same as an F bit signal, the multiplexing device. implementing the method (2) detects synchronization establishment and switches its operating mode to the relay exchange mode. At the same time, the multiplexing device implementing the method (2) inserts the F bits including the S bits set to ON in a voice signal, and outputs the signal to an exchange instead of the signal in which the S bits set to OFF are inserted.

Also the voice path to the conventional type (a) is connected in a state "C", and the voice signal in which the F bits including the S bits set to ON are inserted is input to the conventional type (a). As a result, also the conventional type (a) switches its operating mode to the relay exchange mode.

Figure 40:
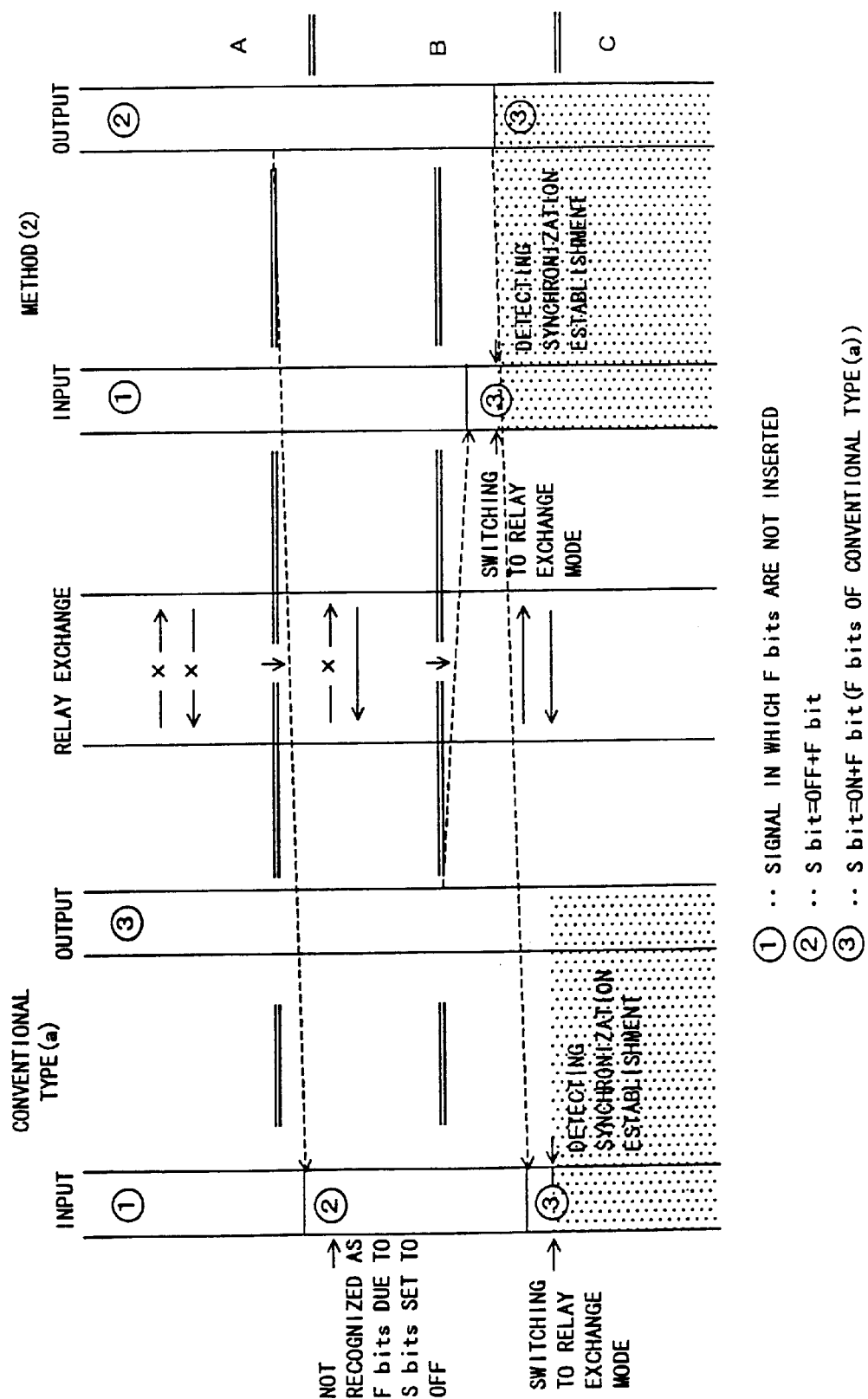
FIG. 40 is a diagram for explaining the progress of the operations for switching to the relay exchange mode when the multiplexing device included in the system (2) according to the third preferred embodiment opposes the conventional type (a) (the path to the conventional type (a) is initially connected)

FIG. 40 is a diagram explaining the progress of the operations for switching to the relay exchange mode, when the voice path to the conventional type (a) is initially connected between opposing multiplexing devices, one of which is the multiplexing device implementing the method (2) and the other of which is the conventional type (a). A state "A" shown in FIG. 40 is the same as that shown in FIG. 39. Even if the voice path to the conventional type (a) is connected in a state "B", the F bits that the multiplexing device implementing the method (2) inserts in a voice signal are the bits obtained by setting the S bits to OFF. Therefore, the conventional type (a) does not detect the F bits, and does not switch its operating mode to the relay exchange mode. When the path to the multiplexing device implementing the method (2) is connected, the multiplexing device implementing the method (2) detects the F bits from the conventional type (a), and switches its operating mode to the relay exchange mode. At the same time, the multiplexing device implementing the method (2) inserts the F bits including the S bits set to ON in a voice signal, and outputs the signal to an exchange.

This voice signal is input to the conventional type (a) in a state "C", so that the operations for switching to the relay exchange mode are completed with the detection of the F bits.

As described above in detail, the multiplexing device according to the first, second, or third preferred embodiment of the present invention can be opposed to the multiplexing device of a conventional type via an exchange. Therefore, also the conventional multiplexing device can be utilized, which greatly contributes to the practical use of a digital 1-link relay capability.

FIG. 41A is a time chart showing the operations for initially connecting an upstream path when an A side originates a call to a D side, according to the present invention.

When the A side notifies that the call is originated, a digital relay exchange connects an upstream path ES from a TTC-2-Mbps line B to a line C. A multiplexing device #2 then receives a PCM signal to which inconsecutive F bits are added by a decoder D1 of a multiplexing device #1, inserts one particular bit pattern, detects synchronization establishment, and inserts consecutive F bits in the PCM signal.

Next, the digital relay exchange connects a downstream path ER from the line C to the line B upon completion of the connection of the call. The multiplexing device #1 receives the PCM signal to which the consecutive bits are added by a decoder D2 of the multiplexing device #2, inserts one particular bit pattern, detects the synchronization establishment, and inserts the consecutive F bits in the PCM signal. Also the multiplexing device #2 receives the PCM signal to which the consecutive F bits are added by the decoder D1 of the multiplexing device #1.

The multiplexing device #1 detects the synchronization establishment, switches the multiplexing device #1 itself to the state where the coder C1 and the decoder D1 are not connected, that is, the relay exchange mode, and enters a through state. Almost at the same time, the multiplexing device #2 detects the synchronization establishment, switches the multiplexing device #2 itself to the state where a coder C2 and the decoder D2 are not connected, that is, the relay exchange mode, and enters the through state. Here, the connection between the A and D sides is completed.

Figure 1N:
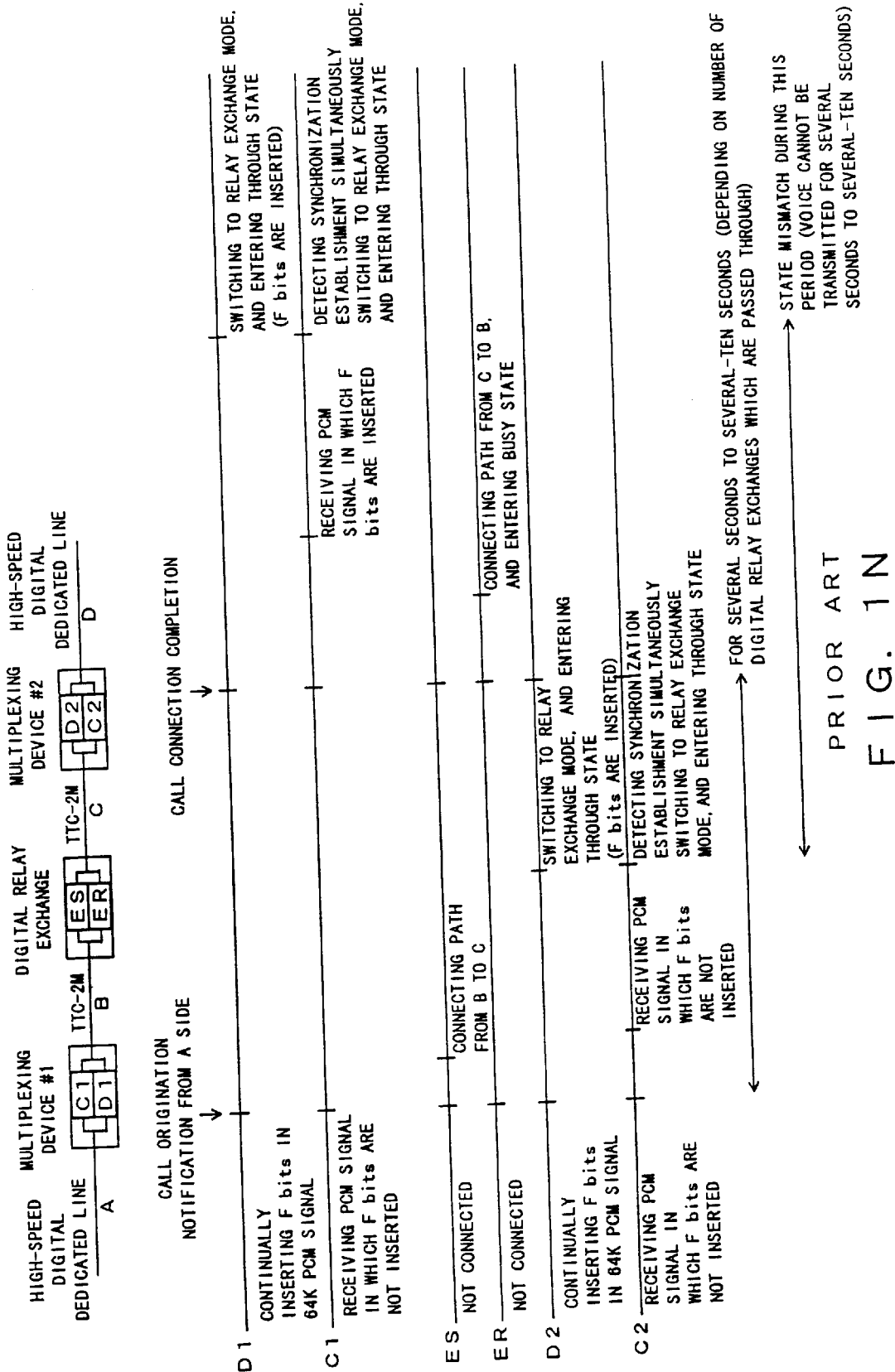
FIG. 1N is a time chart showing the connection operations performed by the multiplexing device of the conventional type (a), when an A side originates a call to a D side, and an upstream is initially connected.

In such a connection flow, the impassable state due to the state mismatch from the time point at which the coder C2 and the decoder D2 enter the through state till the time point at which the coder C1 and the decoder D1 enter the through state is as short as several microseconds to several milliseconds. This impassable time period is much shorter than that in the conventional case explained by referring to FIG. 1N.

Figure 41B:
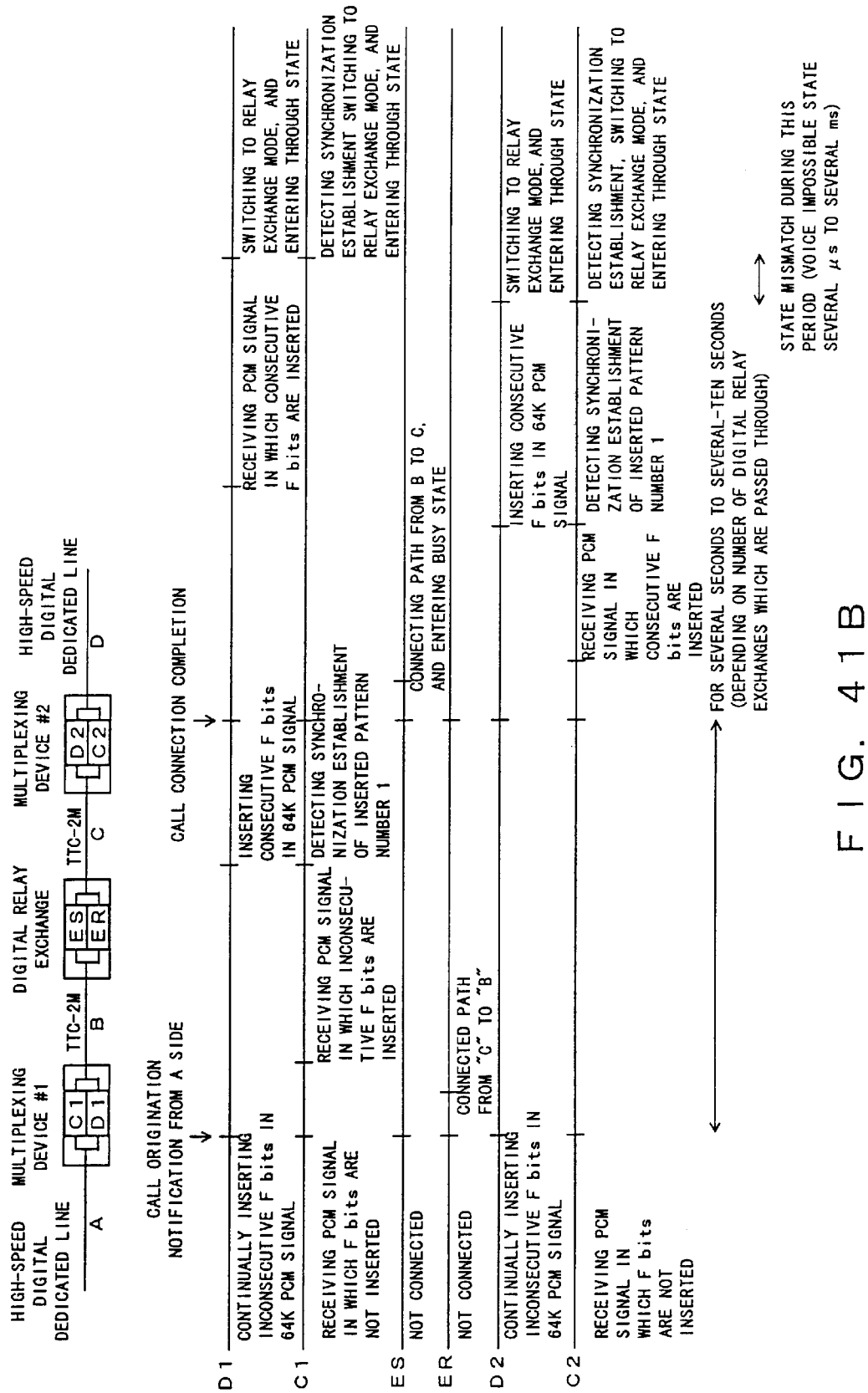
FIG. 41B is a time chart showing the connection operations performed when the A side originates a call to the D side, and a downstream is initially connected, according to the present invention.

FIG. 41B is a time chart showing the operations for initially connecting a downstream path when an A side originates a call to a D side, according to the present invention.

When the A side notifies that the call is originated, a digital relay exchange connects a downstream path ER from a line C to a line B. A multiplexing device #1 receives the PCM signal to which inconsecutive F bits are added by a decoder D2 of a multiplexing device #2, inserts one particular bit pattern, detects synchronization establishment, and inserts consecutive F bits in the PCM signal.

Next, the digital relay exchange connects an upstream path ES from a line B to a line C upon completion of the connection of the call. The multiplexing device #2 receives the PCM signal to which the consecutive F bits are added by the decoder D1 of the multiplexing device #1, inserts one particular bit pattern, detects the synchronization establishment, and inserts the consecutive F bits in the PCM signal. Also the multiplexing device #1 receives the PCM signal to which the consecutive F bits are added by the decoder D2 of the multiplexing device #2.

Then, the multiplexing device #2 detects the synchronization establishment, switches the multiplexing device #2 itself to the state where the coder C2 and the decoder D2 are not connected, that is, the relay exchange mode, and enters a through state. Almost at the same time, the multiplexing device #1 detects the synchronization establishment, switches the multiplexing device #1 itself to the state where the coder C1 and the decoder D1 are not connected, that is, the relay exchange mode, and enters a through state. Here, the connection between the A and D sides is completed.

In such a connection flow, the impassable state due to the state mismatch from the time point at which the coder C1 and the decoder D1 enter the through state till the time point at which the coder C2 and the decoder D2 enter the through state is as short as several microseconds to several milliseconds. This impassable time period is much shorter than that in the conventional case explained by referring to FIG. 1P.

Figure 42A:
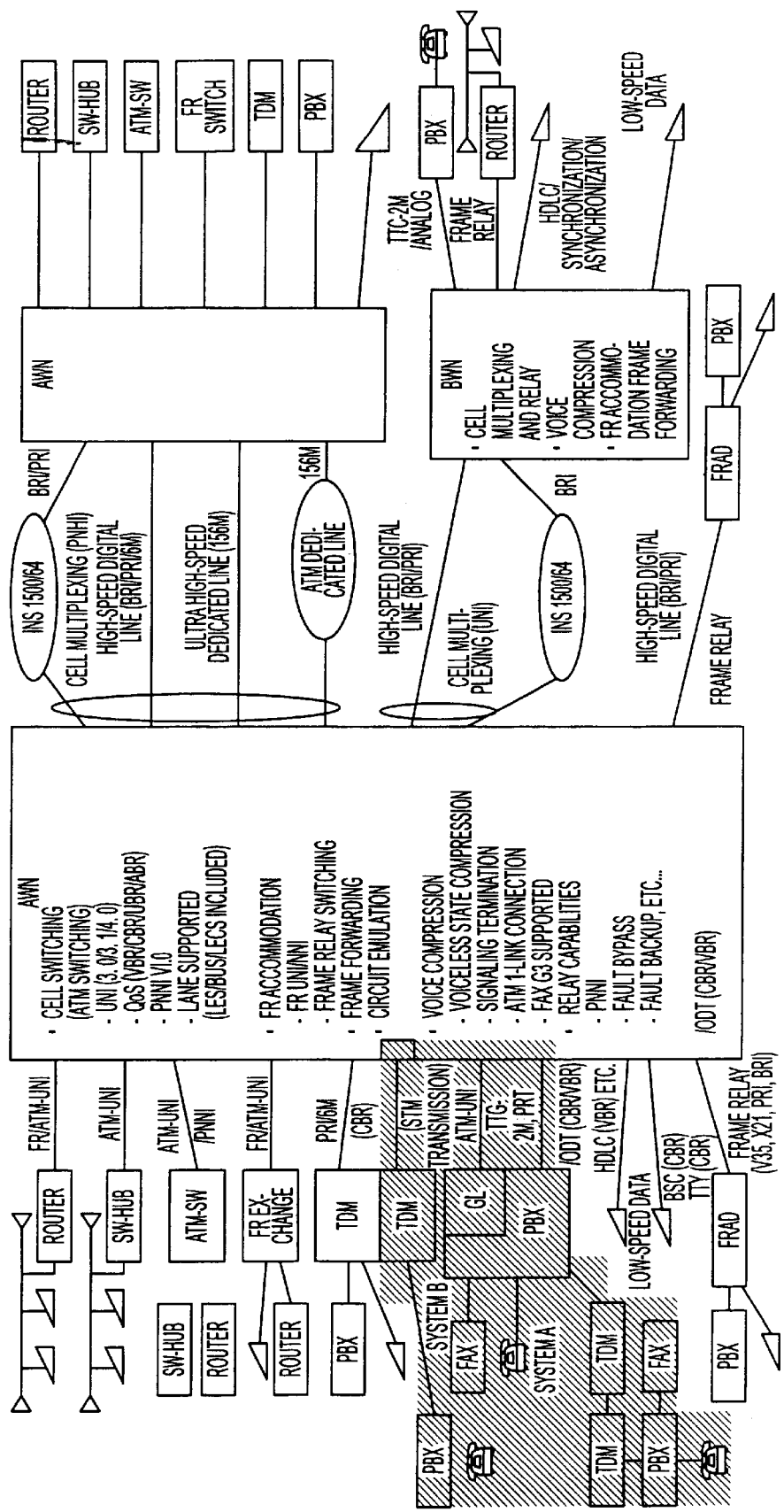
FIG. 42A is a schematic diagram showing the configuration of an AWN network to which the multiplexing device according to the present invention can be applied.

Provided next is the explanation about the application of the multiplexing device according to the present invention to an ATM wide area network. The multiplexing device according to the present invention is not limited to the voice network system explained by referring to FIG. 22, and can be applied to various communications systems. FIG. 42A is a schematic diagram showing the configuration of an ATM wide area network (AWN) as such a communications system. This ATM wide area network interconnects a plurality of local area networks (LANs) or a wide area network as a branch (BWN), and basically makes communications by using ATM cells. Its applied area covers the relay band from narrow to broad. The ATM wide area network accommodates existing voice/low-speed data, and LAN frame relay/ATM data, so that the bandwidth can be effectively used by relaying cells. Particularly, this aims at realizing efficient, high quality voice accommodation.

In an AWN, both of the ATM mode and TDM (Time Division Multiplexing) mode are supported in order to transmit voice signals. Fundamentally, also voice data are put into cells and transmitted. If a coding/decoding delay caused by a CODEC and a delay caused by putting voice data into cells are not allowable, the TDM mode is used. Since a transmission destination is stored in a cell as data in the ATM mode, the AWN itself serves as a PBX (Private Branch Exchange), which eliminates the need for arranging a PBX. In the meantime, a PBX is required in the TDM mode. In this case, the PBX is configured in a similar manner as in the case where a TDM device is connected, and may sometimes perform relay and switching operations. The voice multiplexing device according to the present invention is therefore used in this case.

Figure 42B:
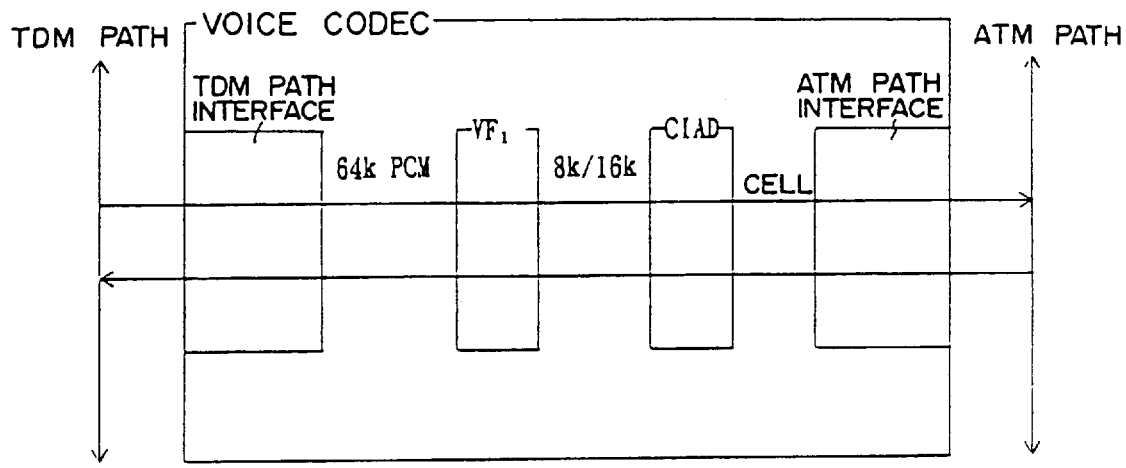
FIG. 42B is a diagram for explaining the operations performed by a voice CODEC at the time of an ATM relay transmission in the AWN network.
Figure 42C:
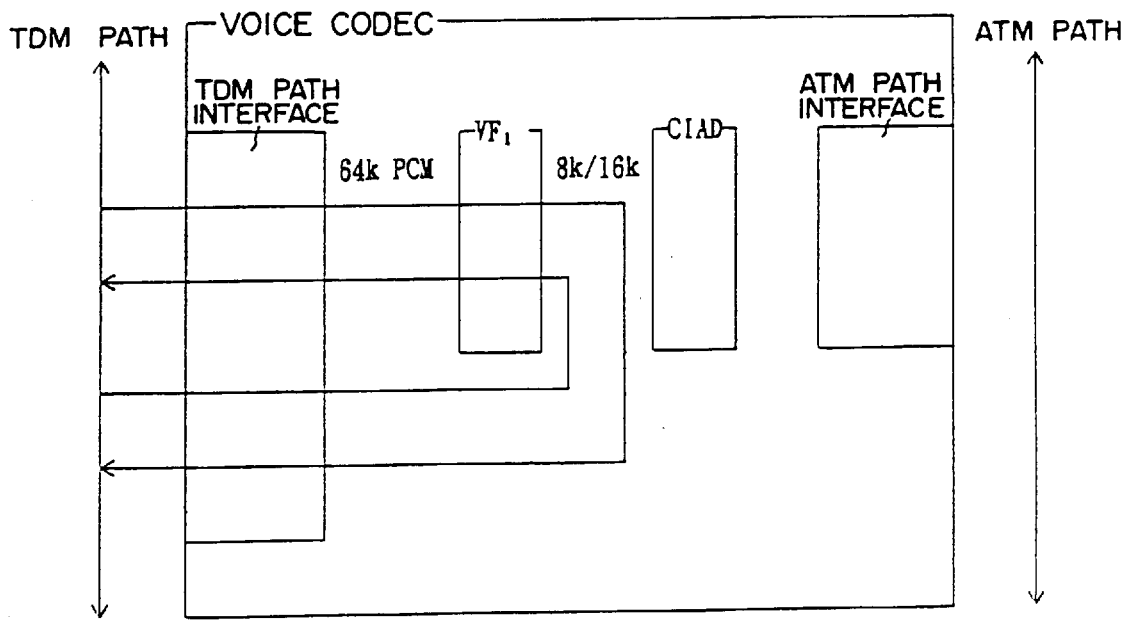
FIG. 42C is a diagram for explaining the operations performed by the voice CODEC at the time of a TDM relay transmission in the AWN network.

FIG. 42B is a diagram explaining the operations performed by a voice CODEC at the time of an ATM relay transmission in an AWN, while FIG. 42C is a diagram explaining the operations performed by a voice CODEC at the time of a TDM relay transmission in the AWN. As shown in FIG. 42B, data is exchanged between a TDM path and an ATM path, and coded voice data is put into cells and transmitted/received over the ATM path, at the time of the ATM relay transmission.

As shown in FIG. 42C, coded voice data is not put into cells, and the TDM relay transmission is performed via the TDM path in the TDM mode.

Figure 42D:
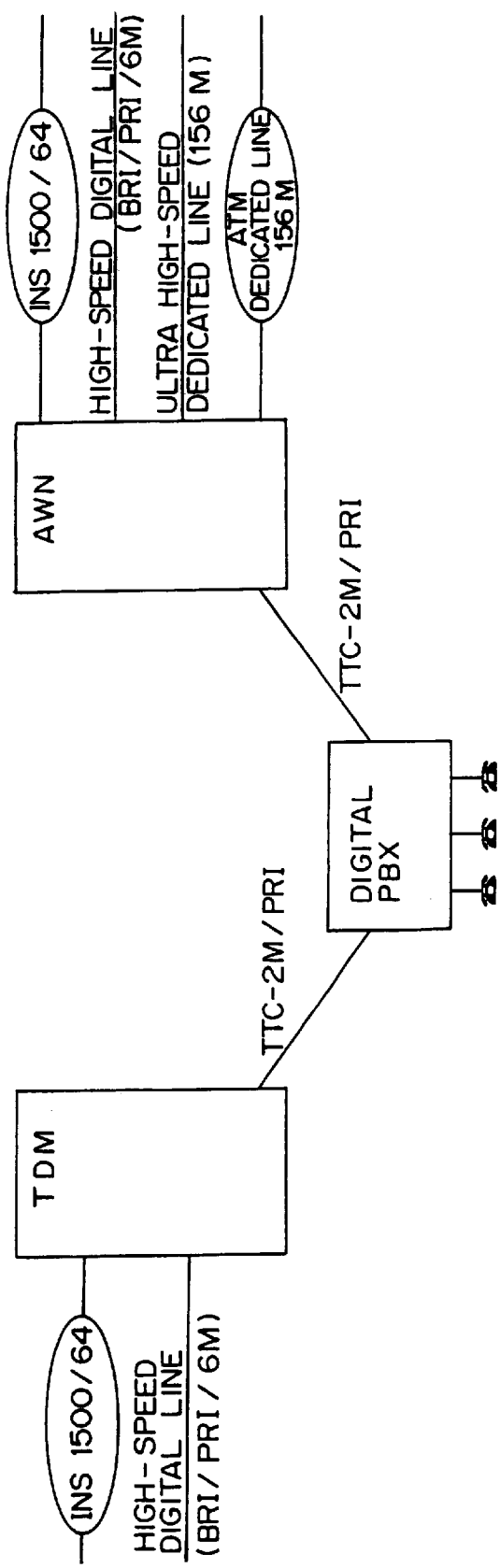
FIG. 42D is a block diagram exemplifying the configuration of the AWN network to which the multiplexing device according to the present invention can be applied (No. 1)

FIG. 42D is a block diagram exemplifying the configuration of an AWN network to which the multiplexing device according to the present invention can be applied (No. 1).

FIG. 42D shows the portion where "a system A" is extracted from the shaded portion shown in FIG. 42A, and shows the configuration where the multiplexing device (digital PBX) according to the present invention is connected between an AWN and a TDM.

Figure 42E:
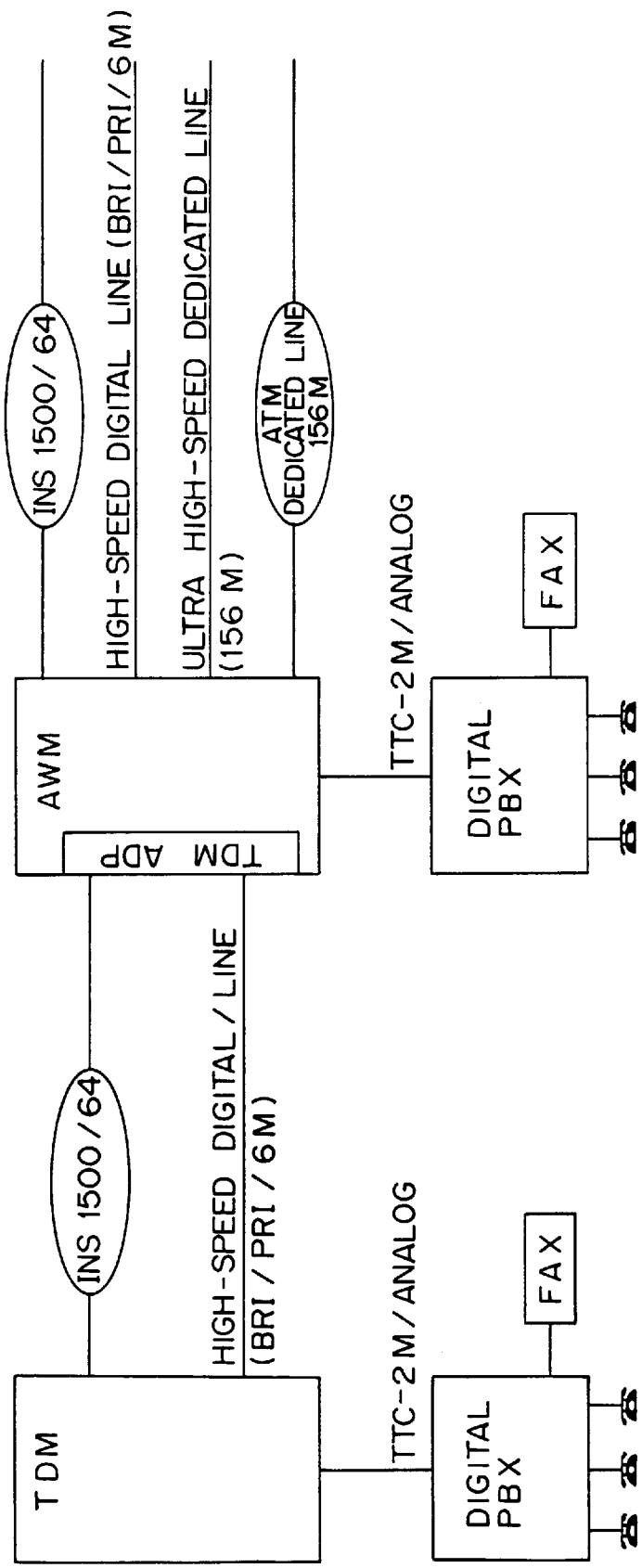
FIG. 42E is a block diagram exemplifying the configuration of the AWN network to which the multiplexing device according to the present invention can be applied (No. 2)

FIG. 42E is a block diagram exemplifying the configuration of an AWN network to which the multiplexing device according to the present invention can be applied (No. 2).

FIG. 42E shows the portion where "a system B" is extracted from the shaded portion shown in FIG. 42A, and shows the configuration where the multiplexing devices (digital PBXs) according to the present invention are respectively connected to an AWN and a TDM, both of which are directly connected.

Provided last is the explanation about the operations for loading a program into a computer which configures the multiplexing device according to the present invention. Hardware circuitry configuration was mainly referred to, for example, as the configuration of the F bit inserting unit shown in FIG. 23. Naturally, however, software control is performed also for controlling the operations performed by the circuitry. The multiplexing device according to the present invention includes a computer for controlling software in addition to the hardware such as a decoder, a coder, etc., which are directly involved in communications.

FIG. 43 is a schematic diagram explaining the operations for loading a program for switching to the relay exchange mode into a computer. In FIG. 43, a computer 15 is composed of a main body 16 and a memory 17. The program may be loaded from a portable storage medium 19 into the main body 16, or from a program provider side via a network 18.

The programs recited in claims 19 through 22 of the present invention, or the programs depicted by the flowcharts of FIGS. 27, 31, and 35 are stored, for example, in the memory 17, and these programs are executed by the main body 16. As the memory 17, for example, a random access memory (RAM), or a hard disk, etc. is used.

Additionally, the program for switching to the relay exchange mode is stored on the portable storage medium 19. The switching to the relay exchange mode may be made by loading the program into the computer 15. An arbitrary storage medium such as a memory card, a floppy disk, a CD-ROM (Compact Disk-Read Only Memory), an optical disk, a magneto-optical disk, etc., which are marketed and distributable, can be used as the portable storage medium 19. Furthermore, the switching to the relay exchange mode can be implemented also by transmitting the program for switching to the relay exchange mode from a program provider side to the computer 15 side via the network 18, and by loading the program.

What is claimed is:

1. A multiplexing device comprising:
    a transmitting unit for bypassing a process for converting data received from a network side, and for transmitting the data to an exchange side;
    a receiving unit for bypassing a process for converting the data which is received from the exchange and is bypassed by said transmitting unit, and for relaying the data; and
    a controlling unit for controlling bypass operations of the data after verifying connections on both sides of a bidirectional communication path by using a single pattern as a synchronous bit pattern,
    wherein said controlling unit is arranged within a multiplexing device which opposes a multiplexing device on an opposing side via the exchange, said controlling unit including:

first periodic signal inserting means for inserting a first periodic signal, which periodically or intermittently includes one or more predetermined bit patterns, in a signal to be output to the multiplexing device on the opposing side, and for outputting the signal to the exchange side, when a path from the multiplexing device on the opposing side is not connected;

second periodic signal inserting means for inserting a second periodic signal, which periodically or intermittently includes one or more bit patterns identical to the predetermined bit patterns or one or more different bit patterns in addition to the one or more predetermined bit patterns, in the signal to be output to the multiplexing device on the opposing side, and for outputting the signal to the exchange side, from a time point at which the first periodic signal inserted by said first periodic signal inserting means on the opposing side is detected within a signal input from the exchange after the path from the multiplexing device on the opposing side is connected; and operating mode switching means for switching the multiplexing device itself to a relay exchange mode for relaying an input signal without coding or decoding the input signal, and for relaying the input signal, when the second periodic signal inserted by said second periodic signal inserting means on the opposing side is detected within the signal input from the exchange, and wherein a digital 1-link relay capability can be implemented.

2. The multiplexing device according to claim 1, wherein said second periodic signal inserting means includes:

comparing means for making a comparison between the signal input from the exchange and a signal corresponding to the first periodic signal; and first bit pattern number comparing means for detecting an input of the first periodic signal by detecting a number of bit patterns included in the first periodic signal, upon receipt of an output from said comparing means.

3. The multiplexing device according to claim 1, wherein said operating mode switching means includes:

comparing means for making a comparison between the signal input from the exchange and a signal corresponding to the second periodic signal;

second bit pattern number comparing means for detecting an input of the second periodic signal by detecting the number of bit patterns included in the second periodic signal, upon receipt of an output of said comparing means; and relay switching means for correcting a phase of the signal input from the exchange according to an output of said second bit pattern number comparing means, and for relaying the signal.

4. The multiplexing device according to claim 1, wherein:

said first periodic signal outputting means makes a number of predetermined bit patterns equal to or smaller than a number of identical bit patterns included in a periodic signal which is inserted by a multiplexing device of a conventional type for immediately switching to the relay exchange mode upon detection of the number of predetermined bit patterns; and said second periodic signal inserting means makes bit patterns, which are inserted in addition to the one or more predetermined bit patterns, identical to the predetermined bit pattern, and makes a total number of the bit patterns equal to or larger than the number of identical patterns included in a periodic signal inserted by the multiplexing device of the conventional type, and wherein the multiplexing device can be opposed to the multiplexing device of the conventional type via the exchange.

5. The multiplexing device according to claim 1, wherein:

if the signal exchanged by the exchange is voice data, said first periodic signal inserting means and/or said second periodic signal inserting means inserts the first periodic signal and/or the second periodic signal in LSBs of the voice data.

6. A multiplexing device comprising:

a transmitting unit for bypassing a process for converting data received from a network side, and for transmitting the data to an exchange side;

a receiving unit for bypassing a process for converting the data which is received from the exchange and is bypassed by said transmitting unit, and for relaying the data; and a controlling unit for controlling bypass operations of the data after verifying connections on both sides of a bidirectional communication path by using a single pattern as a synchronous bit pattern, wherein said controlling unit is arranged within a multiplexing device which opposes a multiplexing device on an opposing side, said controlling unit including:

periodic signal inserting means for inserting a periodic signal which periodically or intermittently includes one or more predetermined bit patterns, in a signal to be output to the multiplexing device on the opposing side, and for outputting the signal to the exchange side, from a time point at which a change from a disconnected to connected state of a path from the multiplexing device on the opposing side is detected with a change from a voiceless to a voiced state of a signal input from the exchange; and operating mode switching means for switching the multiplexing device itself to a relay exchange mode for relaying an input signal without coding or decoding the input signal, and for relaying the input signal, when the periodic signal inserted by said periodic signal inserting means on the opposing side is detected within the signal input from the exchange, after the path from the multiplexing device on the opposing side is connected, and wherein a digital 1-link relay capability can be implemented.

7. The multiplexing device according to claim 6, wherein:

said periodic signal inserting means makes a number of bit patterns included in the periodic signal equal to or larger than a number of identical bit patterns included in a periodic signal which is inserted by a multiplexing device of a conventional type for immediately switching to the relay exchange mode upon detection of the number of predetermined bit patterns, and wherein the multiplexing device can be opposed to the multiplexing device of the conventional type via the exchange.

8. The multiplexing device according to claim 6, wherein:

if a signal exchanged by the exchange is voice data, said periodic signal inserting means inserts the periodic signal in LSBs of the voice data.

9. A multiplexing device comprising:

a transmitting unit for bypassing a process for converting data received from a network side, and for transmitting the data to an exchange side;

a receiving unit for bypassing a process for converting the data which is received from the exchange and is bypassed by said transmitting unit, and for relaying the data; and a controlling unit for controlling bypass operations of the data after verifying connections on both sides of a bidirectional communication path by using a single pattern as a synchronous bit pattern, wherein said controlling unit is arranged within a multiplexing device which opposes a multiplexing device on an opposing side via the exchange, said controlling unit including:

first periodic signal inserting means for inserting a first periodic signal, which periodically or intermittently includes one or more predetermined bit patterns and a bit having a predetermined value, in a signal to be output to the multiplexing device on the opposing side, and for outputting the signal to the exchange side, when a path from the multiplexing device on the opposing side is not connected;

second periodic signal inserting means for inserting a second periodic signal, which periodically or intermittently includes one or more predetermined bit patterns included in the first periodic signal and a bit whose value is obtained by inverting the predetermined value of the bit, in the signal to be output to the multiplexing device on the opposing side, and for outputting the signal to the exchange side, from a time point at which the one or more predetermined bit patterns of the first periodic signal inserted by said first periodic signal inserting means on the opposing side are detected within a signal input from the exchange after the path from the multiplexing device on the opposing side is connected; and operating mode switching means for switching the multiplexing device itself to a relay exchange mode for relaying an input signal without coding or decoding the input signal, and for relaying the input signal, when the inversion of the predetermined value of the bit included in the second periodic signal inserted by said second periodic signal inserting means is detected within the signal input from the exchange, and wherein a digital 1-link relay capability can be implemented.

10. The multiplexing device according to claim 9, wherein said first periodic signal inserting means makes a number of predetermined bit patterns included in the periodic signal equal to a number of identical bit patterns included in a periodic signal which is inserted by a multiplexing device of a conventional type for immediately switching to the relay exchange mode upon detection of the number of predetermined bit patterns, and wherein the multiplexing device can be opposed to the multiplexing device of the conventional type via the exchange.

11. The multiplexing device according to claim 9, wherein:

if the signal exchanged by the exchange is voice data, said first periodic signal inserting means and/or said second periodic signal inserting means inserts the first periodic signal and/or the second periodic signal in LSBs of the voice data.

12. A multiplexing device comprising:

a transmitting unit for bypassing a process for converting data received from a network side, and for transmitting the data to an exchange side;

a receiving unit for bypassing a process for converting the data which is received from the exchange and is bypassed by said transmitting unit, and for relaying the data; and a controlling unit for controlling bypass operations of the data after verifying connections on both sides of a bidirectional communication path by using a single pattern as a synchronous bit pattern, wherein said controlling unit is arranged within a multiplexing device which opposes a multiplexing device on an opposing side via the exchange, said controlling unit including:

first periodic signal inserting means for inserting a first periodic signal, which periodically or intermittently includes one or more predetermined bit patterns in each of which a value of a bit at a predetermined position is inverted, in a signal to be output to the multiplexing device on the opposing side, and for outputting the signal to the exchange side, when a path from the multiplexing device on the opposing side is not connected;

second periodic signal inserting means for inserting a second periodic signal obtained by further inverting the value of the bit at the predetermined position within the first periodic signal, in the signal to be output to the multiplexing device on the opposing side, and for outputting the signal to the exchange side, from a time point at which one or more bit patterns inserted by said first periodic signal inserting means on the opposing side are detected within a signal input from the exchange after the path from the multiplexing device on the opposing side is connected; and operating mode switching means for switching the multiplexing device itself to the relay exchange mode for relaying an input signal without coding or decoding the input signal, and for relaying the input signal, when a further inversion of the value of the bit at the predetermined position within the second periodic signal is detected within the signal input from the exchange, and wherein a digital 1-link relay capability can be implemented.

13. The multiplexing device according to claim 12, wherein:

said second periodic signal inserting means makes values of respective bits of a bit pattern and a number of bit patterns, which are included in the second periodic signal, equal to values of respective bits of a bit pattern and a number of bit patterns, which are included in a periodic signal inserted by a multiplexing device of a conventional type for immediately switching to the relay exchange mode upon detection of the number of predetermined bit patterns, and wherein the multiplexing device can be opposed to the multiplexing device of the conventional type via the exchange.

14. The multiplexing device according to claim 12, wherein:

if the signal exchanged by the exchange is voice data, said first periodic signal inserting means and/or said second periodic signal inserting means inserts the first periodic signal and/or the second periodic signal in LSBs of the voice data.

15. A method for switching to a relay exchange mode, for use in a multiplexing device which opposes a multiplexing device on an opposing side via an exchange, comprising the steps of:

inserting a first periodic signal, which periodically or intermittently includes one or more predetermined bit patterns, in a signal to be output to the multiplexing device on the opposing side, and outputting the signal to an exchange side, when a path from the multiplexing device on the opposing side is not connected;

inserting a second periodic signal, which periodically or intermittently includes one or more bit patterns identical to the predetermined bit patterns or one or more different bit patterns in addition to the one or more predetermined bit patterns, in the signal to be output to the multiplexing device on the opposing side, and outputting the signal to the exchange side, from a time point at which the first periodic signal inserted by the multiplexing device on the opposing side is detected within a signal input from the exchange after the path from the multiplexing device on the opposing side is connected; and switching the multiplexing device itself to the relay exchange mode for relaying an input signal without coding or decoding the input signal, and relaying the input signal, when the second periodic signal inserted by the multiplexing device on the opposing side is detected within the signal input from the exchange.

16. A method for switching to a relay exchange mode, for use in a multiplexing device which opposes a multiplexing device on an opposing side via an exchange, comprising the steps of:

inserting a first periodic signal, which periodically or intermittently includes one or more predetermined bit patterns and a bit having a predetermined value, in a signal to be output to the multiplexing device on the opposing side, and outputting the signal to the exchange side, when a path from the multiplexing device on the opposing side is not connected;

inserting a second periodic signal, which periodically or intermittently includes one or more predetermined bit patterns included in the first periodic signal and a bit whose value is obtained by inverting the predetermined value of the bit, in the signal to be output to the multiplexing device on the opposing side, and outputting the signal to the exchange side, from a time point at which the one or more predetermined bit patterns of the first periodic signal inserted by the multiplexing device on the opposing side are detected within a signal input from the exchange after the path from the multiplexing device on the opposing side is connected; and switching the multiplexing device itself to a relay exchange mode for relaying an input signal without coding or decoding the input signal, and relaying the input signal, when the inversion of the predetermined value of the bit included in the second periodic signal inserted by the multiplexing device on the opposing side is detected within the signal input from the exchange.

17. A method for switching to a relay exchange mode, for use in a multiplexing device which opposes a multiplexing device on an opposing side via an exchange, comprising the steps of:

inserting a first periodic signal, which periodically or intermittently includes one or more predetermined bit patterns in each of which a value of a bit at a predetermined position is inverted, in a signal to be output to the multiplexing device on the opposing side, and outputting the signal to the exchange side, when a path from the multiplexing device on the opposing side is not connected;

inserting a second periodic signal obtained by further inverting the value of the bit at the predetermined position within the first periodic signal, in the signal to be output to the multiplexing device on the opposing side, and outputting the signal to the exchange side, from a time point at which one or more bit patterns inserted by the multiplexing device on the opposing side are detected within a signal input from the exchange after the path from the multiplexing device on the opposing side is connected; and switching the multiplexing device itself to a relay exchange mode for relaying an input signal without coding or decoding the input signal, and relaying the input signal, when a further inversion of the value of the bit at the predetermined position within the second periodic signal is detected within the signal input from the exchange.

18. A multiplexing device opposing a multiplexing device on an opposing side via an exchange, comprising:

first periodic signal inserting means for inserting a first periodic signal, which periodically or intermittently includes one or more predetermined bit patterns, in a signal to be output to the multiplexing device on the opposing side, and for outputting the signal to the exchange side, when a path from the multiplexing device on the opposing side is not connected;

second periodic signal inserting means for inserting a second periodic signal, which periodically or intermittently includes one or more bit patterns identical to the predetermined bit patterns or one or more different bit patterns in addition to the one or more predetermined bit patterns, in the signal to be output to the multiplexing device on the opposing side, and for outputting the signal to an exchange side, from a time point at which the first periodic signal inserted by said first periodic signal inserting means on the opposing side is detected within a signal input from the exchange after the path from the multiplexing device on the opposing side is connected; and operating mode switching means for switching the multiplexing device itself to a relay exchange mode for relaying an input signal without coding or decoding the input signal, and for relaying the input signal, when the second periodic signal inserted by said second periodic signal inserting means on the opposing side is detected within the signal input from the exchange, and wherein a digital 1-link relay capability can be implemented.

19. A multiplexing device opposing a multiplexing device on an opposing side via an exchange, comprising:

first periodic signal inserting means for inserting a first periodic signal, which periodically or intermittently includes one or more predetermined bit patterns and a bit having a predetermined value, in a signal to be output to the multiplexing device on the opposing side, and for outputting the signal to the exchange side, when a path from the multiplexing device on the opposing side is not connected;

second periodic signal inserting means for inserting a second periodic signal, which periodically or intermittently includes one or more predetermined bit patterns included in the first periodic signal and a bit whose value is obtained by inverting the predetermined value of the bit, in the signal to be output to the multiplexing device on the opposing side, and for outputting the signal to the exchange side, from a time point at which the one or more predetermined bit patterns of the first periodic signal inserted by said first periodic signal inserting means on the opposing side are detected within a signal input from the exchange after the path from the multiplexing device on the opposing side is connected; and operating mode switching means for switching the multiplexing device itself to a relay exchange mode for relaying an input signal without coding or decoding the input signal, and for relaying the input signal, when the inversion of the predetermined value of the bit included in the second periodic signal inserted by said second periodic signal inserting means is detected within the signal input from the exchange, and wherein a digital 1-link relay capability can be implemented.

20. A computer-readable storage medium, which is used by a multiplexing device opposing a multiplexing device on an opposing side via an exchange, for storing a program directing a computer to perform the functions of:

inserting a first periodic signal, which periodically or intermittently includes one or more predetermined bit patterns, in a signal to be output to the multiplexing device on the opposing side, and outputting the signal to the exchange side, when a path from the multiplexing device on the opposing side is not connected;

inserting a second periodic signal, which periodically or intermittently includes one or more bit patterns identical to the predetermined bit patterns or one or more different bit patterns in addition to the one or more predetermined bit patterns, in the signal to be output to the multiplexing device on the opposing side, and outputting the signal to the exchange side, from a time point at which the first periodic signal inserted by the multiplexing device on the opposing side is detected within a signal input from the exchange after the path from the multiplexing device on the opposing side is connected; and switching the multiplexing device itself to a relay exchange mode for relaying an input signal without coding or decoding the input signal, and relaying the input signal, when the second periodic signal inserted by the multiplexing device on the opposing side is detected within the signal input from the exchange.

21. A computer-readable storage medium, which is used by a multiplexing device opposing a multiplexing device on an opposing side via an exchange, for storing a program directing a computer to perform the functions of:

inserting a first periodic signal, which periodically or intermittently includes one or more predetermined bit patterns and a bit having a predetermined value, in a signal to be output to the multiplexing device on the opposing side, and outputting the signal to an exchange side, when a path from the multiplexing device on the opposing side is not connected;

inserting a second periodic signal, which periodically or intermittently includes one or more predetermined bit patterns included in the first periodic signal and a bit whose value is obtained by inverting the predetermined value of the bit, in the signal to be output to the multiplexing device on the opposing side, and outputting the signal to the exchange side, from a time point at which the one or more predetermined bit patterns of the first periodic signal inserted by the multiplexing device on the opposing side are detected within a signal input from the exchange after the path from the multiplexing device on the opposing side is connected; and switching the multiplexing device itself to a relay exchange mode for relaying an input signal without coding or decoding the input signal, and relaying the input signal, when the inversion of the predetermined value of the bit included in the second periodic signal inserted by the multiplexing device on the opposing side is detected within the signal input from the exchange.

22. A computer-readable storage medium, which is used by a multiplexing device opposing a multiplexing device on an opposing side via an exchange, for storing a program directing a computer to perform the functions of:

inserting a first periodic signal, which periodically or intermittently includes one or more predetermined bit patterns in each of which a value of a bit at a predetermined position is inverted, in a signal to be output to the multiplexing device on the opposing side, and outputting the signal to the exchange side, when a path from the multiplexing device on the opposing side is not connected;

inserting a second periodic signal obtained by further inverting the value of the bit at the predetermined position within the first periodic signal, in the signal to be output to the multiplexing device on the opposing side, and outputting the signal to the exchange side, from a time point at which one or more bit patterns inserted by the multiplexing device on the opposing side are detected within a signal input from the exchange after the path from the multiplexing device on the opposing side is connected; and switching the multiplexing device itself to a relay exchange mode for relaying an input signal without coding or decoding the input signal, and relaying the input signal, when a further inversion of the value of the bit at the predetermined position within the second periodic signal is detected within the signal input from the exchange.

\* \* \* \* \*